United States Patent [19]

Matsunawa et al.

[11] Patent Number: 5,016,096

[45] Date of Patent: May 14, 1991

[54] APPARATUS FOR COLOR PROCESSING SPECIFICALLY INSIDE OR OUTSIDE A DETECTED REGION

[75] Inventors: Masahiko Matsunawa; Hiroshi Katoh, both of Tokyo, Japan

[73] Assignee: Konica Corporation, Tokyo, Japan

[21] Appl. No.: 247,087

[22] Filed: Sep. 20, 1988

[30] Foreign Application Priority Data

Sep. 21, 1987 [JP] Japan ................................. 62-236789

[51] Int. Cl.⁵ .............................................. H04N 1/46
[52] U.S. Cl. ...................................... 358/75; 358/453; 358/448
[58] Field of Search .................... 358/75, 448, 453, 78, 358/77, 451, 452

[56] References Cited

U.S. PATENT DOCUMENTS 4,908,716 3/1990 Sakano ................................. 358/453
4,937,662 6/1990 Matsunawa et al. .................. 358/75
4,942,461 7/1990 Abe et al. .............................. 358/75

FOREIGN PATENT DOCUMENTS

| 251278 | 1/1988 | European Pat. Off. . |
| 185767 | 11/1982 | Japan . |
| 163980 | 11/1984 | Japan . |
| 33333 | 8/1985 | Japan . |
| 159570 | 7/1987 | Japan . |

Primary Examiner—James J. Groody
Assistant Examiner—Kim Yen Vu
Attorney, Agent, or Firm—Jordan B. Bierman

[57] ABSTRACT

A color image processing apparatus, capable of readily processing an image as required based on a simple circuit configuration, adapted to both detect a region designated by a color marker on a multicolor document, and perform a specific image processing at the inside or outside of the detected region.

6 Claims, 48 Drawing Sheets

——— LEVEL CHANGE ON BLACK LINE

—·— LEVEL CHANGE ON RED LINE

—··— LEVEL CHANGE ON BLUE LINE

----- LEVEL CHANGE ON MARKER LINE

BLACK LINE

| COLOR REGION | COLOR CODE | | |
|---|---|---|---|
| BLACK | 0 | 0 | 0 |
| BLUE | 0 | 0 | 1 |
| RED MARKER | 1 | 0 | 1 |
| RED | 0 | 1 | 0 |
| RED MARKER | 1 | 1 | 0 |
| WHITE | 0 | 1 | 1 |

RED GHOST REGION    BLUE GHOST REGION

RED  BLACK  BLUE

BLUE  BLACK

BLACK  RED

→ PIXEL NUMBER 2-LINE PATTERN

FIG. 21A

| BLACK LINE | | CYAN CCD | RED CCD | COLOR SEPARATION OUTPUT |
|---|---|---|---|---|
| | 1 | W | W | W |
| | 2 | W | W | W |
| PIXEL NUMBER ↓ | 3 | W | BLACK | (BLUE) |
| | 4 | BLACK | BLACK | BLACK |
| | 5 | BLACK | W | (RED) |
| | 6 | W | W | W |
| | 7 | W | W | W |

FIG. 21B

| RED LINE | | CYAN CCD | RED CCD | COLOR SEPARATION OUTPUT |
|---|---|---|---|---|
| | 1 | W | W | W |
| | 2 | W | W | W |
| PIXEL NUMBER ↓ | 3 | W | RED | (BLACK) |
| | 4 | RED | RED | RED |
| | 5 | RED | W | W |
| | 6 | W | W | W |
| | 7 | W | W | W |

FIG. 21C

| BLUE LINE | | CYAN CCD | RED CCD | COLOR SEPARATION OUTPUT |
|---|---|---|---|---|
| | 1 | W | W | W |
| | 2 | W | W | W |
| PIXEL NUMBER ↓ | 3 | W | BLUE | BLUE |
| | 4 | BLUE | BLUE | BLUE |
| | 5 | BLUE | W | (BLACK) |
| | 6 | W | W | W |
| | 7 | W | W | W |

( ) INDICATES COLOR GHOST

FIG. 26

| NO. | COLOR PATTERN | TARGET PIXEL CHANGE |
|---|---|---|
| 1 | WHITE WHITE BLUE BLUE BLACK BLACK BLACK | BLUE ⟶ BLACK |
| 2 | WHITE WHITE BLUE BLUE BLUE WHITE WHITE | BLUE ⟶ BLUE |
| 3 | WHITE WHITE WHITE RED BLACK BLACK BLACK | RED ⟶ BLACK |
| 4 | WHITE WHITE RED RED RED WHITE WHITE | RED ⟶ RED |

PERIPHERAL PIXELS | PERIPHERAL PIXELS
TARGET PIXEL

FIG. 27

| N | M | COLOR PATTERNS | PATTERN SIZE |
|---|---|---|---|
| 2 (WHITE BLACK) | 3 | 8 | 1 X 3 |
| | 5 | 32 | 1 X 5 |
| | 7 | 128 | 1 X 7 |
| 3 (WHITE BLACK RED) | 3 | 27 | 1 X 3 |
| | 5 | 243 | 1 X 5 |
| | 7 | 2187 | 1 X 7 |
| 4 (WHITE BLACK RED BLUE) | 3 | 64 | 1 X 3 |
| | 5 | 1024 | 1 X 5 |
| | 7 | 16384 | 1 X 7 |
| | 9 | 262144 | 3 X 3, 1 X 9 |

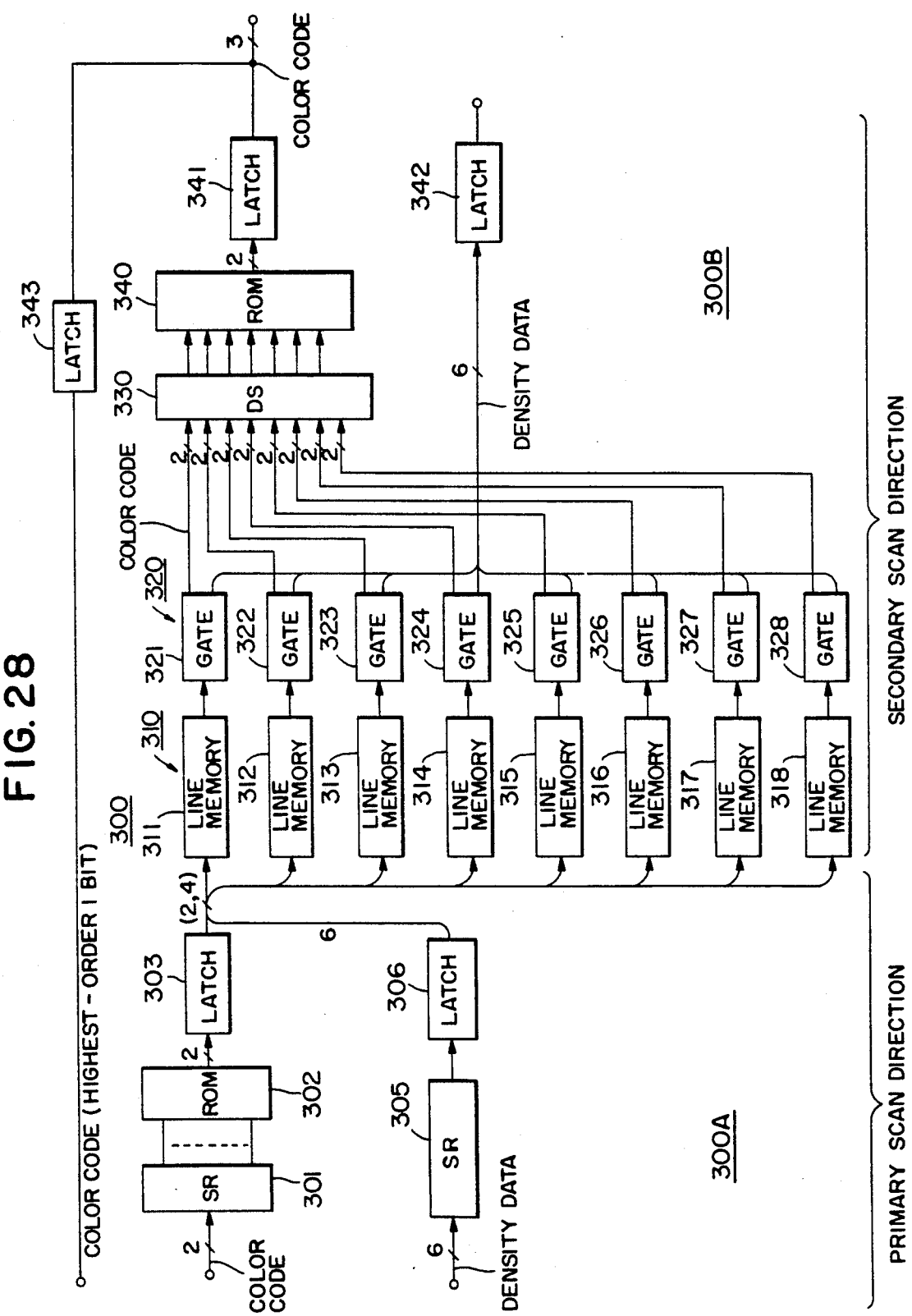

BLUE MARKER

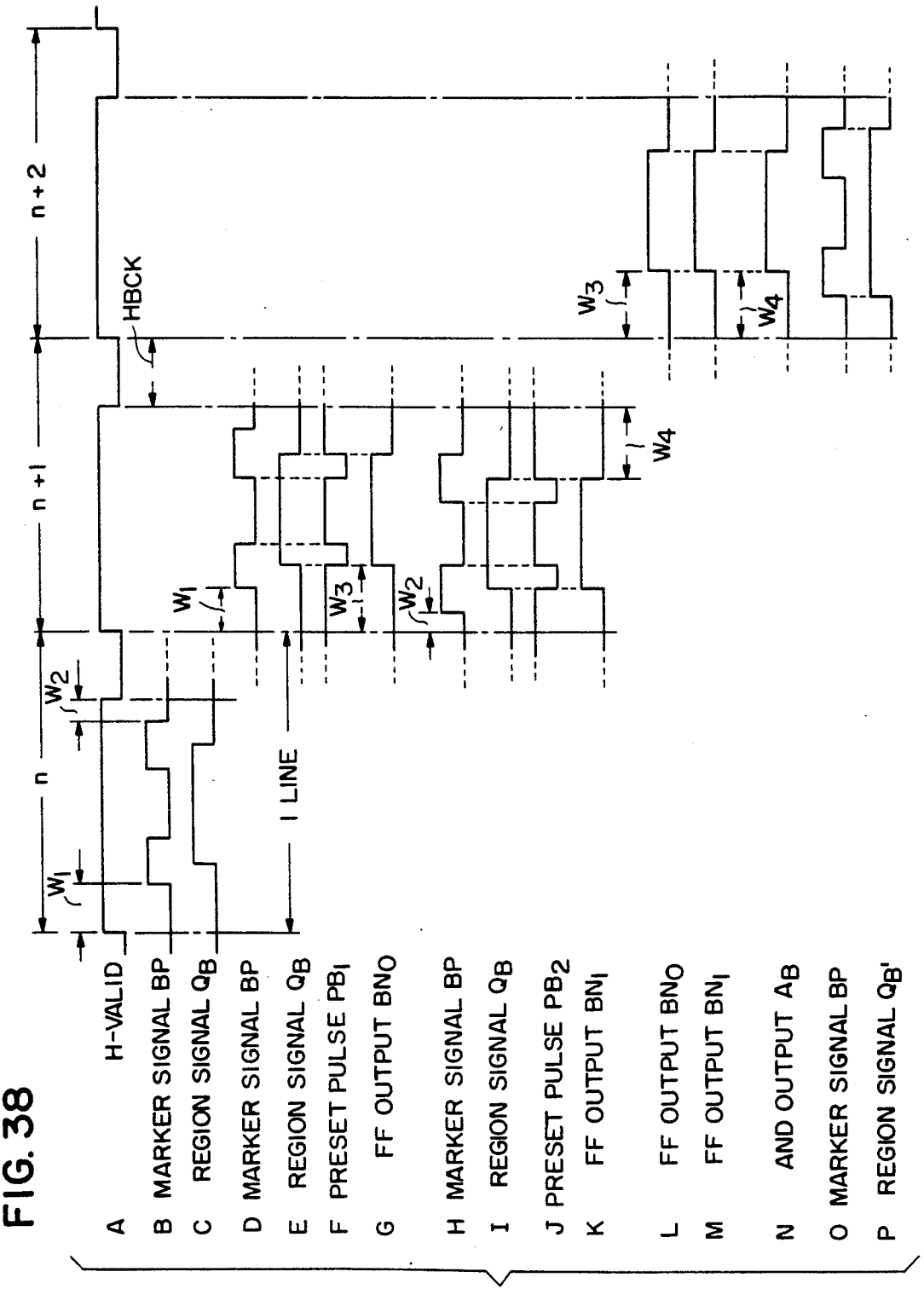

| 44 | 16 | 24 | 36 |
|----|----|----|----|
| 60 | 0  | 8  | 52 |
| 28 | 32 | 40 | 20 |
| 12 | 48 | 56 | 4  |

PATTERN EXAMPLE

| | PROCESSING THE REGION ENCLOSED BY MARKER | PROCESSING THE OUTSID OF THE REGION ENCLOSED BY MARKER |
|---|---|---|
| CONTENTS | O X P | I X P |
| EXTRACTION | O I P | I I P |
| ELIMINATION | O 2 P | I 2 P |
| REVERSING | O 3 P | I 3 P |
| COLOR CONVERSION | O 4 P | I 4 P |
| COLOR CONVERSION + EXTRACTING | O 5 P | I 5 P |
| COLOR CONVERSION + REVERSING | O 6 P | I 6 P |
| PAINTING | O 7 P | I 7 P |
| COLOR CONVERSION + PAINTING | O 8 P | I 8 P |
| COLOR ELIMINATION | O 9 P | I 9 P |

…

APPARATUS FOR COLOR PROCESSING SPECIFICALLY INSIDE OR OUTSIDE A DETECTED REGION

BACKGROUND OF THE INVENTION

This invention generally relates to a color image processing apparatus capable of being preferably applied to a simple electrophotographic color copying machine in order to obtain satisfactory color image.

The color image processing apparatus optically reads color image information on a document, separates the information into multiple colors including black, red and blue, and record the color image on a recording paper through its electro-photographic color copying machine on the basis of above separated color images. This type of color image processing apparatus is disclosed in Japanese Patent Publication Open to Public Inspection Nos. 147374/82 and 62769/83.

FIG. 67 shows part of a key assembly of the said color image processing apparatus.

In this figure, color image information is separated into white and cyan colors, each of which is projected onto image sensors 104 and 105 for electrophotographic conversion.

More specifically, white and cyan color signals are supplied to the subtracter 2 where red color is separated. These white, cyan and red colors are gain-controlled by the AGC circuits 3, 4 and 5, respectively, and then are coded by the binary coding circuits 6, 7 and 8, respectively. The coded output is again converted into red and black color signals by the arithmetic circuit 9, for example, and these signals are supplied to the color copying machine as image signals for color reproduction of the original. Further, in Japanese Patent Application O.P.I. No. 89371/1982 is disclosed a method of detecting the region designated with a color marker on a black-white document.

There are two possible methods for image processing operations (including resolution control, enlargement and reduction) of electrophotographically converted images by use of a color image processing apparatus that can produce color image. One method is intended for analog image data which has not been color-separated, as shown in FIG. 68; the other for coded image data, as shown in FIG. 69.

One problem of the format method lies in a large circuit scale attributable to that the method uses the image processing means 10 for each of multiple color-separated signals for image processing. Another problem lies in that analog signals prevent smooth image processing.

The latter method has also problems. One problem is attributable to digitized digital signals which the method is to handle. This enables easier signal handling than the former method, but restricts the scope of image processing to enlargement and reduction. As a result, there is a restriction in correction of resolution because of a smaller amount of information.

When designating a region on a document with a color marker or the like, and subjecting inside or outside the designated area to image processing such as color conversion based on the detected color marking, the document possibly treated with such an apparatus is essentially a black-monochromatic (white/black) document; the apparatus is incapable not only of detecting color marking on a multi-color document (color document) but also of performing the above-mentioned image processing.

SUMMARY OF THE INVENTION

Accordingly, the invention solves such a conventional problem, by using a simply constituted apparatus, and the invention provides a color image processing apparatus capable of readily processing an image as required based on simpler circuit configuration, and the apparatus is capable of not only detecting color marking on a multi-color document, but also performing a specific image processing at the inside or outside of the region designated with a color marker.

To solve the above problem, the image processing apparatus of the invention comprises means for detecting a region designated on a multi-color document with a color marker, whereby based on the detected information, the apparatus differently processes between an image inside the region designated with a color marker and an image outside the region.

First, the region designated on a multi-color document with a color marker is detected, and the image regions inside and outside the marking for designation are differently processed.

In a partial image processing operation, the color code of the marker and that of the multi-color document are independently processed.

The image processing operation here is associated with color information or density information, and can cover both types of information.

BRIEF DESCRIPTION OF THE DRAWINGS

Both

FIGS. 20, 21 and 25 explain and illustrate color ghost generation.

FIGS. 26 and 27 present descriptive drawings for color ghost correction.

FIG. 28 is a color ghost correction circuit diagram.

Both

FIGS. 37 and 38 are waveform used for description of the region extracting assembly's operation.

FIGS. 43, 44 and 46 are block diagram for data selecting circuit, while

FIG. 45 represent an example of pattern used in FIG. 44.

FIG. 65 shows a key layout for the operation/indicator panel. while

DETAILED DESCRIPTION OF THE INVENTION

An example of the color image processing apparatus related to the invention is explained, using these figures.

Figure 1:
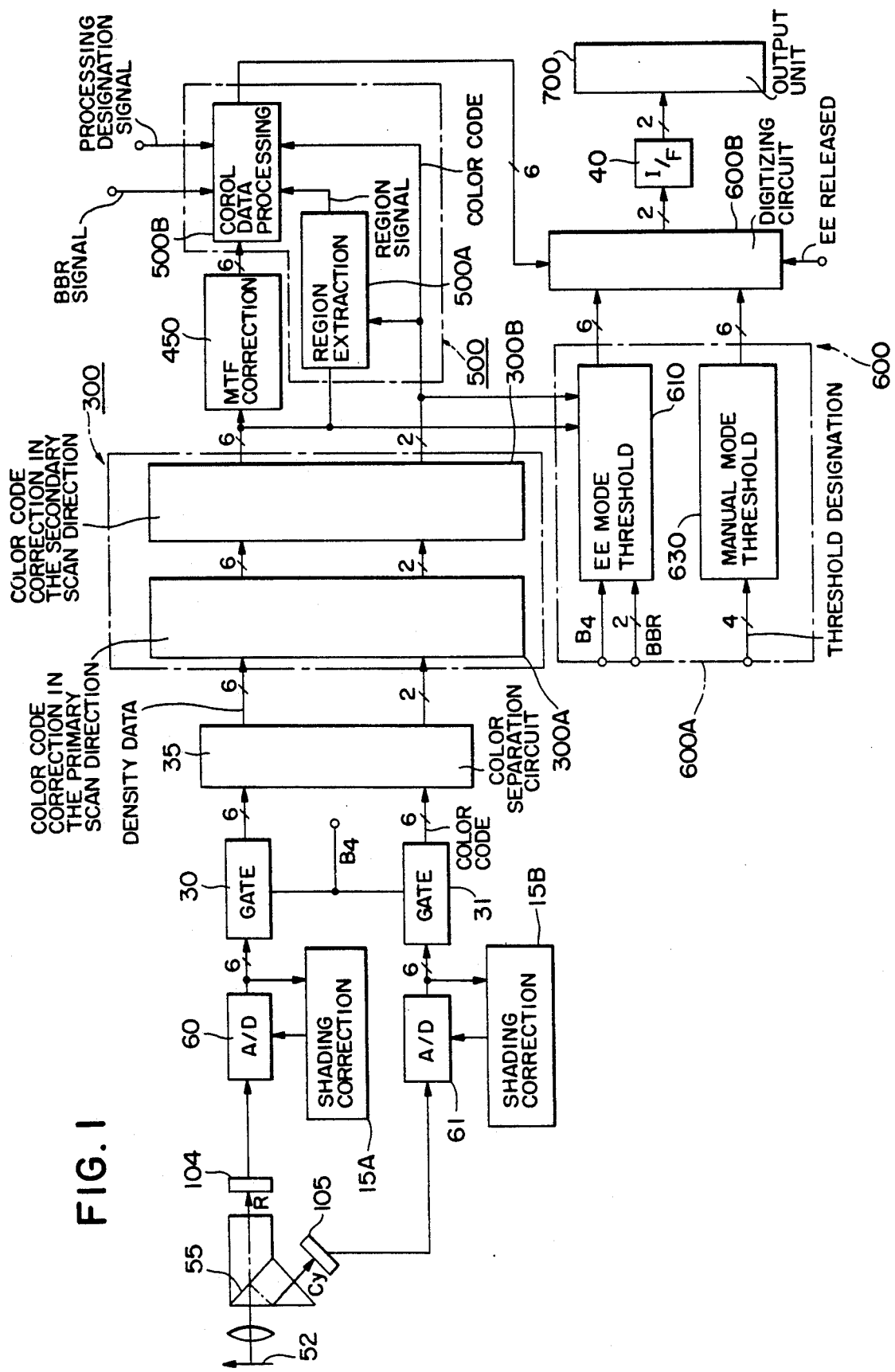
FIG. 1 shows a block diagram of the overall color image processing apparatus of the invention which is used for the brief description.

The configuration of the color image processing apparatus is presented in FIG. 1.

The color image information (optical image) on the document 52 is separated into two color separation images by the dichronic mirror 55. In this example, color image information is separated into red R and cyan Cy color separation images. This color separation is conducted by used of a cutoff of the dichroic mirror having cut off range of 540 to 600 mm. This enables the red component to form a transmitted light, and the cyan component to form reflected light.

Red R and cyan Cy color separation images are supplied to such image reading units as CCDs 104 and 105 through which image signals of red component R and cyan component Cy only are provided.

Image signals R and Cy are supplied to analog/digital converters 60 and 61 where they are converted into digital signals with the predetermined bits, 6 bit in this example. At the time, shading correction is conducted. 15A and 15B show shading correcting circuits. A detailed description of correction is given later.

In gate circuits 30 and 31, digital image signals subjected to the shading correction within maximum document size are extracted; they are supplied to the color separation 35 of next stage. For documents of B4 size, the size signal B4 produced by the system timing signal forming means (not illustrated) is used as a gate signal.

Assuming that shaded digital image signals are VR and VC, VR and VC are supplied into the color separating circuit 35 where they are separated into multiple color signals. This example shows a configuration to separate image signal into color signals: red, blue and black.

Each separated color signal consists of color code data (2-bit data) and density data (6-bit data). As the data of each color signal, one stored in the color separation map with ROM, for example, is used.

Color-separated image data is transferred to the color image processing step.

First, the image data is supplied to the color ghost correction means 300 of the next stage where color ghost correction is conducted in the primary (horizontal) scanning direction and in the secondary scanning (drum revolution) direction. 300A shows the color ghost correcting circuit in the primary scanning direction, while 300B shows one in the secondary scanning direction.

This color short correction is made to prevent undesirable color ghost around letters in black during color separation. Some color separation map configurations produce red color around a black letter and blue color at its edge. The picture quality is improved by removing the color ghost. This removal is done only for color code data.

Other image processing includes resolution correction, image processing in the region after detecting the marked region, and threshold value selection for multivaluing, which are shown.

There are enlargement and reduction process other than above, for the convenience of better explanation, above three kinds of image processing are described with specific examples.

450 shows the resolution correction means. This correction means conducts contour correction alone which needs density data.

The next example is partial color conversion in the detected region. Partial conversion means 500 consists of a region extracting circuit 500A to detect the original picture region marked by color marker on the document, and a color data processing circuit 500B to treat inside or outside of the extracted region with the designated colors.

The region extracting circuit 500A provides the region signal that indicates a region enclosed by color marker. This signal and color code data are supplied to the color data processing circuit 500B.

To the color data processing circuit 500B, both a signal to indicate the image processing designated from the indicator/operation panel and BBR signal to indicate color in which image is to be taken and printed are supplied. Based on these signals and the input signals, determination is made whether or not resolution-corrected density data should be transmitted to the multivaluing means 600 of next stage.

In the case where only the color code is to be processed, it may be permissible to treat the color code alone without processing the density data.

For example, to simply conduct copy the document, only image data with the same color as that for BBR signal is provided. To perform color conversion for the entire document (i.e. to perform conversion between red and blue), control is performed so that red image data is provided during the printing of blue image data, and that blue image data is provided during printing of red image data.

In conducting partial color conversion, the information in the region enclosed by a color marker is printed in that color. For explain, if control is performed so that the information in the region enclosed by the red marker is printed in the phase where printing in red color is made, the information in this region can be partially converted for printing in red color.

In the case of partially processing density information, processing items have been predetermined in the operation part. Then, the information inside or outside of the marked region is subjected to the designated processing item, when main scanning is performed. In this case, it may be preferable that the processing items are correlated with the colors of markers.

For example, extraction process is performed for red color-marked region and elimination process is performed for blue color marked region.

Thus, partial color conversion and partial density conversion are realized only by use of a developing system in which developing is conducted by revolving the drum for each color and fixing is conducted after the completion of development for the last color.

In this case, image pickup is conducted several times. Image printing can be made real time by performing image pickup and development several times. The real-time image printing decreases the size of memory needed for image storage.

Image data (density data) from the color data processing circuit 500B is coded into multivalue by the multivalue coding means 600. The example shows the case where 6-bits density data is converted into 2-bit data (4 kinds of data, 00, 01, 10 and 11). The threshold data (6 bits) used as a standard for digitizing into one of the 4 kinds of data is set by automatically or manually.

The threshold value selecting means 600A consists of the threshold selecting means 630 for manual setting and the threshold determining means 610 for automatic setting. The threshold selecting means 630 has been designed to allow independent decision of threshold for each color. This means provides a manually set threshold upon which density data is multivalued.

The threshold determining means 610 consists of an ROM that includes the predetermined threshold. Selection of manual or automatic setting of threshold is conducted by the EE release signal. The automatic setting mode (EE mode) is normally used. The BBR signal is also supplied to show in which sequence the developing machine is performing its operation.

Image data digitized by the multivalue coding circuit 600B is supplied to the output unit 700 through the interface circuit 40. The interface circuit 40 has the first interface and the second interface, either of which is used to receive batch image data to control toner density.

The output unit 700 can be a laser printing machine. With the laser printing machine, digitized image is converted into a predetermined optical signal which is then modulated based on digitized data.

An electrophotographic color copying machine is used for a developing unit. This example shows 2-component non-contact jumping development along with reversal development which calls for no transfer drum used as conventional color image forming. The reduce the machine size, the working example uses the method in which development of three color (blue, red and black) images on an OPC sensitized material (i.e. drum) for image forming is conducted with three revolutions of the drum and then transfer is made once onto a plain paper for copying.

Described below is related to details of components for the color image processing apparatus of the invention.

Figure 2:
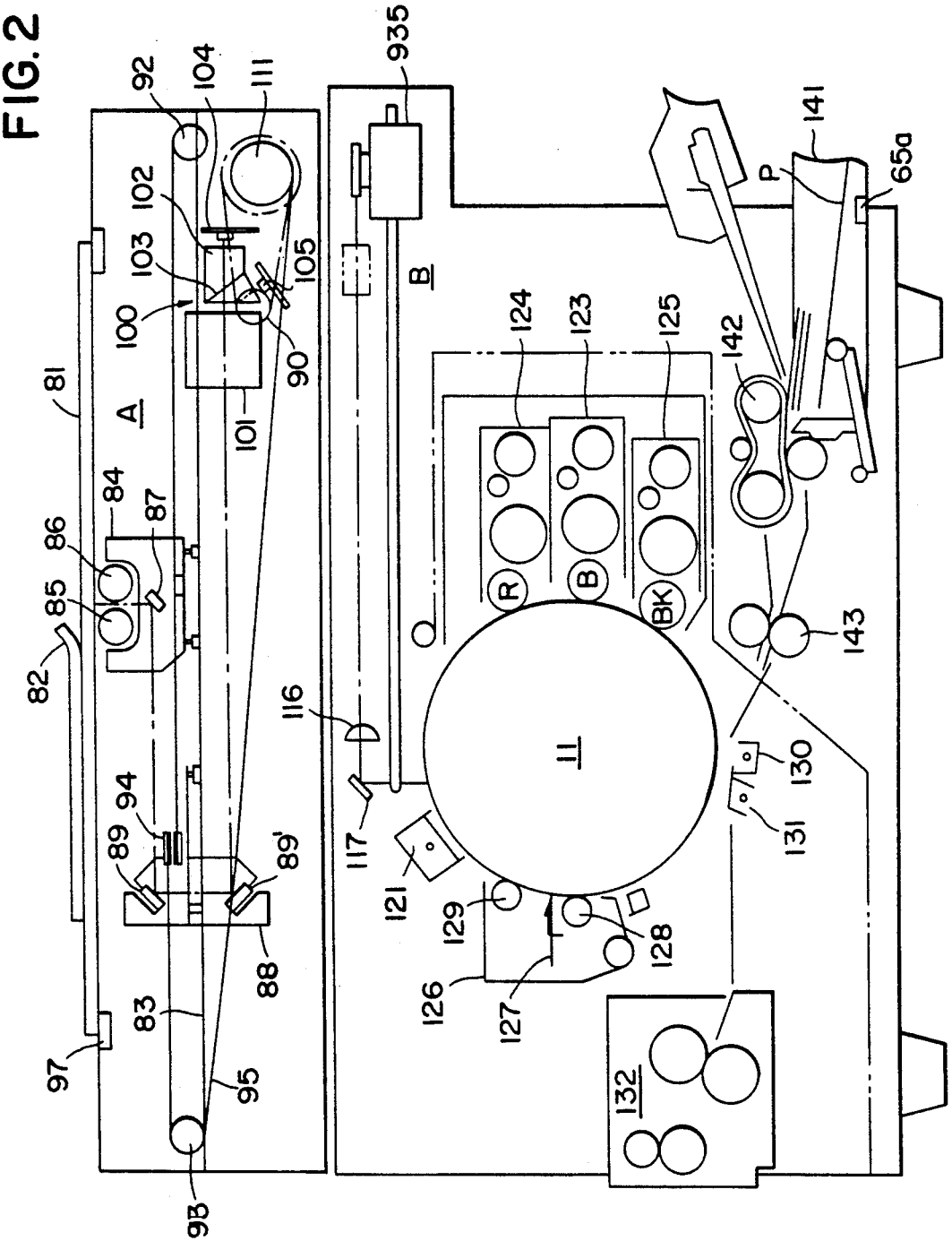
FIG. 2 is a configuration of a key part of the color copying machine applicable to the invention.

First, a simple color copying suited to the invention is described using FIG. 2 onwards.

The simple color copying machine separates color image information into three chrominance information to print color image. This example presents black BK, red R and blue B as these three chrominance information.

With the machine turned on, the document reading unit A is driven.

The first step is to the document 82 on the document table 81 is optically scanned by the optical system. The optical system consists of halogen lamp or fluorescent lamps 86, the carriage 84 with the reflecting mirror 87, and movable mirror unit 88 with the V mirrors 89 and 89'.

The carriage 84 and the moving unit 88 travel on the slide rail 83 by the stepping motor 90 at the predetermined speeds and in the predetermined directions.

The halogen lamps 86 illuminate the document 82 on the mirror 87; the image is then supplied to the optical information conversion unit 100 through the V mirror 89 and 89'.

In the case of using the halogen lamp as a light source, the system being inserted IR cut filter in front of lens may be used.

To prevent optical emphasis and attenuance of a specific color in the case where a color document is scanned with light, warm white fluorescent lamps are used for the light source 86. Furthermore, to allow stable illumination, these fluorescent lamps are turned on or driven by a high-frequency power supply of approximately 40 kHz. These lamps are kept warm by a stabilizer-used heater to ensure a constant temperature of their tube walls or to improve warm-up performance.

On the rear side of the left edge of the platen glass 81 there is the standard white plate 97 on which optical scanning is made to normalize the image signal into the equivalent white signal and then the shading correction is made.

The optical information conversion unit 100 consists of the lens 101, the prism 102, the dichronic mirror 103, the CCD 104 on which-red-color-separated image is projected and the CCD105 on which cyan-color-separated image is projected.

The optical signals from the optical system are focused by the lens 101; they are then separated by the dichronic mirror of the prism 102 into red-color information and cyan-color information.

Each of these color-separated images is formed on each CCD's receiving surface, whereby the image signal is converted into the electric signal. The image signal processed by the signal processing system; each chrominance signal is supplied to the printing unit B.

As shown in FIG. 1, the signal system includes not only the analog/digital converting means, but also such signal processing circuits as the color separating means and digitizing means.

The printing unit B possesses the deflecting unit 935. The deflecting unit 935 can be a galvanomirror, rotating polygon mirror, or a deflecting unit with a quartz-used optical deflector. Laser beam modulated by chrominance signal is deflected and scanned by the deflecting unit.

Upon the start of deflection and scanning, beam scan is detected by the laser index sensor (not illustrated) and beam modulation starts by the first chrominance (blue signal, for example). The modulated beam is so controlled that it scans the image forming unit (i.e. photosensitizing drum) 11 with uniform charge.

The primary scan by laser beam and secondary scan by the rotating image forming unit 11 form a electrostatic image corresponding to the first chrominance signal on the image forming unit 11.

The electrostatic image is developed by the developing unit 123 that contains blue toner. The predetermined bias voltage from the high-voltage source is applied to the developing unit 123. This development forms blue image.

Toner is supplied as required according to the directive signal from a CPU (not illustrated) for systemcontrol which controls a toner supplying means (not illustrated).

The blue toner image rotates with contact of the cleaning blade 127 released. Like the first chrominance signal, electrostatic image is formed based on the second chrominance signal (red signal, for example). By use of the developing unit 124 accommodating red accommodating, this is developed for form red toner image.

Of course, the predetermined bypass voltage is applied from the high-voltage power supply to the developing unit 124.

Likewise, electrostatics image is formed based on the third chrominance (black) signal, and black toner image is formed based on chrominance (black) signal.

This means a multiple-color toner image has been formed on the image forming unit 11.

The above description is related to the forming of 3-color toner image; and of course this is applicable to the forming of 2- or 1-color image.

The example of development is a so-called non-contact 2-component jumping development in which each toner is jumped toward the image forming unit 11, with AC/DC bias voltage (from the high-voltage power supply) applied.

The predetermined amount of toner is supplied to each of the developing unit 124 and 125 according to the directive signal from the CPU.

On the other hand, the recording paper P supplied by the paper feeding unit 141 through the feeding roll 142 and the timing roll 143 is carried onto the image forming unit 11, with its timing being in line with the revolution of the image forming unit 11. Then, multi-color toner image is transferred onto the paper by the transferring electrode 130 to which high voltage is applied to the high voltage supply and it is separated by the separating electrode 131.

The recording paper P is then carried to the fixing unit 132 for obtaining color image by fixing.

After the process of transfer, the image forming unit 11 is cleaned by the cleaning unit 126 for preparations for the next image forming.

To facilitate toner collection by the black 127 of the cleaning unit 126, the predetermined DC voltage is applied to the metallic roll 128 of the blade 127. This metallic roll 128 is arranged on the surface of the image forming unit 11 (not contacting the surface).

After cleaning, the blade 127 is released from the contact state. The auxiliary cleaning roller 129 is installed to eliminate unwanted toner left after the release. The roller 129 is revolved and contacts in the direction opposite to the image forming unit 11 to satisfactorily clean and remove unwanted toner.

The paper feeding unit 141 is equipped with the sensor 65a from which the detection output is forwarded to the CPU.

Figure 3:
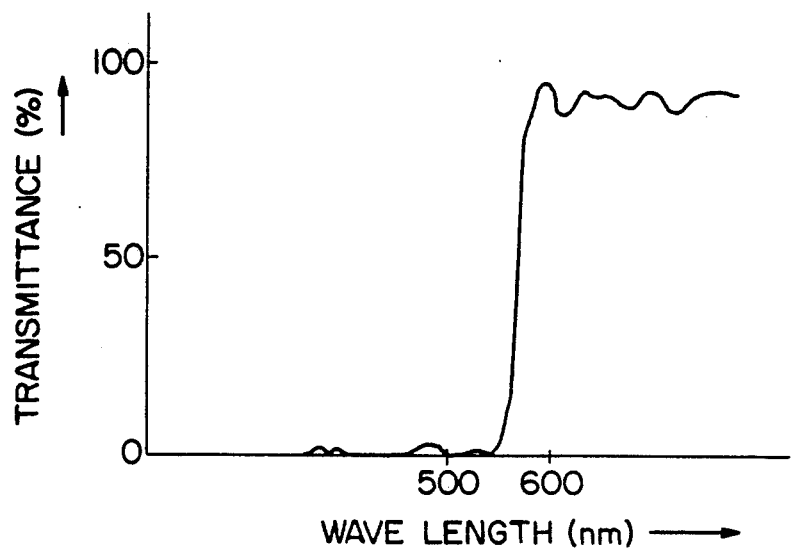
FIG. 3 presents characteristics of dichroic mirror permeability.
Figure 4:
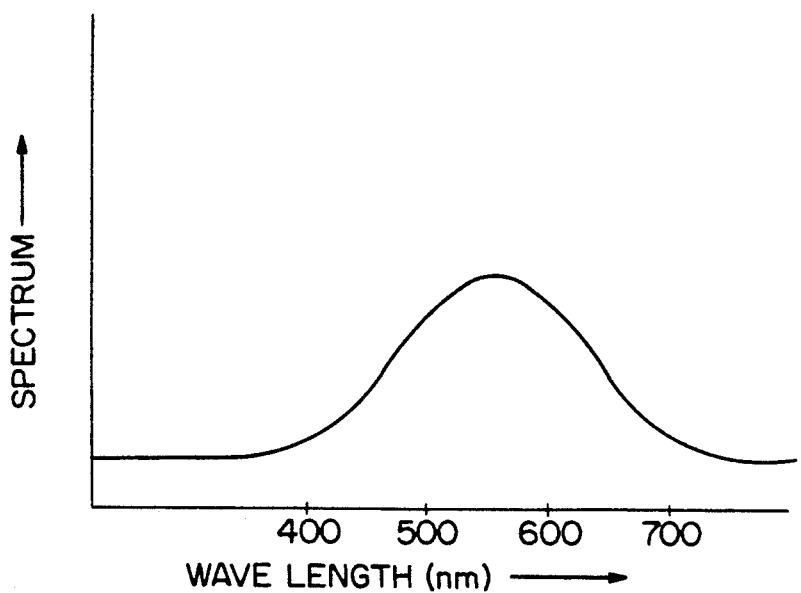
FIG. 4 relative spectrum of the light source.
Figure 5:
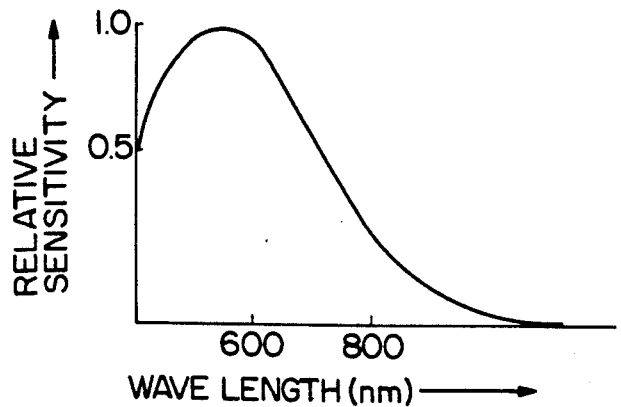
FIG. 5 illustrates a spectral characteristic of CCD.

FIG. 3 shows permeability characteristic of the dichroicmirror, FIG. 4, emission spectrum, and FIG. 5 spectral sensitivity characteristic of the light source.

The halogen lamp is used as the light source. The halogen lamp is used along with IR cut filter to adjust emission spectrum so as to perform color separation without difficulty.

Shading correction is required because there is some problems in the optical system and the light source and there is need for PRNU (photo response non-uniformity) correction of CCD.

The optical system follows the law of $COS^4$. The second problem related to the light source is described below.

Figure 6:
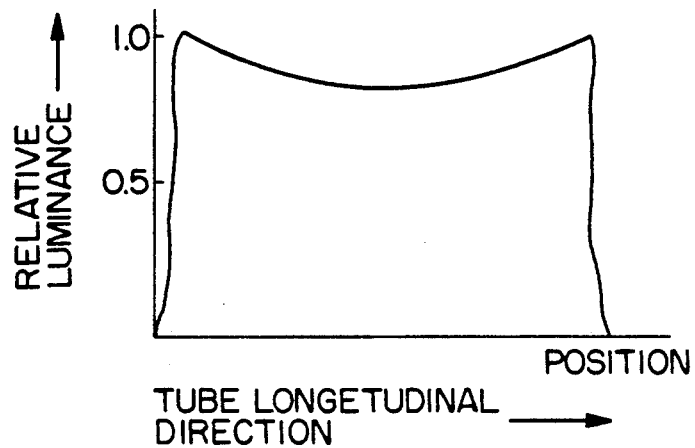
FIG. 6, relative luminance distribution.

A linear light source such as the halogen lamp is used for the light source. But this lamp does not produce uniform amount of light with respect to the logitudinal direction of the tube as shown in FIG. 6 due to filament used.

CCD involved in the third problem has a single array of pixels (normally 2,048 to 5,000 pixels). It is almost impossible to obtain identical characteristics of all the pixels. Assumed normally is a PRNU of $+/-10\%$ which must be needed corrected.

Figure 7:
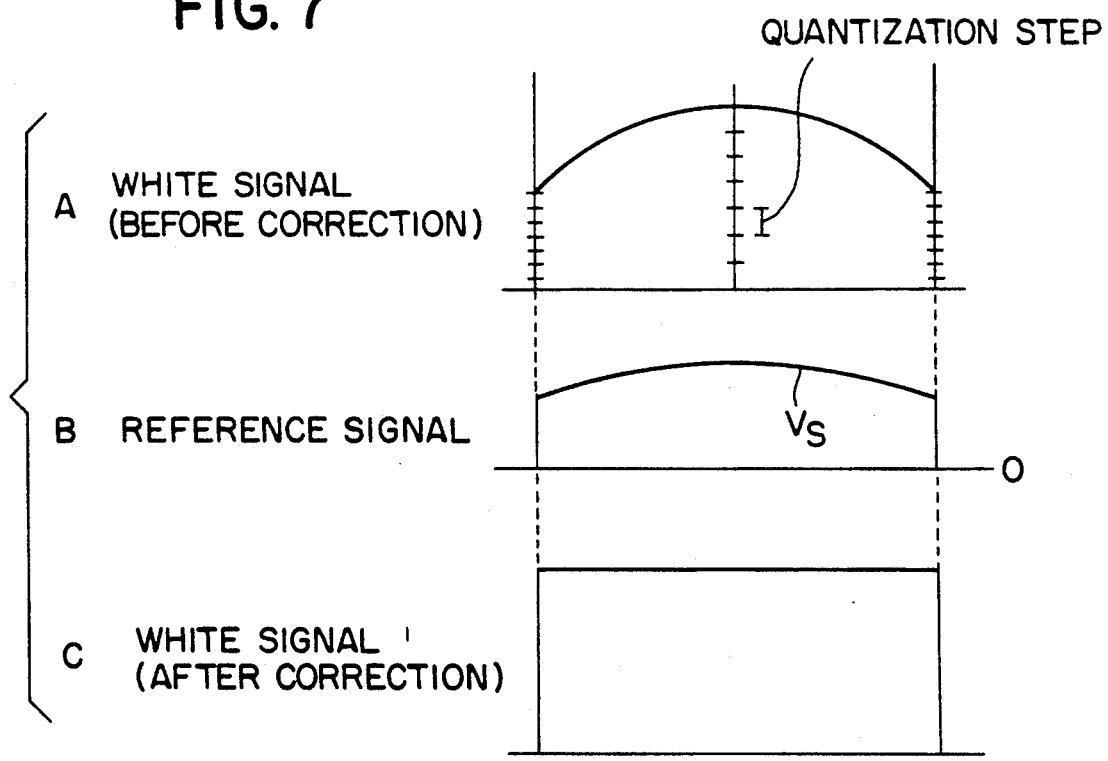
FIG. 7 is a descriptive drawing for shading correction.

Shading produces only white signal with its output level deteriorated at the periphery of the white document, as shown in FIG. 7A.

To perform shading correction, the optical system first operates to scan the white standard board 97 prior to the full-scale scanning to obtain the white signal (FIG. 7B). Use of this signal for a reference signal for analog/digital conversion adjusts quantization steps. In other words, quantization steps becomes smaller at the edge of image and becomes larger at the center of image, as shown in FIG. 7A.

As a result, implementation of analog/digital conversion while modulating the reference signal allows the analog output signal to have a constant output level, as shown in FIG. 7C, which means the shading distortion has been corrected. Thus, the white signal picked up prior to the full-scale scan is used as a standard signal for shading correction.

Figure 8:
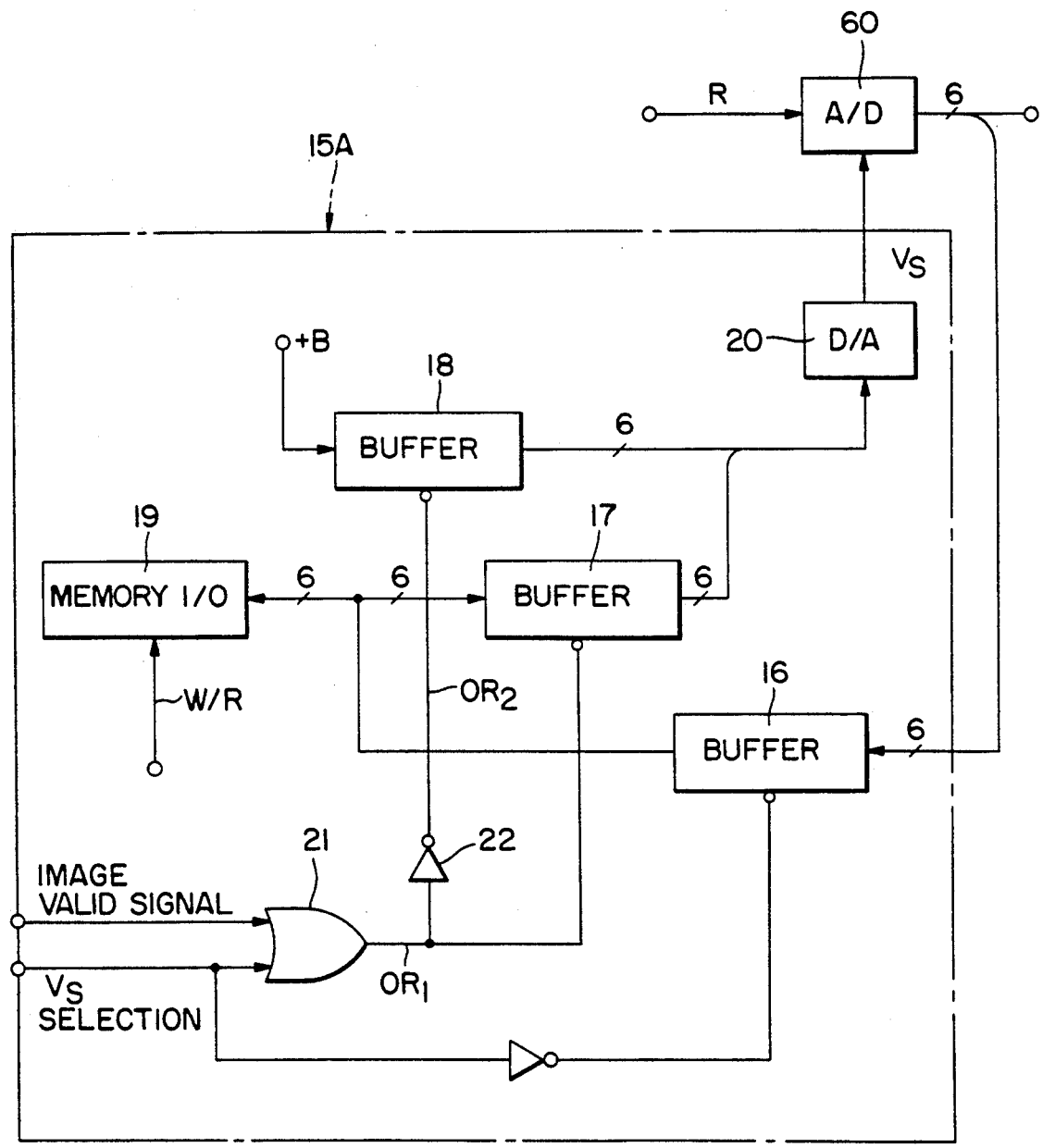
FIG. 8 presents a shading correction circuit diagram.

FIG. 8 shows an example of the shading correcting circuit 15A.

Figure 9:
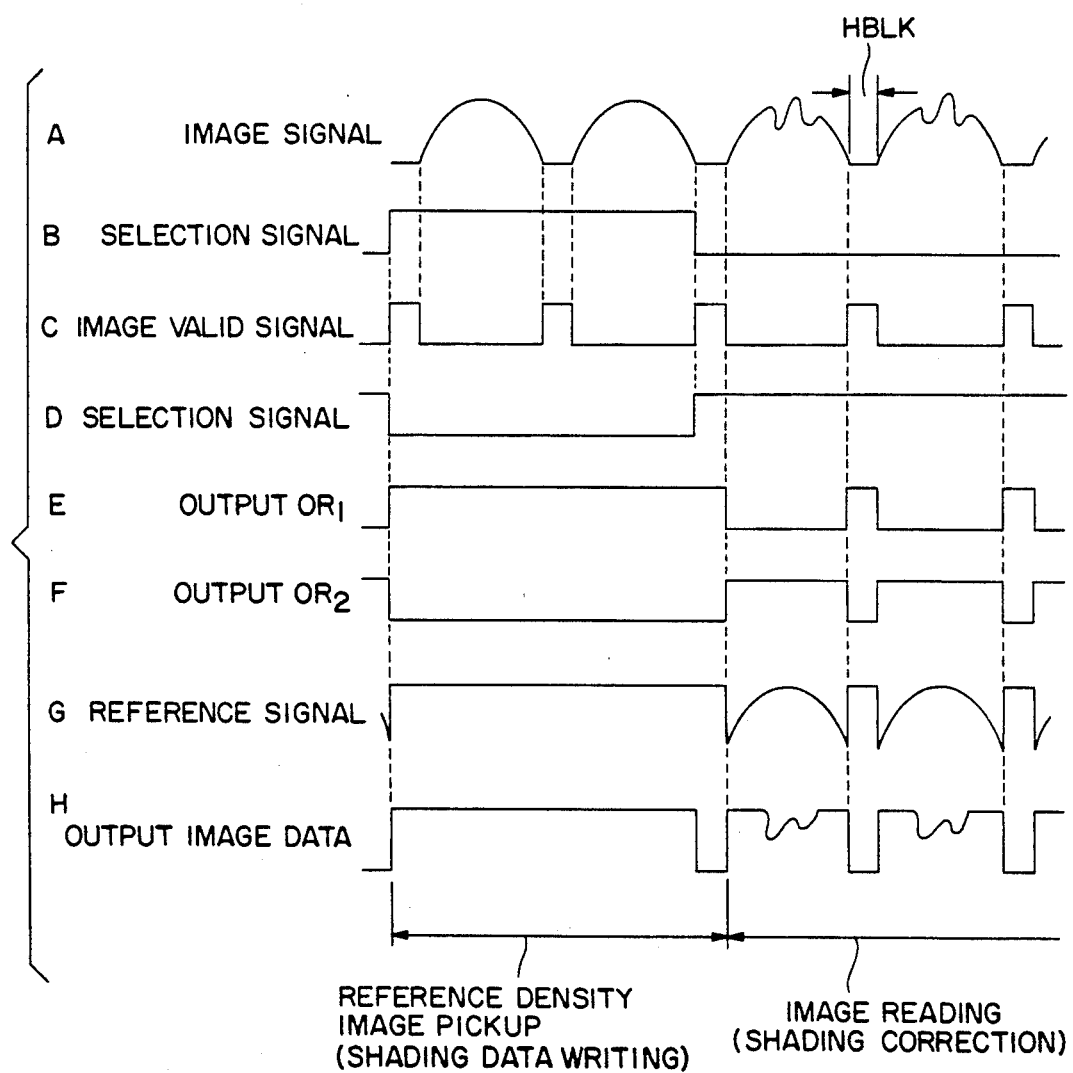
FIGS. 9 and 11 are waveforms for shading correction.

This example shows the case where image pickup for the white standard board 97 is conducted with respect to two lines to use this as a reference signal. The first buffer 16 is actively controlled by switch signal VS (FIG. 9B) supplied to the buffer during the period for two lines. As a result, the analog-to-digital-converted white signal is stored in the memory through the first buffer 16.

In normal image read mode, the image signal shown in FIG. 9A is output and digitalized by the analog/digital converting unit 60. This mode allows the memory to be in the read mode, and the second buffer 17 is controlled actively. The reference signal (white signal) read from the memory 19 is converted into the analog signal by the digital to analog converting unit 20, and is used a reference signal for the analog to digital converting unit 60.

Figure 10:
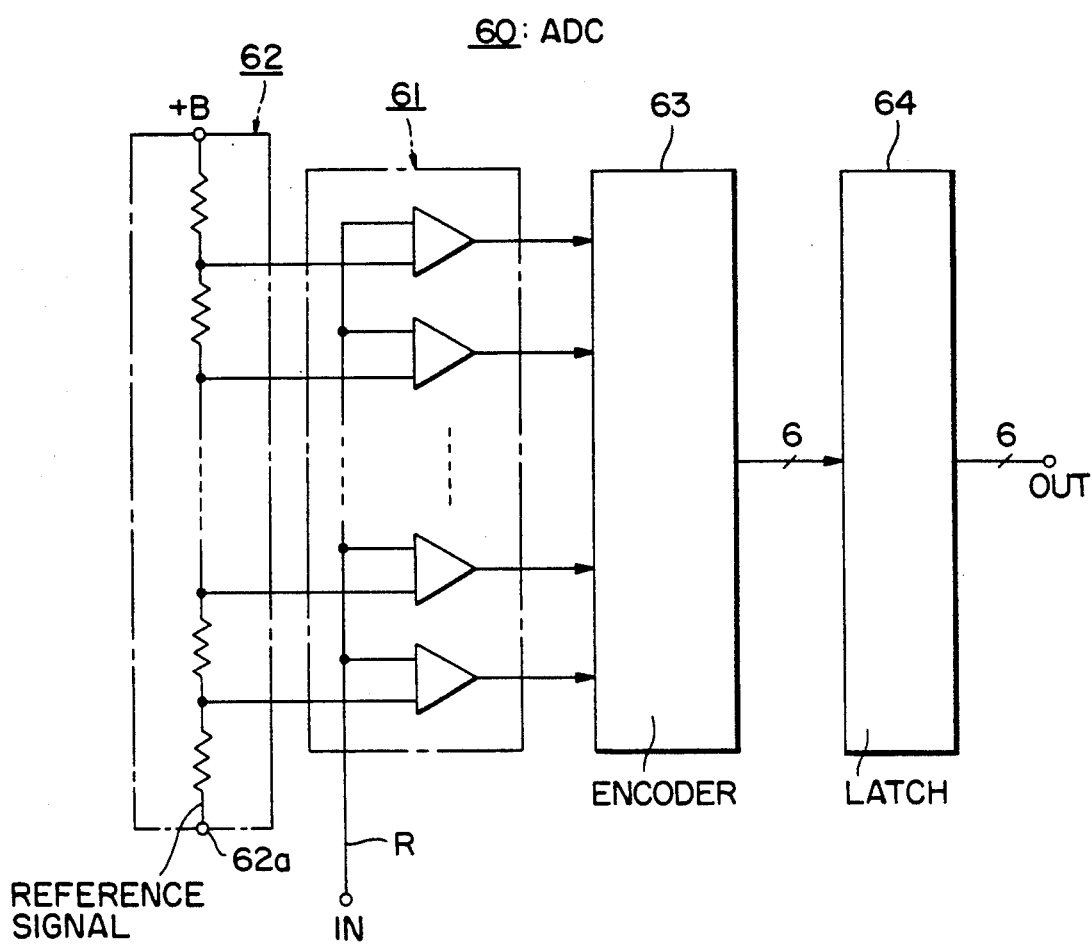
FIG. 10 is a configuration of the analog/digital converter.

FIG. 10 shows that a parallel-type digital analog converting unit is the analog/digital converting unit 60. The said reference signal is applied to each of the parallel type comparator 61. The analog/digital converting unit 60 has 62 is a reference signal forming means consisting of multiple bleeder resistors, 63 is an encoder and 64 is a latch circuit.

To keep the second buffer 17 active in the operation period only, the switch signal and the OR output OR1 of the image valid signal (FIG. 9E) are supplied through the OR circuit 21.

This example shows the case where the third buffer 18 is installed to allow analog/digital conversion with the reference signal at the predetermined level (high level) during the period of horizontal blanking. To keep the third buffer active during the period of horizontal blanking (where the image is not valid), the output OR2 (F in FIG. 9), which has been phase-inverted output OR1 by the inverter 22, is supplied.

Since the reference signal for the comparator 61 is modulated with the reference signal shown in G in FIG. G, analog image data is like one shown in FIG. H.

If the white signals for all the CCD pixels are stored in the memory 19, PRNU correction can be also performed.

Shading correction is done independently for the red channel and cyan channel. For example, if the signal for cyan channel is used for correction by use of the signal for the red channel, there is possibility for larger variation the whit signal output of the cyan channel after the correction.

FIG. 8 presents an example in which analog/digital conversion is done with the reference signal with the reference level of the predetermined level even during the period of horizontal blanking (HBLK). This example is based on the following reasons.

Figure 11:
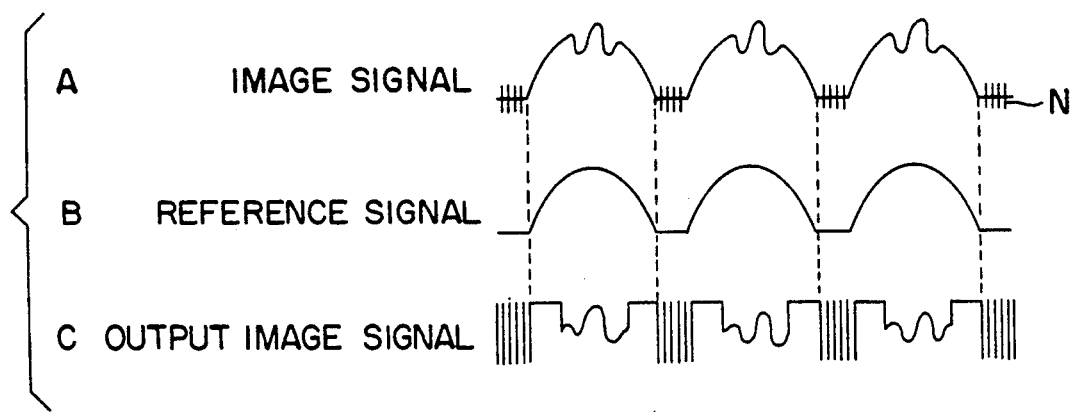

If shading correction data stored in one line memory is applied directly into the reference terminal 62a (FIG. 10) of the analog/digital converting unit 60 for analog to digital conversion during shading correction, especially during the image is valid, the analog/digital converting unit 60's conversion range becomes almost zero, and the input signal has the same potential as the reference signal for shading correction. In addition, the input signal contains the noise N more or less (FIG. 11A).

The analog/digital covering unit 60 has almost zero range of conversion since it performs determination successively according to voltage variation of input image signal and reference signal, the result of the determination is either the maximum value (high level) or the minimum value (low level).

If output varies in a comparatively short period of time due to noises, the comparator and other components of the analog/digital converting unit is turned on or off frequently, resulting in a large current flowing through the analog/digital converting unit.

This variation in current produces a relatively large frequency which is not applicable to the signal waveform, giving a great influence upon the input signal as noise. In addition, since a comparatively large current flows through the supply, there is a small impedance and there is a great possibility for small the power line or grounding line including a larger noise.

The noise attributable to the value of the input signal of the analog/digital converting unit and that of the reference signal (FIG. 11B) for shading correction are mixed up into the black level of the input signal, resulting in a large variation of the black level (FIG. 11C).

This example does not allow noise mixture by preventing the range of conversion from being 0 V at least during the period of black level outside the period when the image is not valid.

The working example uses the full-scale value of the analog/digital converting unit as the voltage level for the period when the image is not valid to prevent the range of conversion from being 0 V and the shaded signal and shading signal form having the same voltage.

In stead of above way, it is also possible to adopt a way of stopping a clock for A/D conversion in the time when reference signal or image signal is in the state of "0".

Figure 12A:
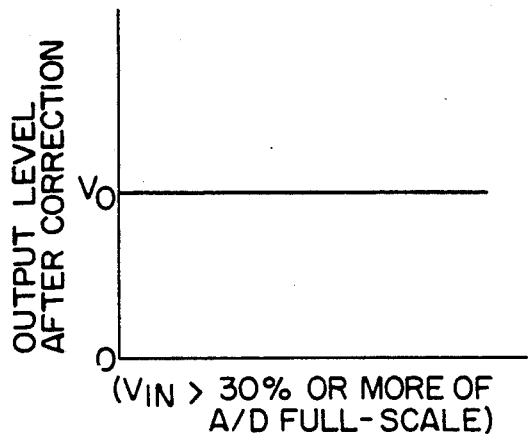
FIG. 12, its descriptive drawing.

These way of correction enables analog/digital conversion and shading correction to be done at the same time. This method enables correction if the white input signal accounts for 30 to 40% of the full scale (FIG. 12A).

Figure 12B:
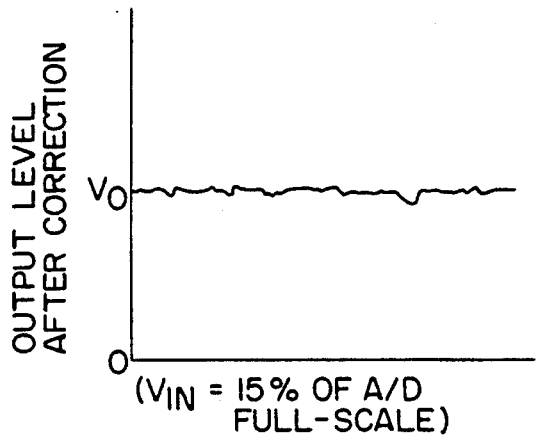

Notice that if the white signal below its limit (for example, generated by decrease in amount of light due to blacking or operation over long period), can be corrected, but the noise is superimposed onto the image signal, which prevents direct use of the image signal (FIG. 12B).

The next step is to conduct color separation (multiple-bit image data) by use of red and cyan output signals after shading correction. The following example shows the case of three colors: black, red and blue.

A conventional way that uses color separation after digitizing the image signal is not appropriate for a variety of signal processing if the fact is taken into account that color-separated data is a digitized signal.

Figure 13:
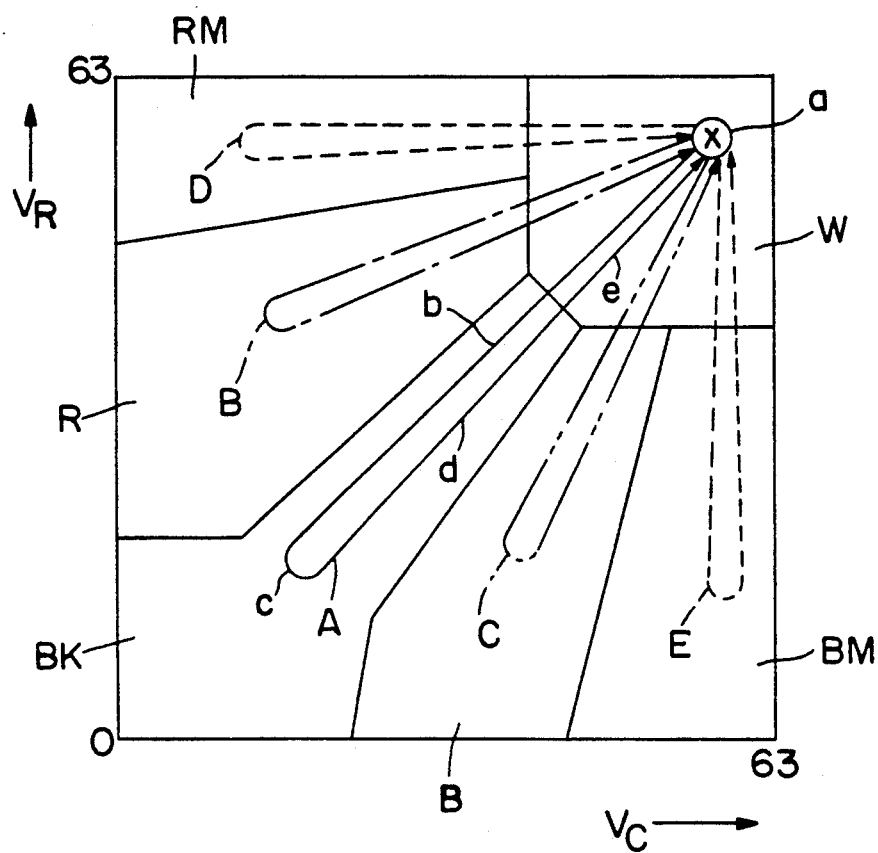
FIG. 13 illustrates one example of color separation maps.

The method of the invention is to perform color separation before the digitizing process. For this purpose, the map as shown in FIG. 13 is provide. The color separation map may consist of an ROM (bipolar ROM as one example). Color codes (colors corresponding to color markers, red, blue, black and white) and density information are stored into the addresses given by 6-bit image data VR and VC with half tone level. That is, One image information = Color code + Density information Next, the consituents of the principal area of the invention, i.e. a portion that detect a color-marker designated region on a multi-color document are here under described in detail.

The color separation map in FIG. 13 illustrates curves representing changes in level resultant from reading on details of an image by using the above-mentioned optical scanning system.

The level of achromatic color is approximately VR = VC, where the white region is in a higher level side.

Figures 14, 15:
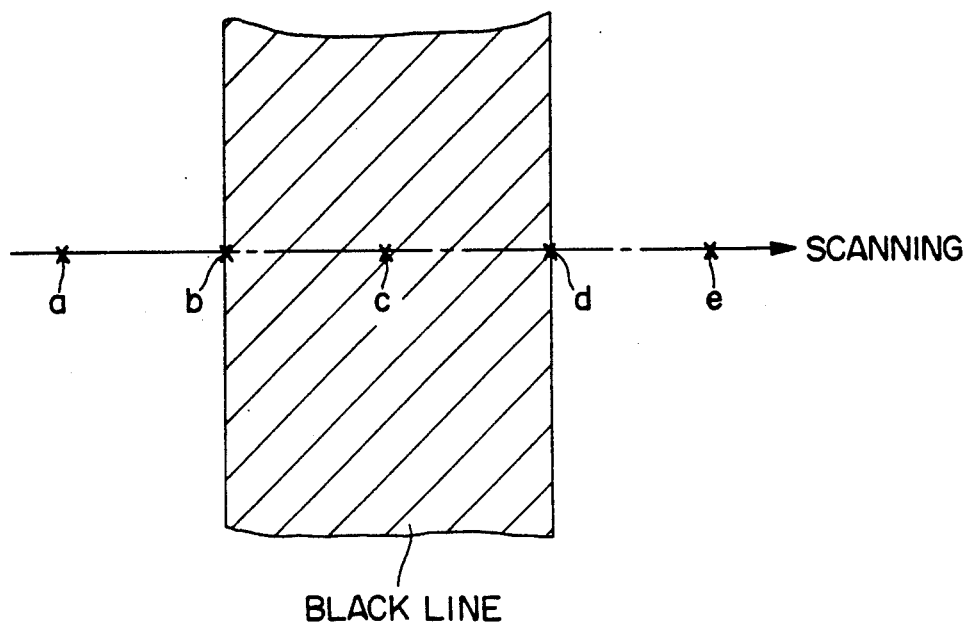
FIG. 14 represents positional relation with the color separation map in the case of scanning black line portion.
FIG. 15 indicates the relation between color code and color region.

When scanning on a black line, as shown in FIG. 14, in the sequence of:
a→b→c→d→e then as shown in FIG. 13 (A), the level varies in the following pattern:

White region→white-black boarder→black region→black-white boarder→white region

The level of a character or line drawing on a white background varies as mentioned above. However, with a color character or the like, VR is not equal to VC. When a region filled with a red pencil or ball-point pen is scanned, the level varies as indicated by FIG. 13 (B).

In contract, a region drawn with a blue ball-point pen or water-based felt-tipped pen exhibits level variation as indicated by FIG. 13 (C).

Correspondingly, the achromatic region is sandwiched between the red region and the blue region.

When using a fluorescent marker of a highly transparent color such as orange and blue, the result is the VR/VC level higher than of ordinary writing utensils, thereby the level is significantly different from that of ordinary coloring utensils.

This tendency is more manifest with a marker of a red-series color rather than that of a blue-series color; the tendency is more apparent with orange color rather than pink color amount various red colors.

In summary, the level change on a marked region will seem as shown by FIG. 13 (D) and (E), thereby it is possible to assign a higher VR level region in the red region to the red marker region, and, separately, to assign a higher VC level region in the blue region to the blue marker.

As described above, using a fluorescent felt-tipped pen as a marker for region designation enables a marker-designated region to be formed even on a color document, and, at the same time, even fives colors rather than three colors can be separated with each other.

The color code corresponding with the respective color ragions are, as indicated in FIG. 15, as follows:

Black: 000, red: 010, blue: 001, white: 011, blue marker: 101, red marker: 110.

For example, a pixel with 30 levels of density in hexadecimal (XXX011110) is red color different from the color of marker, then the pixel is represented by:

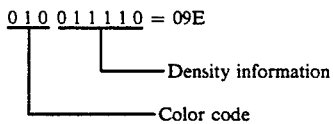

Likewise, red color of marker is represented by:

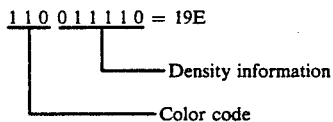

Other colors different from the color of marker are represented by:
Blue=001011110=05E
Black=000011110=01E
White=011011110=0DE Either DE or C0 can be taken for white. In this embodiment, with the consideration for the continuation of density value, white is stored as DE. These data are stored in corresponding addresses, as shown in FIG. 16.

Color codes are 6 kinds of color consisting of white, red, blue, black, red marker color and blue marker color, then the color codes are represented by 3 bits. If there is need for increase in color codes, the number of corresponding bits should be increased.

The density information consists of 6 bits; four bits of which are enough for text information. It is obvious to be able to change the number of bits corresponding to the image considered.

Figure 16:
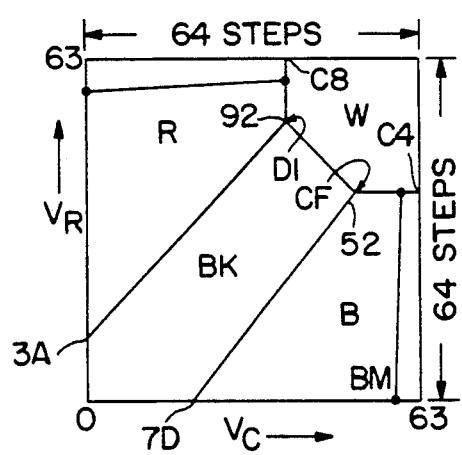
FIGS. 16 and 17A-C illustrate another example of color separation maps.

Boundaries for color separation in FIG. 16 must be determined taking the output variation of the line edge into account; otherwise, unwanted color ghost (kind of incorrect color forming at the edge of back or other letters), is produced.

Generally, color separation boundaries are fixed, causing great variation in color depending on way of boundary setting. This gives a great influence on the separation into multiple colors. To eliminate variations in the results of separation into multiple colors, care must be taken not to allow:

(a) Variations in the light source's emission spectrum
(b) Variations in the lens's chromatic aberration
(c) Variations in cutoff wave length of the dichroic prism With regard to item (a), the halogen lamp does not cause so big problem. Care must also be taken not to allow fluorescent lamps to generate Ar spectrum at lower temperatures, which may sometimes happen. In order to prevent the above generation, it may be necessary to use a lamp heater to keep the temperature of the fluorescent lamp tube constant level.

Item (b) described later.

Problem of (c) is generally attributable to dissatisfactory management of variations in the membrane. It is desirable to allow variations to be in the range of +/−15 nm or more desirable +/−10 nm with respect to the cutoff wave length set; any other value outside the ranges may vary red and black boundary or blue and black boundary in the original image greatly by variations of the prism's cutoff wave length.

This example conducts color separation by use of two signals: VR and VC. Another available method uses color separation axis $f_1$ (VR, VC) and $F_2$ (VR, VC). In using color separation axes in calculation, the generation of isolated noises with different colors, which is liable to happen due to different address, must be taken into account if noises are superimposed onto VR and VC.

To pick up a certain color or any other colors than And, blue and black, the color separation maps are prepared which is different from those in this example, so that one of them can be chosen as required. Another method is to install color separation ROM (ROM pack, practically) which can be replaced.

Figure 17A:
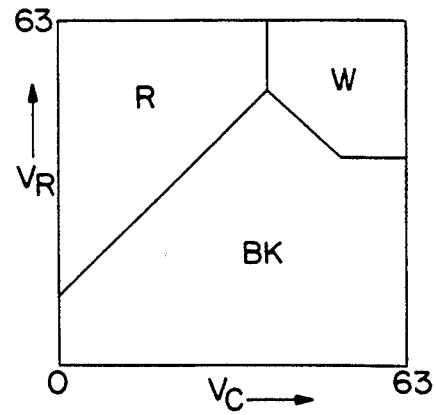
Figure 17B:
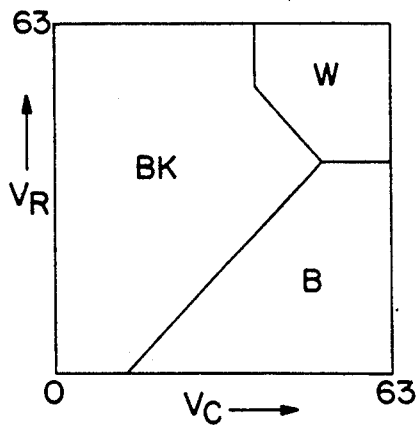
Figure 17C:
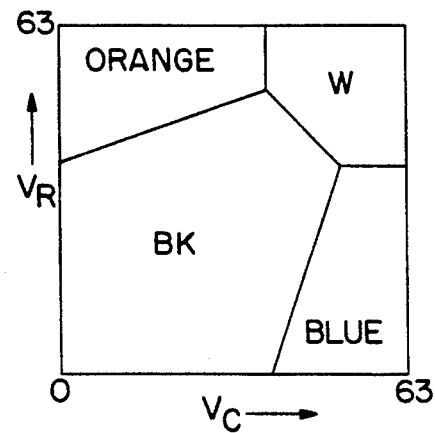

FIG. 17-A, -B show 3-color maps, and FIG. 17-C shows a map used for color separation of only red and blue markers.

Next, the color ghost correcting circuit 300 is described. This circuit is used to eliminate color ghost for image data colors of which have been separated.

There are many causes for color ghost generation; major of which are:

(1) Discrepancy in two CCD pixels (due to dissatisfactory mounting accuracy and ageing);
(2) difference in cyan and red image multiplications;
(3) difference in cyan and red output levels attributable to lens's chromatic aberration; and
(4) noises.

Figure 18:
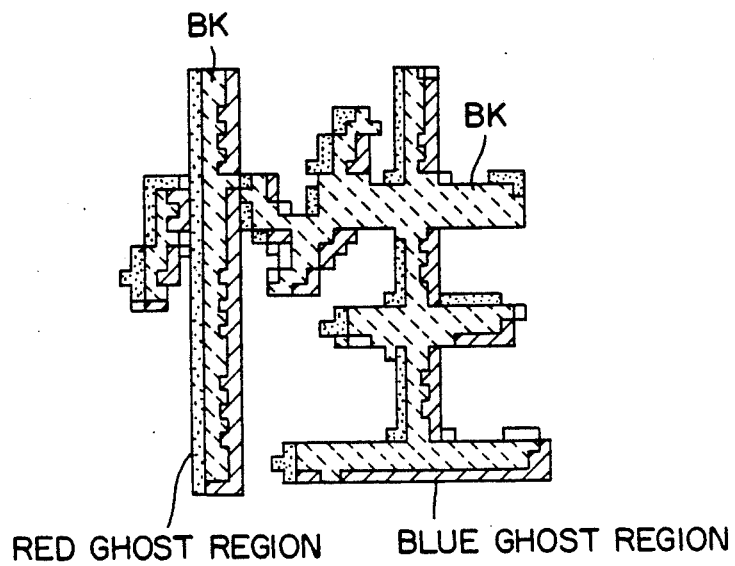
FIGS. 18 and 19 show descriptive illustrations for color ghost. Likewise.
Figure 19A:
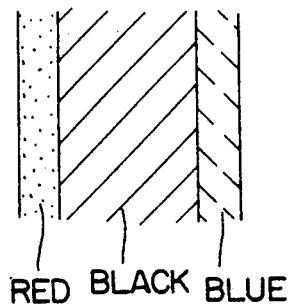
Figure 19B:
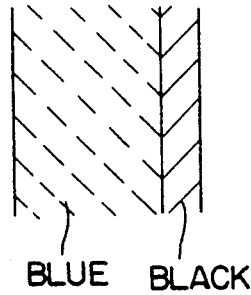
Figure 19C:
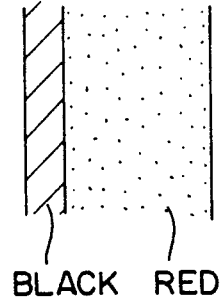

FIG. 18 shows an example of color ghost generation. In this example, Japanese letter "性 (sei, sex)" is picked up and color ghost generated after color separation is shown when the deviation takes place by ¼ pitch between CCD's for cyan and red. This example depicts that the color ghost of red and blue appears at the edge of black line, that of black appears at the edge of blue line, and that of red appears at the edge of red line, as shown in FIG. 19-A through -C.

Other color combinations produce different color ghosts.

Take the above example to show the appearance of such color ghost.

Figure 20:
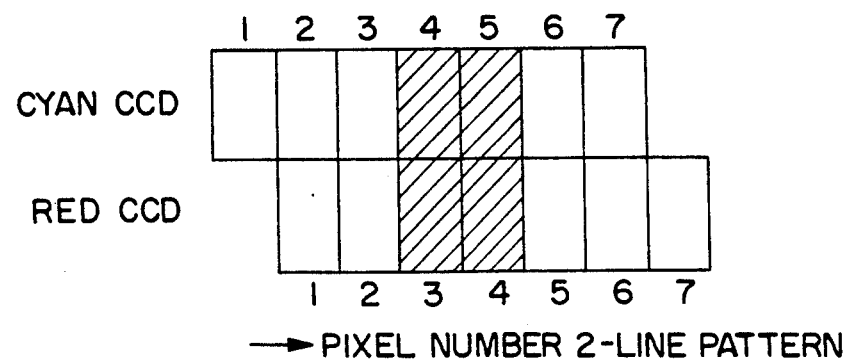

(1) Discrepancy or deviation in two CCD pixels (See FIG. 20 and 21)

When performing color separation after picking up the image of line portion such incorrect positioning of CCD pixels as shown in FIG. 20 will cause the appearance of red/blue ghost at the edge of black line, black ghost at the edge of blue line, and black ghost at the edge of blue line as shown in FIG. 21.

To prevent them, no discrepancy is allowed in arrangement of two CCD pixels. Usually, arrangement should be made within one pixel, or more desirable, ¼ pixel. This example has realized this by use of a jig to arrange these pixels precisely and by use of adhesive to adhere them.

Figure 22:
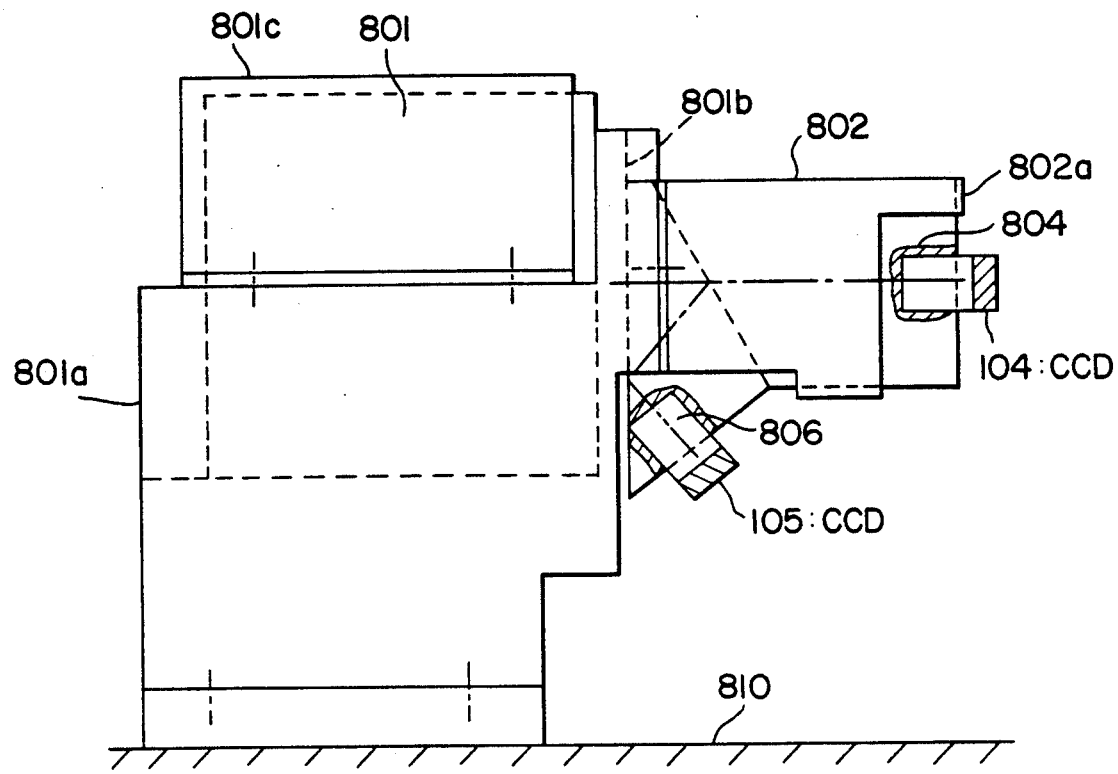
FIG. 22 is a configuration of a CCD mounting apparatus.

FIGS. 22 onwards show an example of this method.

The lens mirror body 801 is housed in the V-letter section opened vertically toward the top of the support material 801a, and then fixed by the clamp fitting 801c, and mounted onto the predetermined position of the unit board 810.

The support material 801a rear side is equipped with mounting surface 801c that allows the prism 802 front side to stay. The prism 802 supported by the mounting material 802a can be fixed to the mounting surface 801b by screws.

The mounting surface 801b has been produced by a simple machining process and provides extremely high accuracy of both distance to the lens mirror body 801 and perpendicularity for its light axis. This enables correct image forming, from the predetermined light image, on the light receiving surfaces of the CCDs 104 and 105 through the prism 802.

Figure 23:
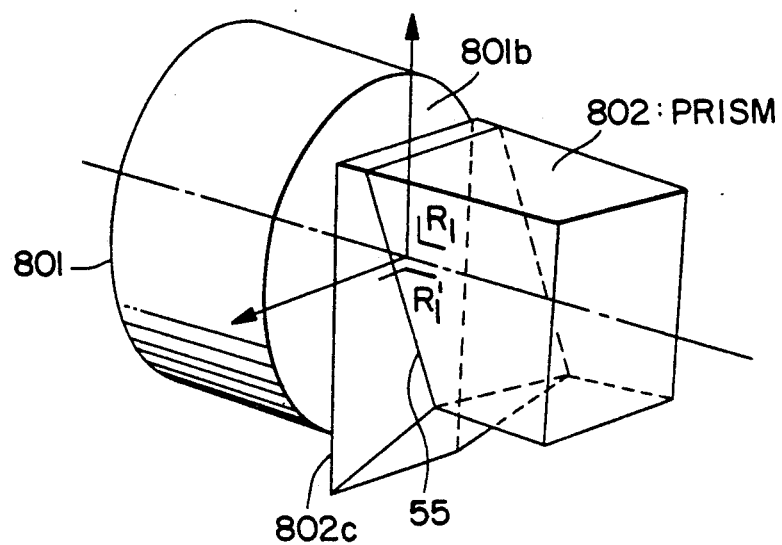
FIG. 23, the configuration of its key part.

As shown in FIG. 23, the discrepancy in the plain squareness R1 and R1' (inclination of the plain square R1 and R1' of the dichroic surface for the lens axis) dichroic surface produced by the plain 801b perpendicular to the light axis of the lens mirror body 801 and the plain 802a facing the lens of the prism 802 is given by the resolution MTF obtained by the signal output of white/black lines for the white background, like:

$$MTF = (y-x/y+x) \times 100\%$$

An inclination of 10' (minutes) means a decrease of 9% and an inclination of 30" means a decrease of 15% or more, preventing smooth pickup of white/black discrimination signal. Thus, holding a satisfactory surface accuracy is very important (one possible construction is to have the prism surface contact with the edge of the lens mirror body).

CCDs 104 and 105 for the prism 802 are fixed by adhesive via the mounting materials 804 and 806.

Figure 24:
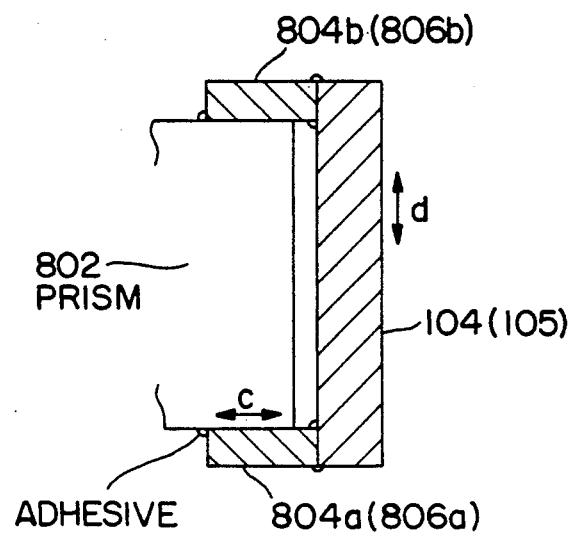
FIG. 24, a cross-section of part of the apparatus.

FIG. 24 shows a working example for the cross section of the key part. In this example, CCDs 104 and 105 are fixed to the image forming section via the mounting materials 804a and 804b fixed symmetrically on the both ends of the prism 802 by use of adhesive.

Mounting materials should have a small coefficient of linear expansion because: (1) this prevents pixel discrepancy that may happen by change in temperature must be prevented and (2) this prevents occurrence of cracks on the prism caused by internal distortions of mounting materials due to difference in coefficients of linear expansion of mounting materials.

Pixel discrepancy due to change in temperature can be reduced by providing the same requirements as each CCD mounting material; but a smaller coefficient of linear expansion is more desirable.

Usually, a coefficient of linear expansion is $7.4 \times 10^{-6}$ (in case of optical glass BK-7). This implies that use of ceramic materials (coefficients of linear expansion of 7.0 to $8.4 \times 10^{-6}$), alloys with lower thermal expansion (e.g. invar alloy with coefficients of $1-3 \times 10^{-6}$), niresist (coefficients of $4-10 \times 10^{-6}$) is desirable, but use of aluminum material ($25 \times 10^{-6}$) is not desirable.

The above working example uses adhesive to fix the prism with the mounting material, and the mounting material with CCD. The example uses the method of two steps adhesion, wherein they are fixed and adhered after the adjustment of each CCD position, after adhering the mounting material, as shown in FIG. 24. In this figure, even iron with a larger coefficient ($12 \times 10^{-6}$) of linear expansion is not influenced by heat because of short length in the c direction. The d direction is the direction of line sensor arrangement. The prism and line sensor package use the same ceramic material, with the same coefficient of linear expansion. This construction has not produced pixel discrepancy.

Adhesive of double-liquid type and optically-hardening adhesive are desirable; and ultraviolet-hardening adhesive is the most desirable.

Optically-hardening adhesive quickens hardening time of adhesive simply by optical intensity, allowing ease of work, and cost reduction and product stabilization. Ultraviolet-hardening type provides almost no thermal change and ensures stable hardening.

Ultraviolet radiation from a high-voltage mercury lamp on Three-Bond TB3060B (registered product name), Denka 1045K (registered product name) and Noland 65 (registered product name) has produced satisfactory results.

Use of urethan Three-Bond of ultraviolet hardening type 3062B (registered product name) and LT350 (registered product name) has provided an improved resistance to humidity and ensured strength compensation.

By use the above method, pixel discrepancy was reduced within $7/4 = 1.75\mu$, where one pixel is $7\mu$.

(2) Discrepancy of cyan-image and red-image multiplication

Figure 25:
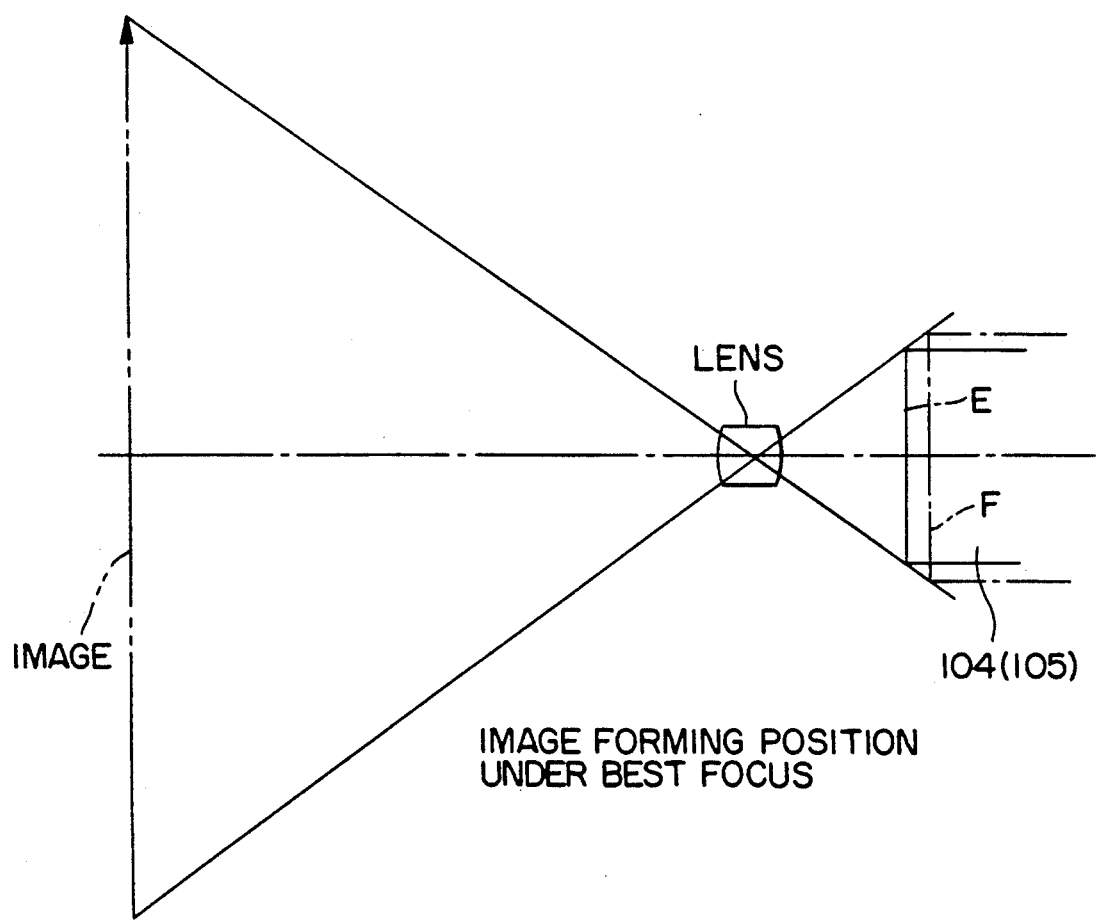

Influence of chromatic aberration of lens must be taken into consideration when copying a color document. Chromatic aberration of lens appears especially at higher image portions since the position F where cyan image is formed differs from the position E where red image is formed in conducting separation into optical wavelengths of cyan and red colors, as shown in FIG. 25. For some lenses this results in a discrepancy of a single pixel.

In the case of using an achromatic lens, it may be necessary to adjust the wavelength conforming chromatic aberration on optical axis between 400–540 nm and 620–700 nm.

Incidentally, since the flatness of prism also has a relation with the above, it may be necessary to obtain the flatness higher than at least $\lambda/4$. If using a prism having a lot of reflection surface, the flatness higher than λ/8 may be required.

(3) Difference in cyan and red levels

Without design for improvement of lens's chromatic aberration, MTF values for cyan and red colors may become larger due to large chromatic aberration. Practically this appears difference in output signal level of CCD.

In order to improve this, it may be preferable to adjust the wavelength conforming chromatic aberration on optical axis as mentioned above. Optimum value may change due to the combination with the light source.

Assume that 6-bit analog/digital quantization is conducted in picking up a black line, cyan and red output signal levels should be such that:

$|Vr - Vc| \leq 10$ (levels), or more desirable, $|Vr - Vc| \leq 6$ (levels), by paying an attention in mounting CCDs.

This will reduce color ghost in some extent. However, complete elimination of color ghost is almost impossible when considering variations in performance of lenses mass-produced and variations CCD mounting precision.

As a result, electrical correction of color ghost is made by use of color codes after color separation.

To eliminate color ghost, the color pattern method is used since color ghost appears with a fixed color for the original color like:

Original: Black→Color ghost: Red and blue
Original: red, blue→Color ghost: Black With the color pattern method, the original color can be identified by knowing how a color for a certain pixel and those for its surrounding pixels appears (pattern).

FIG. 26 shows an example which determines the color pattern of the target pixel and its surrounding pixels, and the color of the target pixel to be determined at that time.

For No. 1 which has a color pattern of white and black at its edge, the blue color of that pixel is assumed to be a color ghost produced at the black edge. Likewise, for No. 3, red is assumed to be color ghost of black color. Accordingly, for Nos. 1 and 3, that pixel color is changed from blue or red to black.

On the other hand, for Nos. 2 and 4, no color ghost occurrence is assumed, and the color of that pixel is directly output without being changed.

It is difficult to implement such processing by use of an arithmetic circuit. In effect, this example uses LUT (look-up table) in ROM form. One or two-dimentional system can be used for color pattern. Assuming that the number of colors be N and the number of surrounding pixels including that pixel M, the size of color pattern size is:

$N^M$

This means that use of the 2-dimensional system increase M extremely and is not practical. In other words, use of the 2-dimensional system can provide less surrounding pixels in both primary and secondary directions, with demand for more patterns. FIG. 27 indicates the relationship between size and color pattern.

This example uses single-dimensional color patterns of a size of 1×7 (N=4, M=7) and conducts color ghost elimination in the primary scan direction and in the secondary scan direction, independently.

In this embodiment, color separation process is to be carried out for six kinds of colors including colors of markers. However, in the case of color ghost elimination process, lower two bits is used without using upper one bit. Consequently, the size of N is N=4.

Since there is no difference between color ghost appearance in the primary direction and the secondary direction, the example uses the same color pattern both in the primary scan direction and secondary direction.

This examples uses a color pattern with a size of 1×7, as described above; however, use of color patterns with smaller sizes, like one with 1×5, is possible. The color pattern with a size of 1×5 can eliminate color ghost of a single pixel, while the color pattern with a size of 1×7 can eliminate color ghost of two pixels.

If a color pattern with a size of 1×7 is used, the combination of the lower two bits in the color code is entered as an ROM address. For such color pattern as:

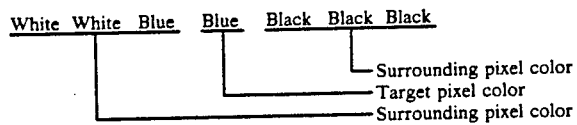

as the pattern of color code, the lower two bits of the color code are used:

| White | White | Blue | Blue | Black | Black | Black |
|---|---|---|---|---|---|---|
| 11 | 11 | 01 | 01 | 00 | 00 | 00 |

And the address is:
3D40
As shown in FIG. 26, the address contains the black code:
00
By use of this, table look-up work is made.

Since a 14-bit address is required for a pattern of 1×7, a bipolar ROM should meet the demand for entry of an address of 14 bits and a color code of 2 bits. However, bipolar ROMs with such a large capacity cannot easily found and would be very expensive if any.

The working example shows the case where ROM is searched by the first one pixel, and six other pixel codes are used to perform table look-up work. In other words, this example calls for two ROMs; the first of which starts with black and blue, while the second of which, red and white.

The first ROM (black/blue ROM)
Leading code: BK (black) (00), BL (blue) (01)
Address contents
00000000000000 (BK BK BK BK BK BK BK)
.
.
.
00111111111111 (BK W W W W W W)
01000000000000 (BL BK BK BK BK BK BK)
.
.
.
01111111111111 (BL W W W W W W)
The second ROM (red/white)
Leading code: R (red) (10), W (white) (11)
Address contents
10000000000000 (R BK BK BK BK BK BK)

-continued

```
1011111111111 (R W W W W W W)
1100000000000 (W BK BK BK BK BK BK)
.
.
1111111111111 (W W W W W W W)
```

Since the color pattern of FIG. 26 starts with white color, the second ROM is selected.

A higher-speed, larger-capacity ROM may have all the color patterns. Another way is to use four ROMs which is selected for starting pixel for table look-up work.

One available high-speed, large-capacity bipolar ROM is MB7143/7144 produced by Fujitsu, Ltd.

With a lower-speed, large-capacity EPROM, data are transmitted to multiple SRAMs prior to operation, through which color ghost correction can be made.

FIG. 28 shows and example of the color ghost correcting circuit 300. This color ghost correction is made both in the primary (horizontal) scan direction and the secondary (vertical) scan direction.

This example shows the case where color ghost correction is made in both the horizontal and vertical scan directions by use of image data for 7 pixels in the horizontal direction and 7 lines in the vertical direction.

The color ghost correcting is made only for color codes of the image data.

The lower two bits of the color codes read from the color separating ROM are first supplied to the ghost correcting circuit 300A in the output scan direction in the undermentioned example. As a result, color code data are supplied successively to the shift register of 7 bits for parallel operation. This parallel color code data of 7 pixels is supped to ROM for color ghost eliminating in the horizontal direction where ghost elimination is performed for each pixel. This is a description of an example of use of ROM302. Upon the completion of ghost processing, the latch circuit 303 is used to latch operation.

On the other hand, the density data from the color separating ROM is supplied to the latch circuit 306, through the shift register 305 (7-bit configuration) for timing control, in which data transfer requirements are determined so that color code data followed by density data in serial data.

To the line memory 310 in the color ghost compensating circuit 300B, serial processed color code data and density data are supplied.

The line memory 310 to eliminate color ghost in the vertical direction uses 7-line image data. A 8-line memory is used for real-time processing. Of course, a 7-line memory can be used for real-time processing.

A 8-line color code data and density data are separated by the gate circuit group 320 installed at the later stage. The gate circuit group 320 provides gate circuits 321 through 328 corresponding to line memories 311 through 318.

Output data controlled for simultaneous operation by the line memory 310 is separated into color code data and density data by the gate circuit group 320. These separated color code data are supplied to the selecting circuit 330 where 7 (of 8)-line color code data is selected for use of color ghost elimination. If line memories 311 to 317 are once selected, line memories used are successively shifted to 312 to 18 at the next step, and so on.

Selected 7-line memory color code data controlled for simultaneous operation is supplied to the next-stage ROM 340 for ghost elimination in the vertical direction, where color ghost is eliminated.

Then, latch is conducted by the latch circuit 341. The upper one bit of the color code is adusted it's timing, thereafter the upper one bit is combined with the code of the lower two bits and then is outputted as three bit data.

On the other hand, the density data separated by the gate circuit group 320 is supplied directly to the latch circuit 342, where it is timing-adjusted with color code data before being output.

The next description is related to the resolution correcting step given as another example of image processing.

This resolution correcting has been designed for being conducted after color separation.

The conventional color separation used to be conducted after digitizing image data as described before, and this calls for resolution correction prior to the digitization. Color image processing apparatus with this method of color separation use multiple CCDs to pick up color-separated images on the document and must perform resolution correction for each CCD output. In other words, multiple circuits are needed for resolution.

In addition, optical lens's MTF is not the same for each color separation work, making MTF correction parameters different for each resolution correction circuit.

This invention conducts resolution correcting after color separation but before digitization. The information to be handled is one, so this way of color separation provides advantages for practical use including compactness of circuit size and simple procedure for determining auxiliary parameters.

Generally, deterioration of MTF in recording and reproduction of image is attributable to the problems of:
 (1) Optical system
 (2) Optical travel system
 (3) Processing circuit
 (4) Recording system Problem (1) is related to the deterioration of optical performance attributable to lens' MTF (for wavelength range, change for image height, allowance for image forming position and precision accuracy), prism surface precision, CCD mounting precision, CCP chip warp, and spectral change of light source.

Problem (2) is related to optical mirror vibration and change in travel speed.

Problem (3) includes signal waveform distortion attributable to capacity of the analog circuit, especially, signal distortion caused when passed through the transmission line.

Problem (4) is related to:
Laser beam diameter and shape
Toner characteristic of development onto light-sensitive drum (amount of toner adhered, toner density, toner grain diameter, toner color, etc.)
Transfer characteristics (transfer ratio and transfer characteristics onto transfer paper)
Fixing characteristic (toner diameters before and after toner fixing)

Among major problems are those related to optical and optical travel which provide direct influence on the deterioration of resolution.

Figure 29A:
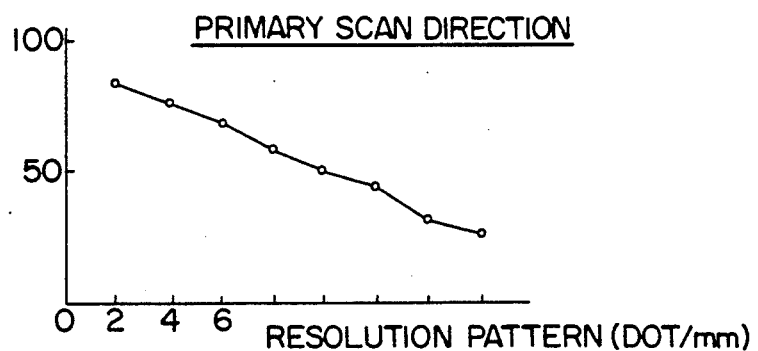
FIGS. 29 and 30 are characteristic drawings used for explanation of resolution correction.
Figure 29B:
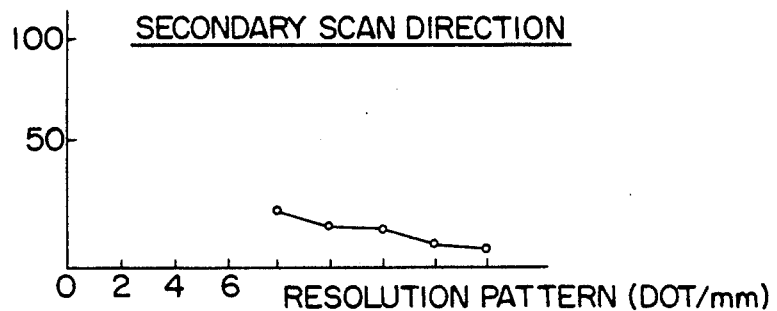

FIG. 29 shows MTF values (before correction) in both the primary and secondary scan directions. These characteristics are measured values obtained when white/black patterns with space frequencies of 2 to 16 dots/mm have been scanned.

In this case, MTF has been defined as follows:

$$MTF = (W - BK)/(W + BK) \ (\%)$$

where W indicates white signal, and BK, black signal.

As revealed in FIG. 29, deterioration in MTF is more obvious in the secondary scan direction than that in the primary scan direction. To perform correction in similar extent, amount of correction in the primary direction is to be twice to four times that in the secondary direction.

MTF of 30% or more is needed to improve reproduction of fine lines of image. As a result, a convolution filter that uses N×N (N=3, 5, 7) pixels image data can be used as a resolution means to perform correction in similar extent in both direction while keeping satisfactory reproduction of fine lines as a resolution correction means by weighted addition of the target pixel and its surrounding pixels.

This example is explained by using 3×3 - arranged filter, from the view of practical use.

Matrix representation of filter components (left) and their corresponding pixel positions (i, j) (right) is as follows.

$$\begin{bmatrix} a & b & c \\ d & e & f \\ g & h & i \end{bmatrix} - \begin{bmatrix} (i-1, j-1) & (i-1, j) & (i-1, j+1) \\ (i, j-1) & (i, j) & (i, j+1) \\ (i+1, j-1) & (i+1, j) & (i+1, j+1) \end{bmatrix}$$

Look at eight pixels surrounding (i, j) pixel density Iij. Given new density value Iij for (i-1, j-1) to (i+1, J+1):

$$Iij = \sum_{\pm \Delta} Ii + \Delta \cdot j + \Delta \times Ci + \Delta \cdot j + \Delta$$

where C i+Δ·j+Δ is a filter coefficient, taking C i+Δ·j+Δ=a, b, c ... i, and in the example, Δ=1.

An example of filter coefficient to conduction a practical correction is:

$$\frac{1}{2} \begin{bmatrix} 0 & -2 & 0 \\ -1 & 8 & -1 \\ 0 & -2 & 0 \end{bmatrix} \rightarrow \begin{bmatrix} 0 & -1 & 0 \\ -0.5 & 4 & -0.5 \\ 0 & -1 & 0 \end{bmatrix}$$

To provide larger correction values, appropriate filter coefficients should be set in accordance with the correction. These filter coefficients are so arranged to provide larger correction in the sub-scanning direction as mentioned above.

Figure 30A:
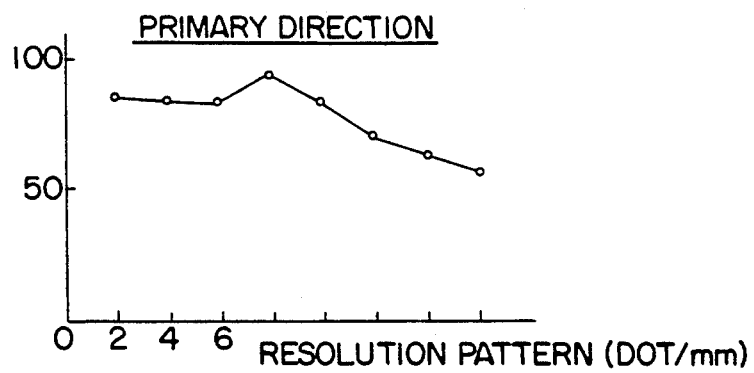
Figure 30B:
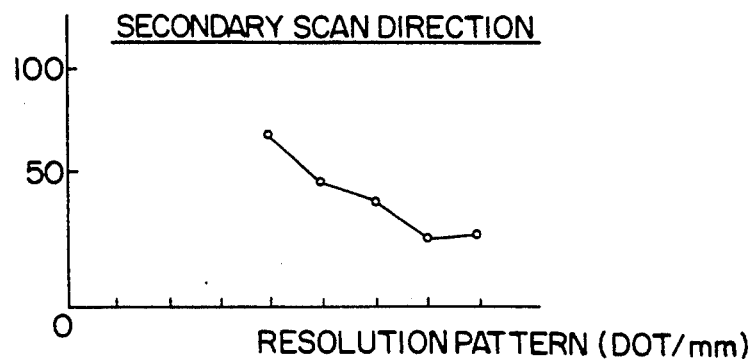

FIG. 30 presents results of correction by use of the convolution filter with the above correction coefficients.

Figure 31:
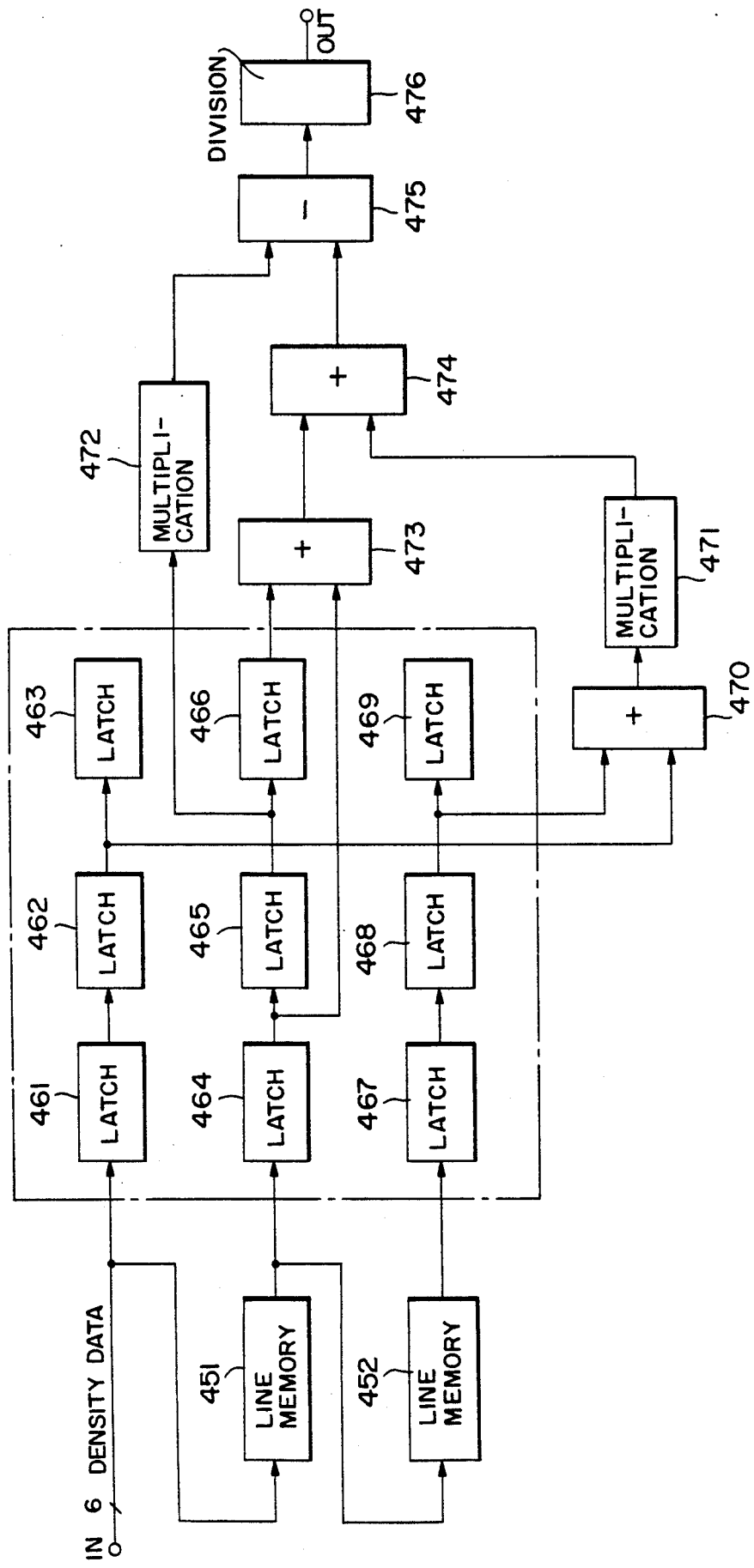
FIG. 31 is a block diagram for the resolution correction means.

FIG. 31 shows an example of block diagram of the resolution correction means 450 using this convolution filter.

This block diagram with a 3×3 matrix uses two line memories 451 and 452 along with 9 latch circuits 461 to 469. The first adder 470 and the multiplier (bit shift circuit) 471 are used to perform convolution of (1-row, 2-column) and (3-row, 2-column). The second adder 473 is used to perform convolution of (2-row, 1-column) and (2-row, 3-column). Likewise, the multiplier 472 with a 3-bit shift circuit is used to perform the operation of (2-row, 2-column). And then, these calculation outputs are subjected to addition and subtraction process by using the third adder 474 and subtracter 475, thereafter the calculation result is further fed to divider 476 of ½ for normalization (in this example, ½).

By performing these operation new density values, the following are some modifications of the resolution correction means 450.

Addition or multiplication can also be done by use of an ROM.

This example conducts resolution correction after color ghost processing; however, it can be done at any stage between color separation and multivaluing.

The line memory can be constituted to utilize commonly one for color ghost correction.

Resolution correction can be done at the same time as control so as to lower laser beam power for image recording. This improves reproducibility of fine lines. The output unit 700 to be described later (no specific example presented for the unit) has a selection switch on its operation/indicator section 202 to perform resolution correction and power adjustment at the same time.

In the case of multivalued record, if MTF correction is too strong, multivaluing effect will be reduced and the corrected image will become binary image. Then, it may be necessary to make a suitable balance between the multivaluing level and MTF correction.

The next example of image processing is a partial color conversion.

Partial color conversion is an editing method in which image in the region specified by color maker or outside the region is copied in the marker's color.

Conventional method is to perform positioning by use of a digitizer. Then, scanning is performed for an original picture. Operation of switches for positioning data entry is made for every time of positioning. The positioning is made not for all shapes but for a square or rectangle.

Figure 32A:
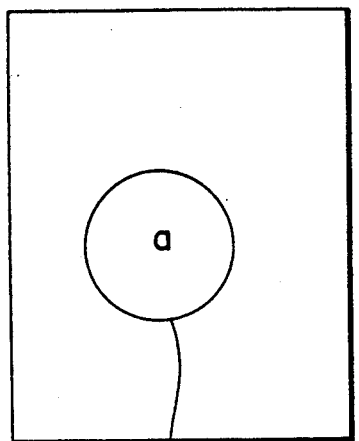
FIGS. 32 and 33 present descriptive illustrations for partial color conversion.
Figure 32B:
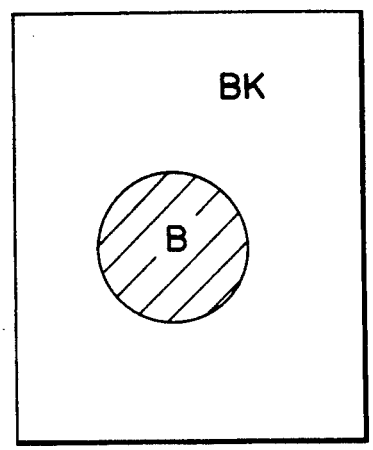
Figure 33A:
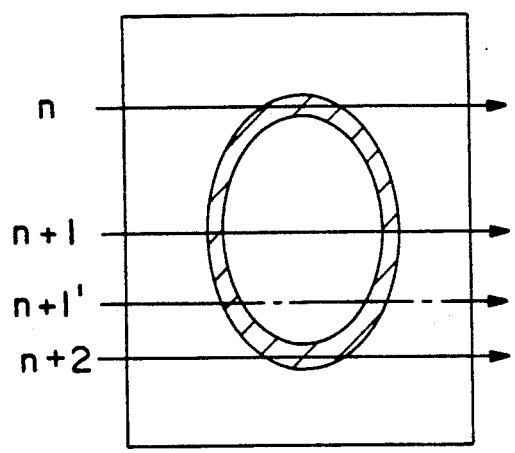
Figure 33B:
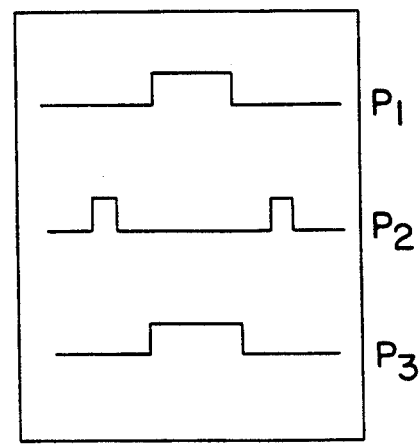
Figure 33C:
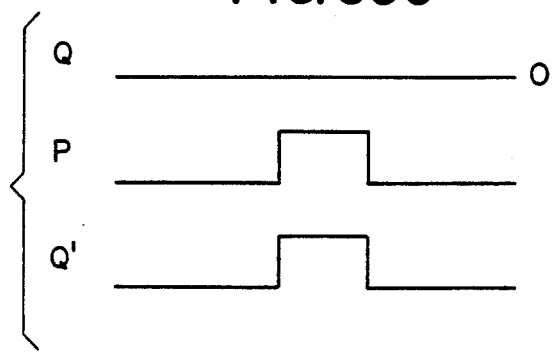
Figure 33D:
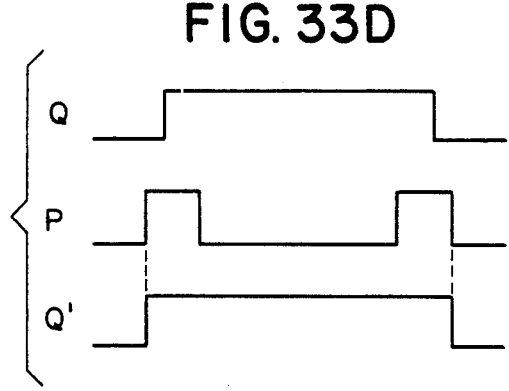
Figure 33E:
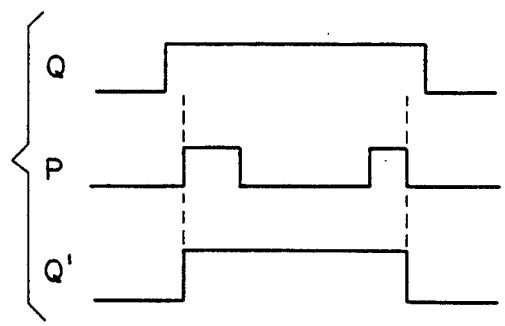
Figure 33F:
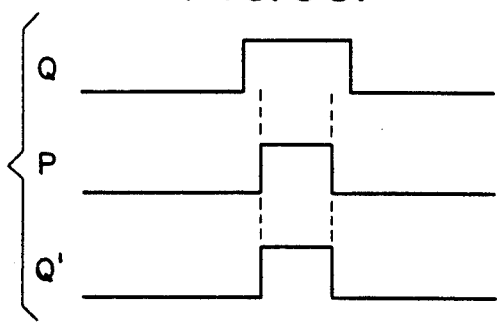
Figure 33G:
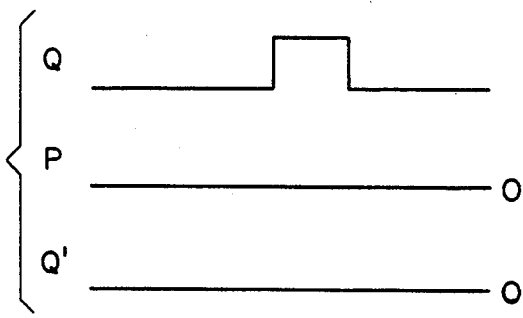

The partial color conversion described below allows an arbitrary region (indicated by a marker) to be copied in the marker's color. For example, specifying the region a by a blue marker, as shown in FIG. 32, the region a is automatically detected and the image in the region a is copied in the marker's color blue. The outside of the region a is copied in white/black color. The marker color can be red.

Color marker detection, as well as detection of the region designated with a color marker are hereunder described referring to FIG. 33.

Oval-patterned marking with a color marker (FIG. 33-A) results in different patterns of color marker signals (FIG. 33-B) corresponding with lines "n" through "n +2".

Marker signals P1, P2, and P3 are obtained, correspondently, on lines "n" through "n+2". The following description is given referring to signal Q that indicates a color-conversion area after a preceding line has been detected and processed (FIG. 33-C).

A block, where the level of region signal Q is "1", is an image region to be performed an image processing, such as color conversion and so on.

As shown FIG. 33-C, the region signal Q' is made to be "1", corresponding to the region where marker signal P is "1".

In the case where the region signal Q of the previous line is "0" and the region signal Q' of the current line is "1", this condition indicates that the region designated with the marker firstly appears with the current line as the start point of the marked region, then this processing in this condition is called hereinafter as "heading process".

In the case where the region signal Q of the previous line in "1" and the block confined with the marker signal P being "1" of the current line is in continuation, the region signal Q' of the current line is made to be "1". This processing in this condition is called as hereinafter as "continuing process".

In this case, a region designated with a marker can be either gradually wider (FIG. 33-D), or gradually narrower (FIG. 33-E); or combination of wider and narrower portions.

When a narrow region in FIG. 33-E is still narrower, the marker signal pulses P are converted into a single pulse as shown in FIG. 33-F.

When the designated region is further narrower, a situation reverse to the "head detecting" in FIG. 33-C occurs. That is, the conversion region signal Q' is "0" and the region the terminates as shown in FIG. 33-G.

In each of the examples in FIG. 33-C through -G, the description was made on the case where the number of regions designated by a color marker is only one. However, an actual document has a plurality of such regions, and the signal processing operation covers combination of these examples.

Depending on the density or blurring on the marking, the marker signal P may have signal incontinuity, blurring, or noise.

Accordingly, correcting the marker signal is mandatory to eliminate these irregularities.

As described above, two steps of detection operation can detects a designated region, they consists of "head" detection of an independent closed region (detection of the initial position, FIG. 33-C), and detection of "continuing process" (FIG. 33-D through -F).

For a region solidly painted with a color marker, "head" detection operation is continuously repeated, and detection continues as long as this region continues. To sum up, according to this technique, region sampling is available both for the closed region and the region solidly painted with a color marker.

To copy with a specific color the image in the specific region a designated with color marker, it is necessary to detect blue (or red) marker signal BP (or RP) (actually, color code data) of marker signals indicating color marker region, and region signals QB' (or QR') indicating inside of the region a, as illustrated in FIG. 32.

This is realized by installing the color data processing circuit 500B along with the region extracting circuit 500A, as shown in FIG. 1. The color data processing circuit 500B is intended for selecting density data of development color that corresponds to the copy sequence (development sequence) for partial color designation, and for selecting density data of development color that corresponds to the copy sequence for ordinary copy operation.

Figure 34:
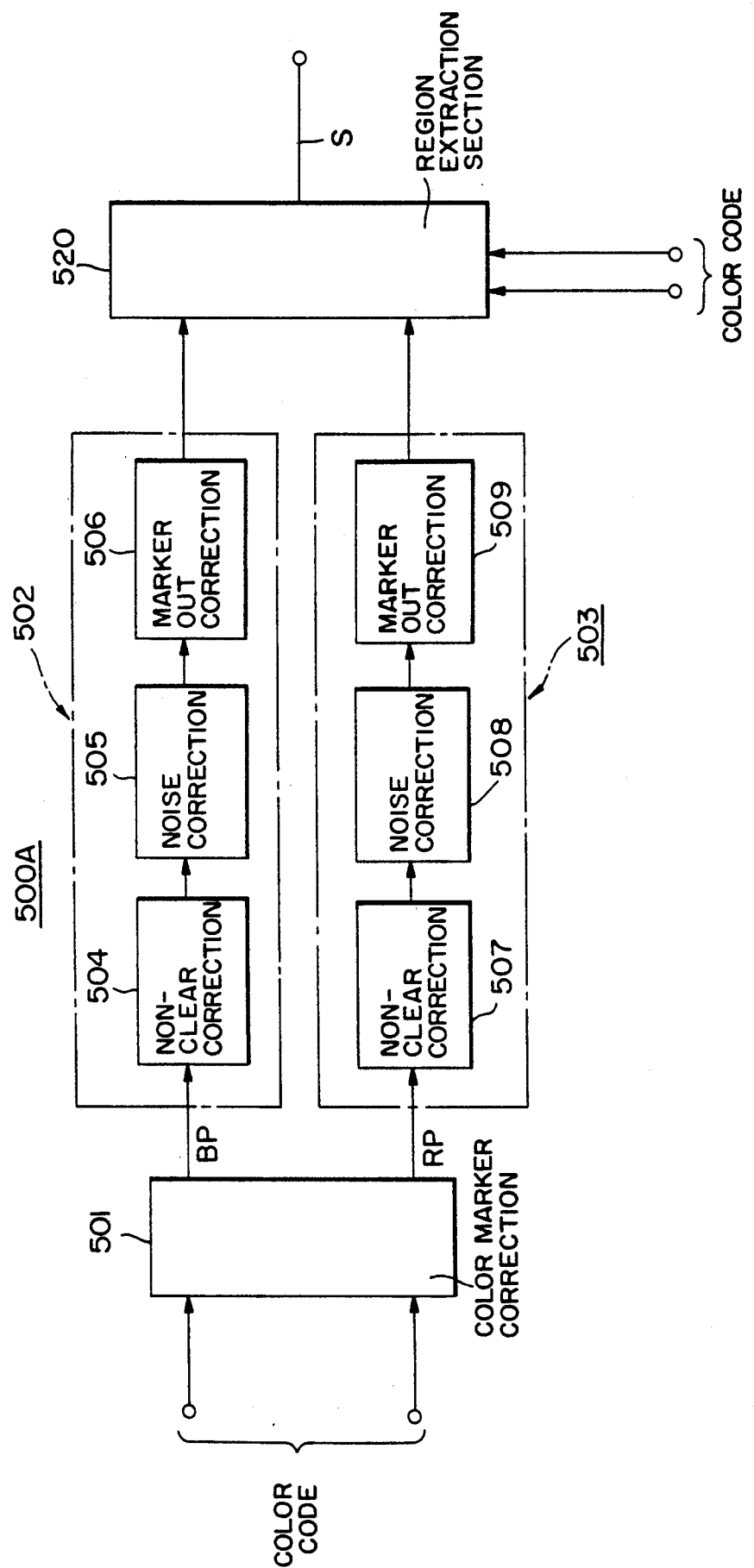
FIGS. 34, 35 and 36 show block diagram for the region extracting circuit, marker detecting circuit, and region extracting assembly, respectively.

FIG. 34 presents the specific examples, for correcting unclearness and irregularity of the marked portion. Each bit for color code data obtained by scanning color marker is supplied to the color marker detecting circuit 501, color marker is detected from the upper bit and the presence of a specific color marker is detected from the lower two bits. The working example presents the case where two colors, red and blue, are used for markers, and the marker signals BP and RP are detected.

The marker signals RP and BP are each supplied to the pre-processing circuits 502 and 503, respectively, so that they are marker signals dedicated to the designated region. The pre-processing herein means a kind of signal-waveform shaping. The working example presents the pre-processing circuits 502 and 503 consisting of the circuits 504 and 507 to correct portions not clear, and the noise correction circuits 505 and 508 (both in the primary scan direction) and in the circuits 502 and 503 to correct marker breaking in the secondary scan direction, and pre-processing circuits 502 and 503. In the correction of color marker which is not clear, a color marker portion (which is not clear) of 16 dots/mm or more is corrected, while in noise correction, a data absence of 8 dots/mm or less is corrected.

The marker signals RP and BP which have been waveform-shaped are supplied to the region extracting section 520 along with the color codes where the gate signal S for extracting density data, formed based on the region signal that indicates the inside of the designated region a, is scanned for each scan line.

The following presents descriptions of a more specific configuration.

Figure 35:
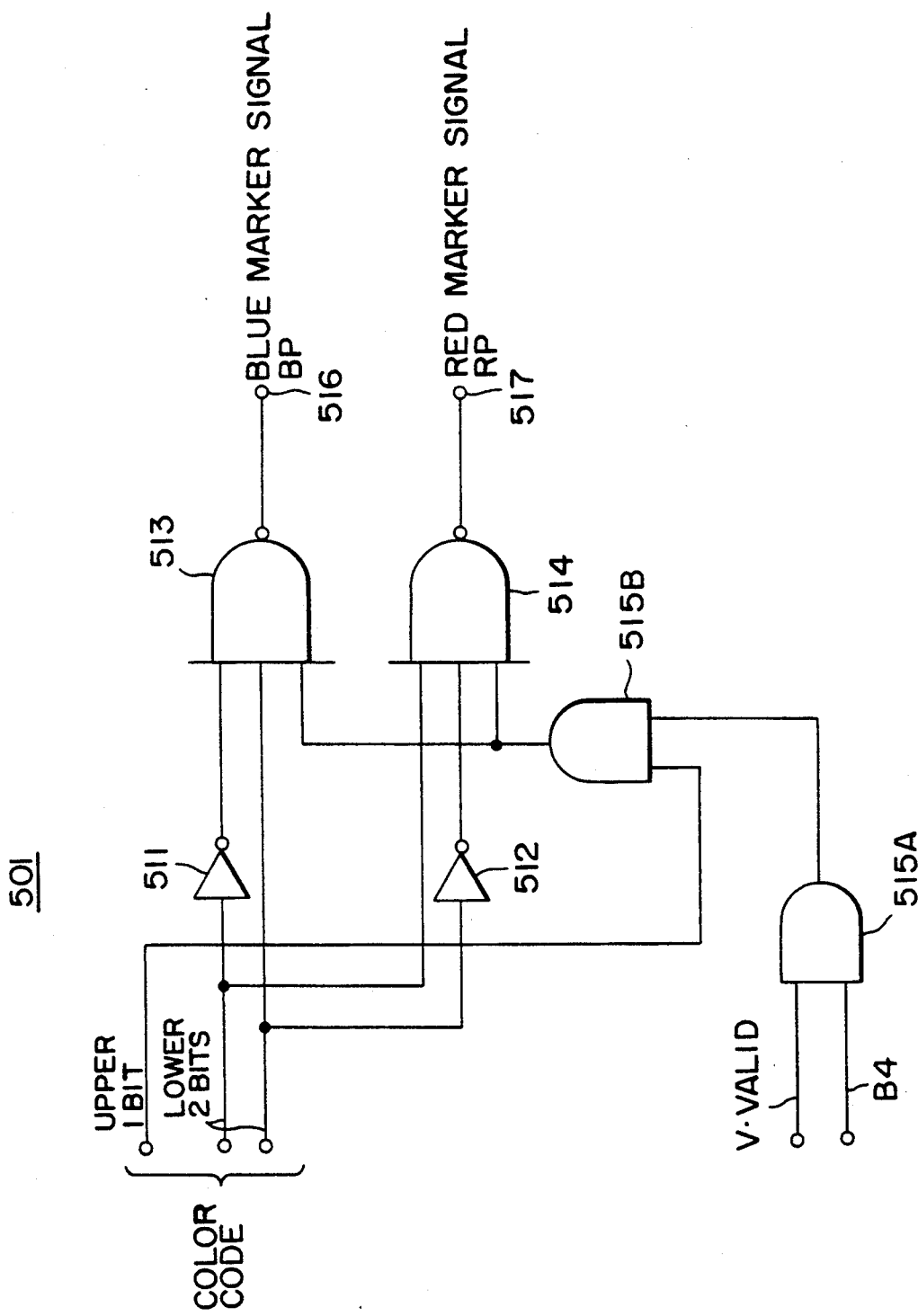

FIG. 35 shows an example of the color marker detecting circuit 501, designated to detect the marker's color by color marker scanning.

The blue color code data is "01", while the red color code data is "10".

As illustrated, among the lower two bits, lower-order-bit data (lower-order-bit data) and the inverted data of upper-bit-data (middle-order-bit data) by the inverter 511 are supplied to one NAND circuit 513.

Likewise, the middle-order-bit data and the inverted data of the lowest-order-bit data by the inverter 512 are supplied to the other NAND circuit 514. In addition, the ANDed output between the highest-order-bit data of color code data and the ANDed output of the vertical valid region signal V-VALID and size signal B4 is supplied to each of the NAND circuits 513 and 514 as gate signals. 515A and 515B indicate AND circuits.

As a result, for the blue marker, the terminal 516 provides the blue marker signal BP which has a pulse width corresponding to the marker contour thickness.

Similarly, for the red marker, the terminal 517 provides the red marker signal RP.

Figure 36:
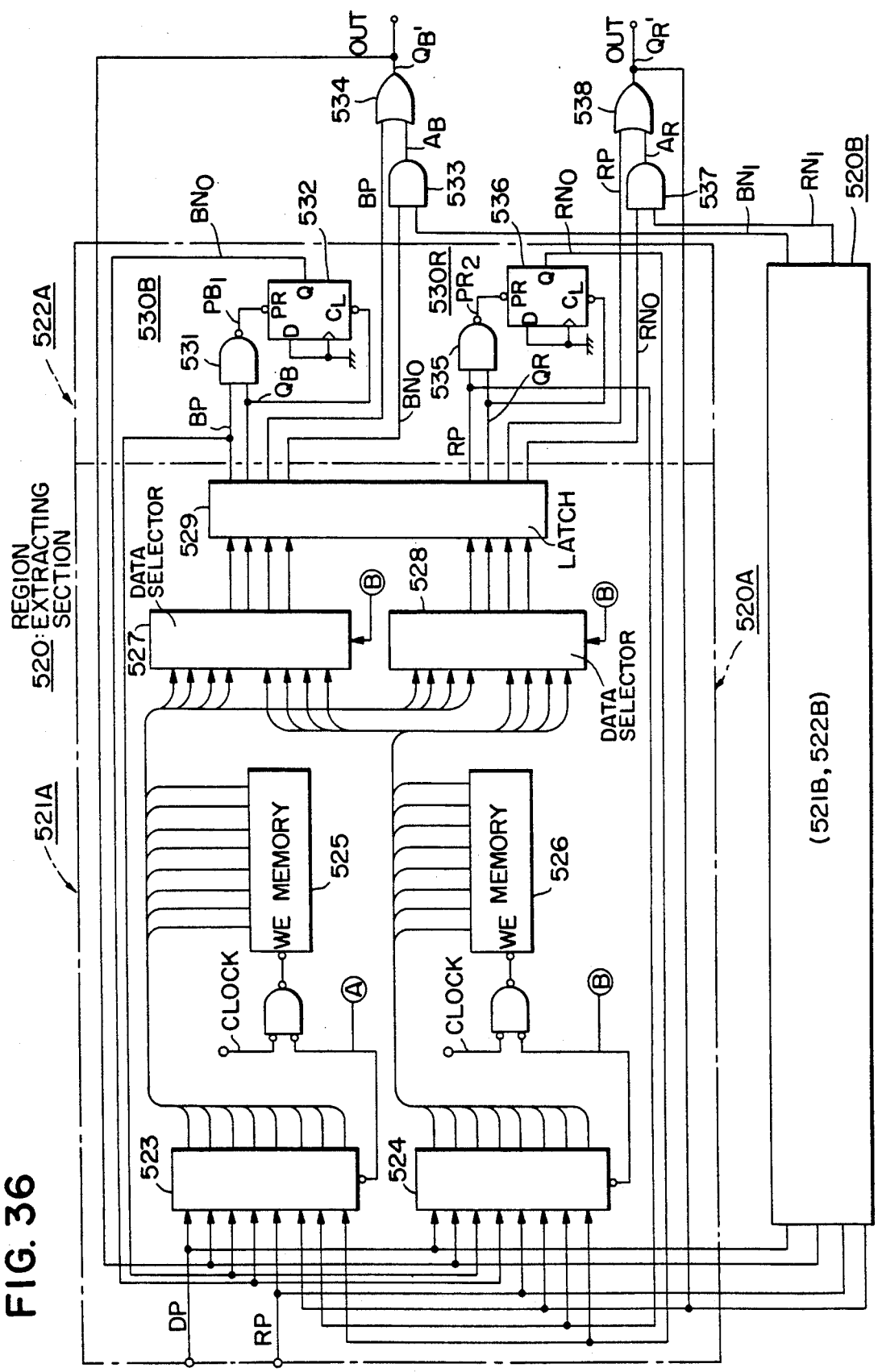

FIG. 36 presents an example of the region extracting section 520.

The technique of region sampling is hereunder described.

The function for detecting the initial position (heading process) of the region is constituted in conjunction with a function for determining the conversion region on the line currently processed, based on the overlapping portion of the marker signal corresponding with the region signal of a previous line.

Figure 37A:
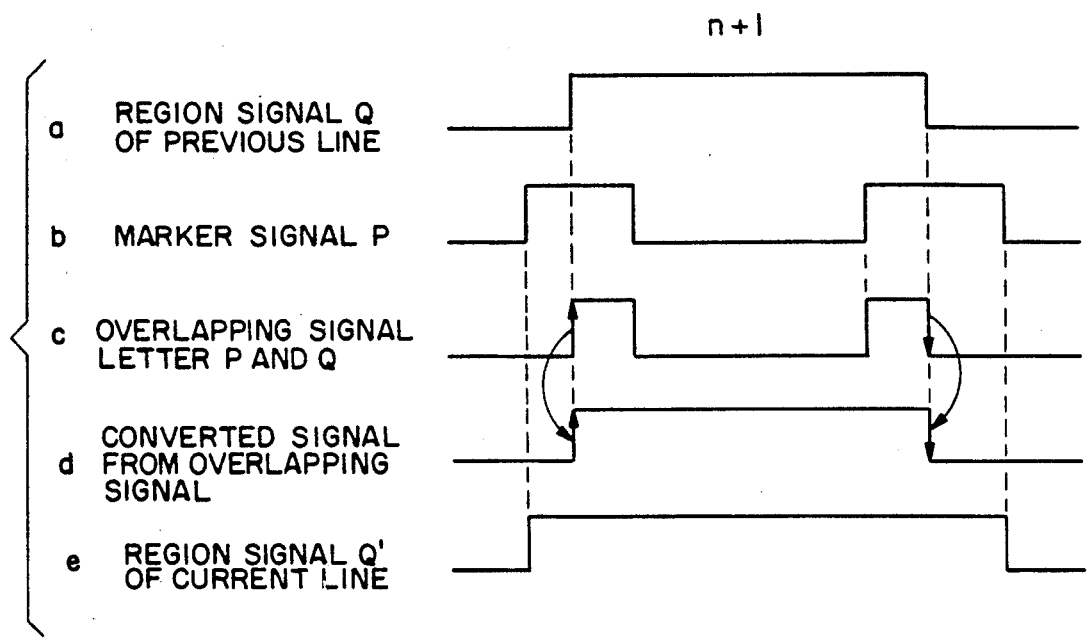
Figure 37B:
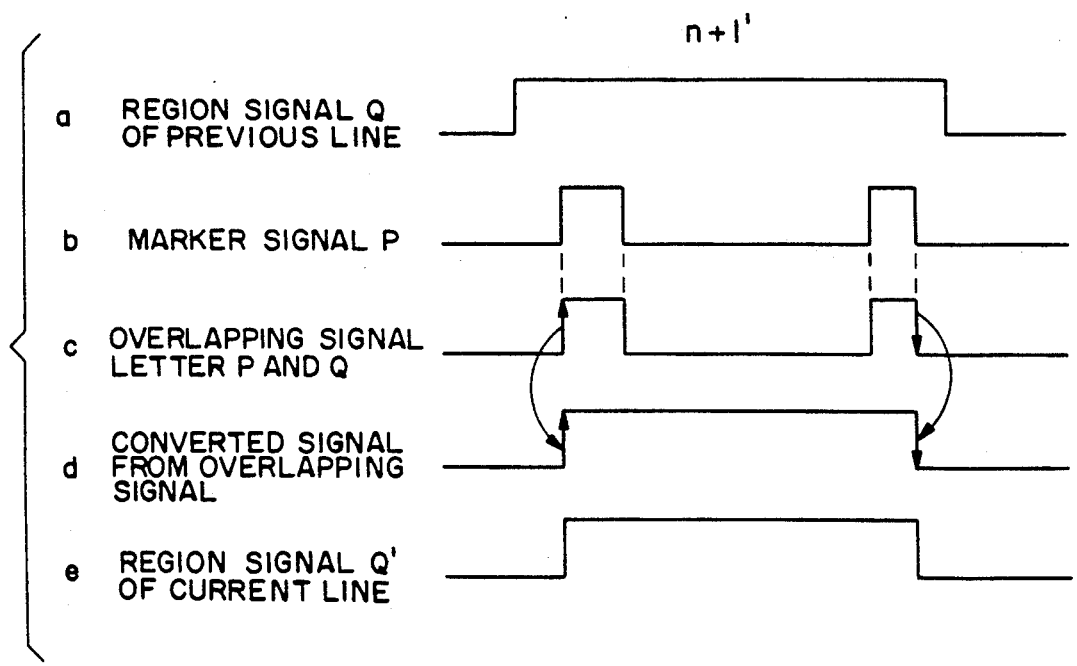

As shown in FIG. 37-A, in essence, the duration that starts at the rising step of the marker signal corresponding with the region signal Q of the previous line, and that ends at the falling step of the same signal (FIG. 37-A, a through d) is determined, and the logic sum of the region signal and the marker signal P is established (FIG. 37-A, e), thereby the color conversion region signal Q for the line currently processed is established.

Repeating the above procedure enables the region detection process to be carried out while determining the marker regions Q and Q'.

FIG. 37-A illustrates a waveform of the line "n+1'''" in FIG. 33; FIG. 37-B illustrates a waveform of the line "n+1".

One example of a circuit require for the above-operation is hereunder described referring to FIG. 36.

The region extracting section 520 consists of the first region extracting section 520A and the second region extracting section 520B, each of which has the data storage circuits 521A and 521B, respectively, and region arithmetic circuits 522A and 522B, respectively. In addition to the function to extract a blue marker region, the first and second region extracting sections 520A and 520B both have a function to extract a red marker region. This description is presented with respect to blue marker region extraction.

A blue marker region signal is formed by calculating the region signal of the current scan line based on the region signal obtained by the most recent scan and the marker signal obtained by the scan of the current scan line.

To implement this, calculation must be done by use a period for at least three lines. Thus, the first data storage circuit 521A must have the function to store the region signal for one line which is the last data of the most recent scanned line, the function to store the first and second region signals (actually, F.F. (flip flop) outputs) formed by processing the above region signal and the marker signal BP obtained by scanning the current line, and the function to store the region signal of the current scanned line obtained by processing these region signals.

In the working example, the second region signal is formed by reading line memories of the second data storage circuit 521B in the opposite direction, and the number of line memories is 16. The red marker must also be detected, calling for the total number of 32 line memories.

As a result, the first data storage circuit 521A has a pair of memories 525 and 526, each of which consists of 8 line memories. To select each of them for line, a pair of Schmitt trigger circuits 523 and 524, a pair of data selectors 527 and 528 and the latch circuit 529 are installed.

To the first data storage circuit 521A, the three signals obtained by the first region arithmetic circuit 530B for blue color are supplied as input signals along with blue marker signal BP.

In the first region arithmetic circuit 530B, the blue marker region signal QB' on the current scan line n is formed by the just previous region signal QB and the marker signal BP on the current scan line.

For convenience of description and taking the timing of scan line n into account as shown in FIG. 33, region signal QB (region signal of the scan line (n - 1)) and the marker signal BP of the scan line n have the relationship as shown in FIG. 38-B, -C. These signals are stored line by line onto the memory 525. In the timing of the next scan line (n+1), these signals are read through the data selector 527 and the latch circuit 529 (FIG. 38-D, -E).

A pair of the signals QB and BP is supplied to the NAND circuit 531, and its NAND output PB1 (FIG. 38-F) is supplied to the D-type flip-flop 532 through its preset terminal PR. Likewise the region signal QB is supplied to the clear terminal L. As a result, the first F.F. output BN0 (first region signal) as shown in FIG. 30-G is obtained.

The first F.F. output BN0 and the marker signal BP are stored into the memory 526 successively, then in the timing of the scan line (n+1), the Schmitt trigger circuit 524 is controlled to be kept active.

The second region extracting section 520B performs the similar operation at the same timing, provided that all the memories to the section are address-controlled for writing into forward direction and reading from reverse direction.

Accordingly, the output timing for the marker signal BP and region signal QB is W1 in the timing of scan line n, while W2 in the timing of scan line (n+1), making the start timing of reading marker signal little faster, (FIG. 38-H, -I). As a result, the second F.F. output BN1 (the second region signal) is one as shown in FIG. 38-K. The marker signal BP and the second F.F. output BN1 are stored in the data storage circuit 521B.

In the timing of next scan line (n+2), the first F.F. output BN0, the marker signal BP and the second F.F. output BN1 are read out (FIG. 38-L to -N).

Since the memory installed to the second region extracting section 520B is intended for writing into forward direction and from reverse direction, as described above, the read timing W3 for the first NAND output BN1 and the read timing W4 for the second NAND output BN2 agree in this example.

Both of the signals are supplied to the AND circuit 533. With AND output AB and the marker signal BP (FIG. 38-N, -0) supplied, OR output QB' is obtained, as shown in FIG. 38-P.

The OR output QB' is the very signal that shows the inside of the blue marker contour illustrated on the current scan line n. That is, the OR output is the region signal QB'.

The region signal QB' is used as the region signal QB right before on the next scan line, so it can be readily understood that the signal is fed back to the data storage circuits 521A and 521B.

Thus, use of a pair of F.F. outputs BN0 and BN1 obtained by making memory read reversed direction allows correct detection of the marker region.

Above operation is also applicable to the detection of red marker, and description of the region arithmetic circuit 530R is omitted, provided that 535 is an AND circuit, 536, D-type flip-flop, 537, AND circuit, and 538, OR circuit.

Schmitt trigger circuits 523 and 524, memories 525 and 526, and data selectors 527 and 528 have been prepared in pair taking the presence of blue and red markers concurrently. These are selected by 2-line cycle selection signals supplied to the terminals A and B.

Figure 39:
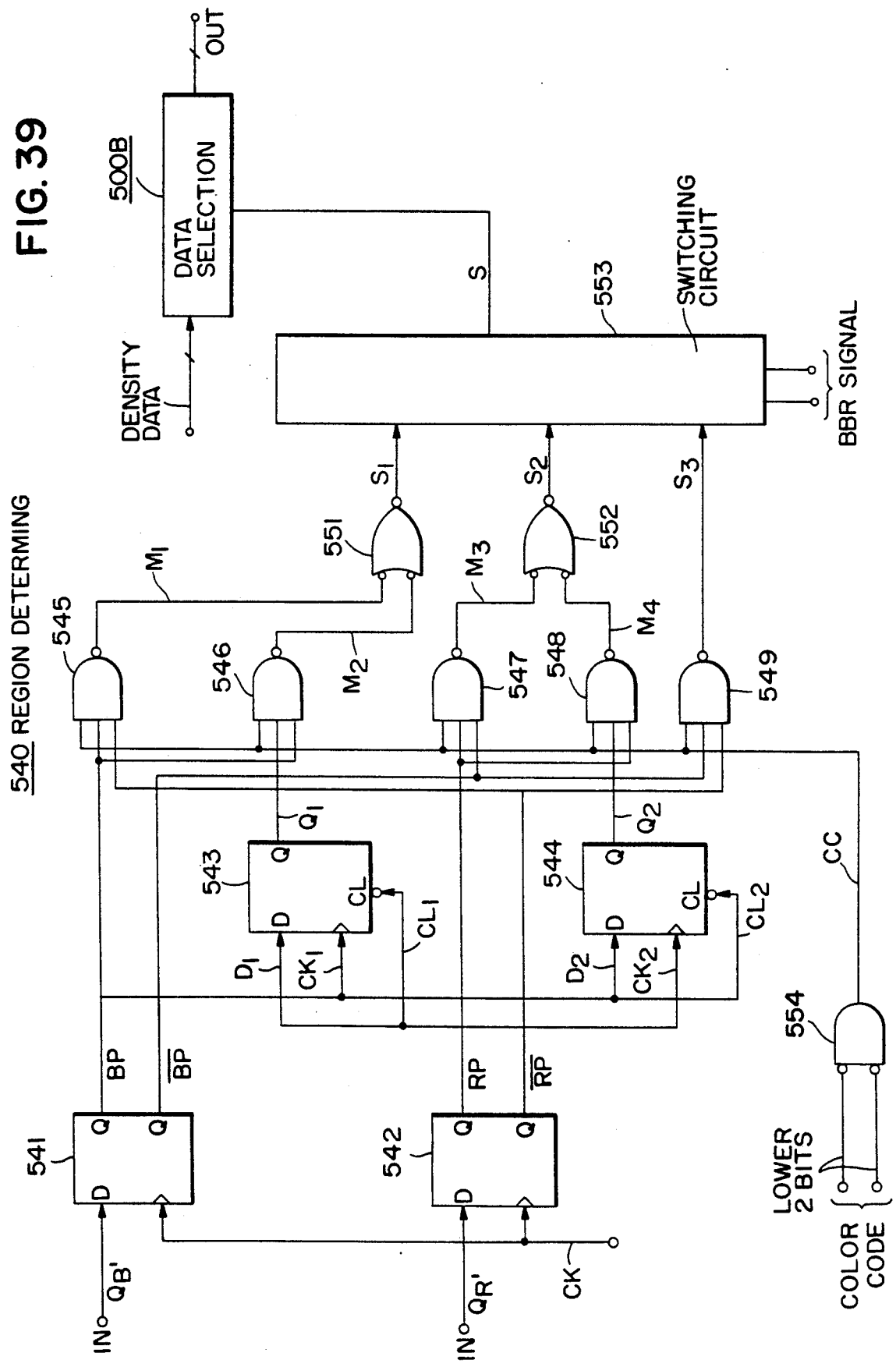
FIG. 39 shows a block diagram for region determining circuit.

The region signals QB' and QR' supplied to the output terminals are supplied to the region determining circuit 540 as shown in FIG. 39.

Figures 40A, 40B:
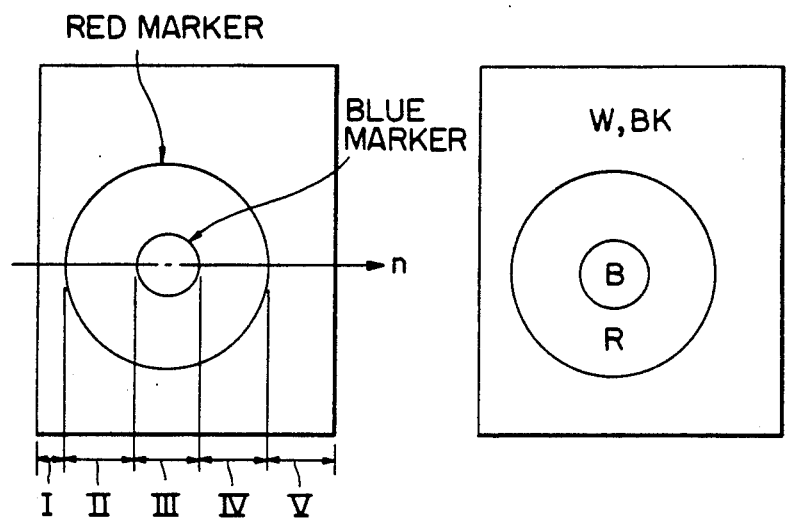
FIGS. 40, 41, 42 and 47 are all present illustrations that explain the region determining circuit.
Figure 41:
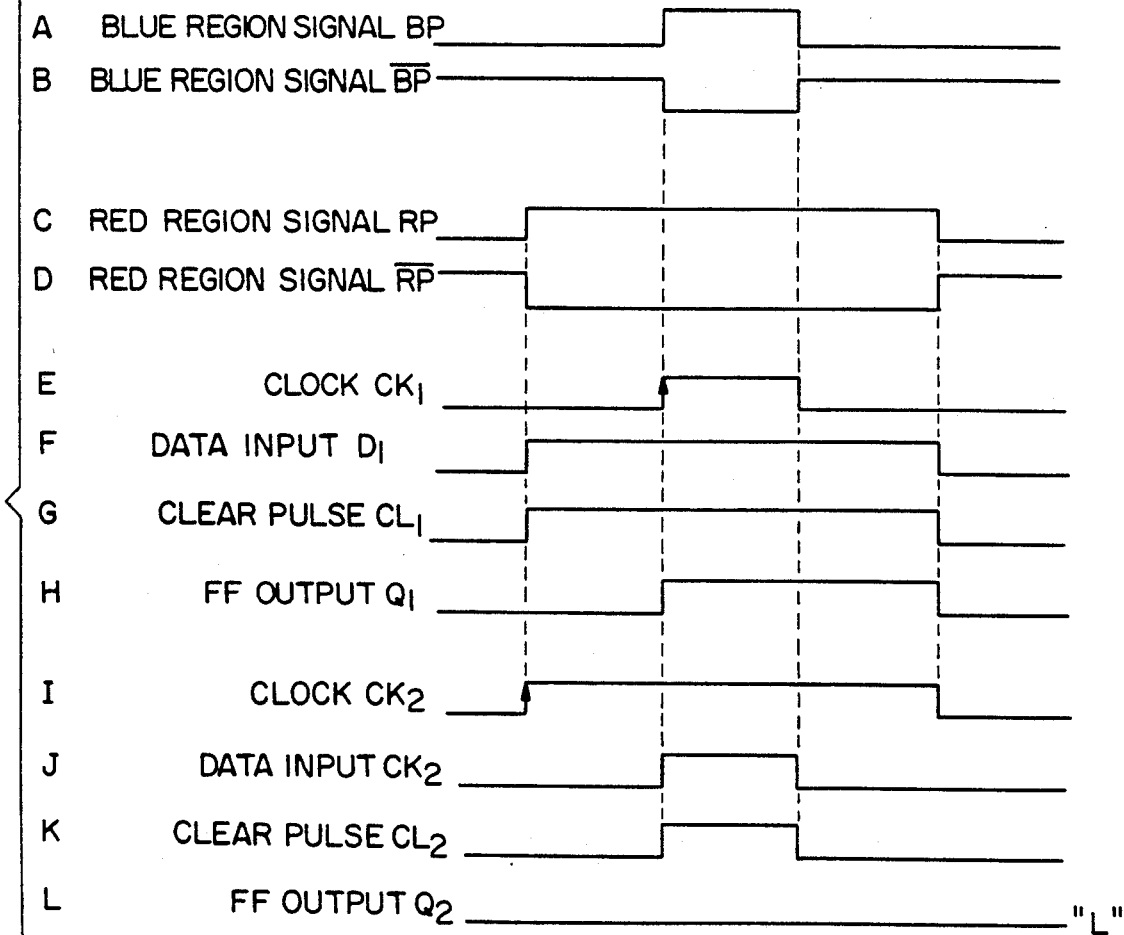

The region determining circuit 540 is a control means for the region signal used to recording images as shown in FIG. 40, if the marker designation is like one shown in FIG. 40-A.

In the periods I and V of the figure, a non-processed image is recorded, while in the periods II and IV, a multi-color.age is recorded as a red image. In the period III, a multi-color image is recorded as a blue image by allowing density data gate signal S to be formed from region signals QB' and QR'.

The region determining circuit 540 has flip-flops 541 to 544. Region signals QB' and QR' latched by the forward flip-flops 541 are supplied to their corresponding NAND circuits 545 to 548, while region signals QB' and QR' latched by backward flip-flops are supplied to their corresponding NAND circuits 545 to 548. To each of the NAND circuits 545 to 548, color code data CC except white color is supplied via the NOR circuit 554 On the other hand, to the switching circuit 553, the BBR signal is supplied which shows the copying operation is done in what color.

Figure 42:
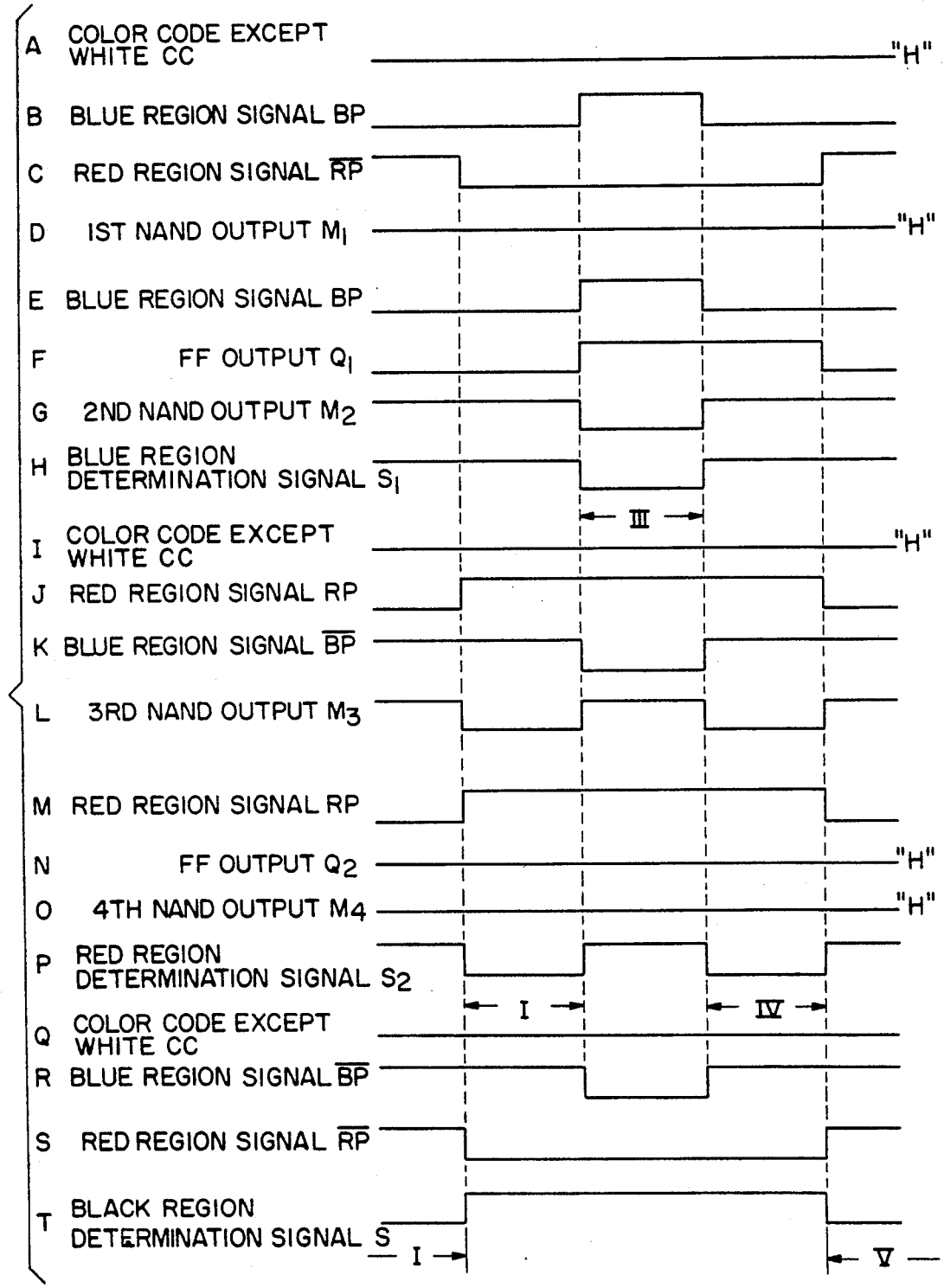

With A to C signals shown in FIG. 42, the first NAND circuit 545 provides the first NAND output M1 as shown in FIG. 42. Likewise, the second NAND circuit 546 provides the second NAND output M2 shown in FIG. 42-I based on the E to G input signals in FIG. 42. As a result, the AND circuit 551 provides the gate signal S1 related to the period III shown by H in the FIG. 42.

Similarly, J to K input signals in FIG. 42, provides the third NAND output M3 of the FIG. 42-L, while input signals in FIG. 42, M and N provide the fourth NAND output M4 in FIG. 42-0. As a result, the second AND circuit 552 provides the gate signal S2 (FIG. 42-P) related to the periods II and IV.

With Q to S signals in FIG. 42, the fifth NAND circuit 549 provides the gate signal S3 (FIG. 42-T) corresponding to the periods I and V.

One of the gate signals S1 to S3 is selected by the switching circuit 553 corresponding to the BBR signal that indicates the copy sequence. Accordingly, the gate signal S1 is selected for blue color recording mode, while the gate signal S2 is selected for red color recording mode. Likewise, gate signal S3 is selected for black color recording mode.

Figure 43:
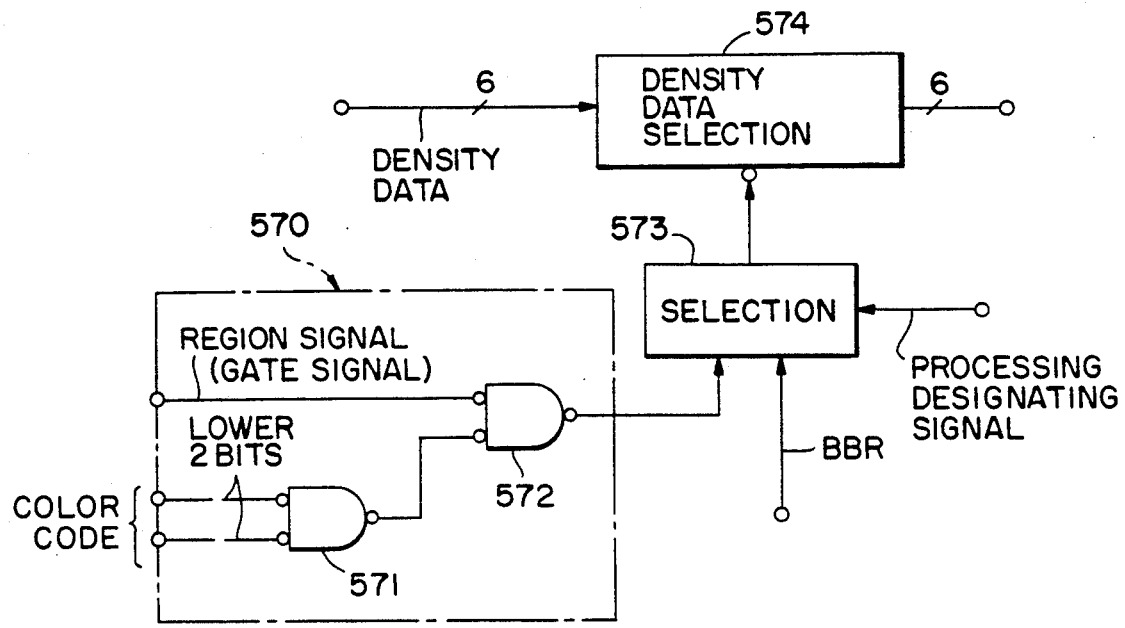

Gate signals S1 to S3 form the switching circuit 553 are supplied to the color data selection circuit 500B shown in FIG. 43.

First, the gate signal S and the color code data are supplied to the gate circuit 570. The gate circuit 570 consists of a pair of OR circuits 571 and 572.

Figure 65:
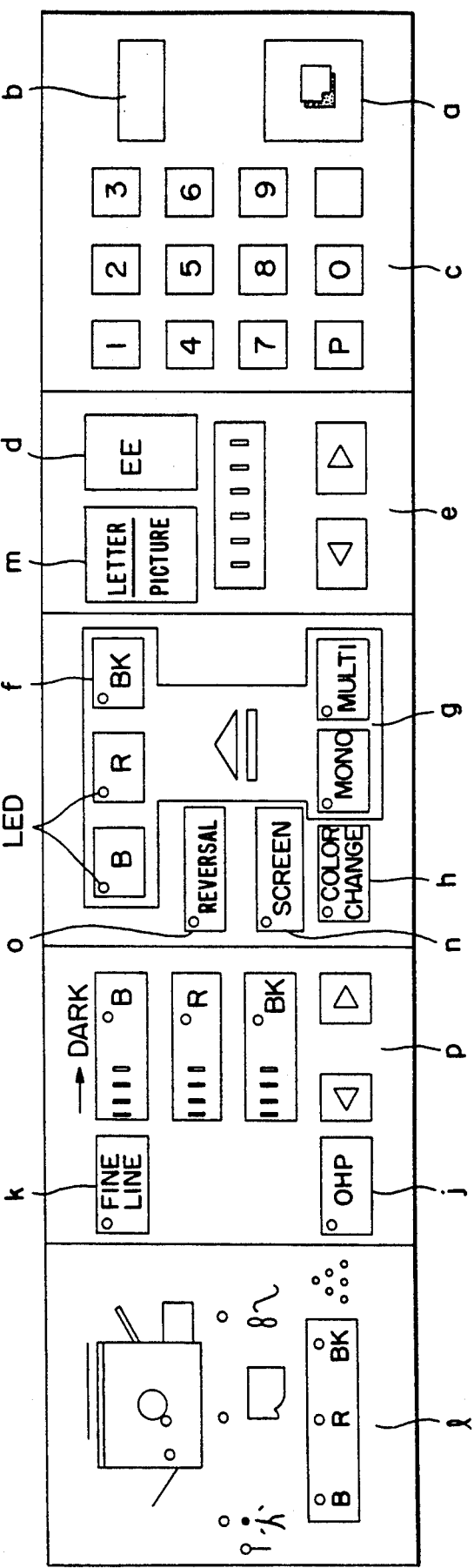

If color code data is one other than white the gate signal S is gated, and either of this signal and BBR signal is selected in the selection circuit 573. Which signal is to be taken is controlled by the processed signal designated by the operation/indicator section 202 as shown in FIG. 65.

With these outputs, density data is selected in the selection circuit 574 that corresponds to the color code data.

In this case, density data corresponding to the color being currently developed is selected in the section outside the section where there is gate signal S. One example of this is that blue data is always selected outside the section III in the blue color recording mode. As a result, blue image is recorded in section III and the section written with blue in the blue recording mode, while red image is recorded in sections II, IV and the section written with red in the red recording mode, and sections I and V are recorded in black color in the black recording mode (FIG. 40-B).

As a result of use of the region determining circuit 540, inside marker color is taken precedence. The region not overlapped is copied by the color of marker that designates the region not overlapped.

The following description is related to other image processing performed after extracting color marker region.

By extracting color marker region, similar process is applicable to partial region extraction, erasing, reversing, mirror-image, enlargement, reduction and position movement and their combination. Based on the previously described technique, controlling "density data selection" can either "sample" or "delete" and image by using a circuit such as that described in FIG. 43.

"Screen cover" conversion on the marker-designated region is hereunder described. In the screen cover conversion, the background of the marker-designated region is covered with screen pattern. Once "screen cover" operation is selected based on the processing selection signal, the selection circuit enables the signal of a pattern data generator circuit 575.

Figures 45, 46:
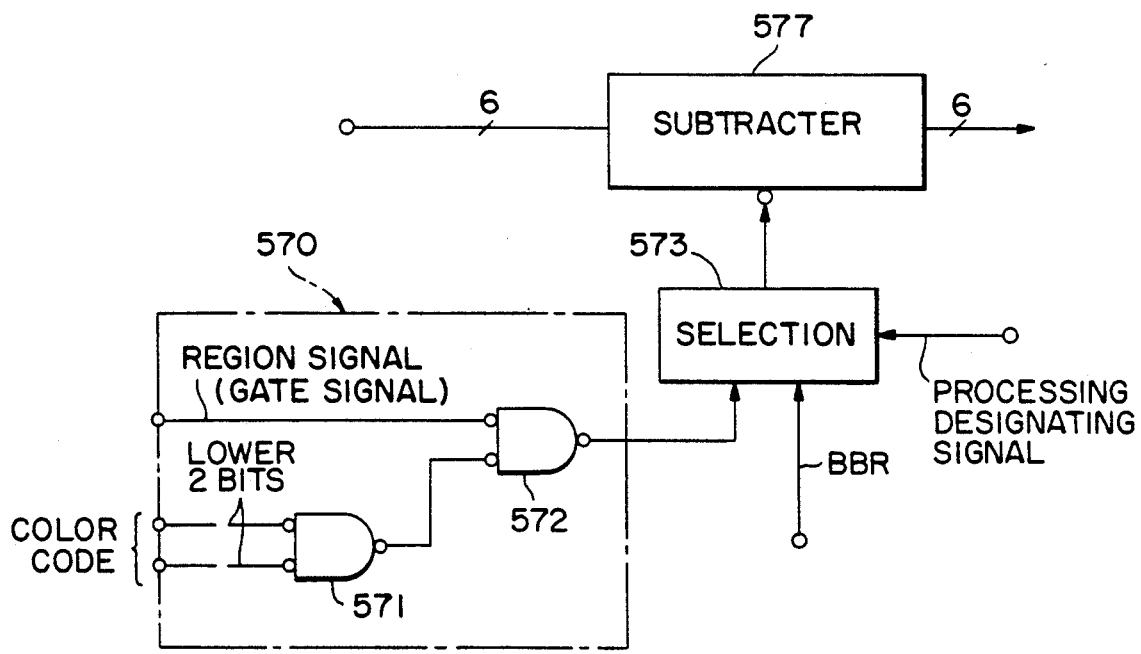

The pattern data generator circuit 575 repeatedly outputs data shown in FIG. 45, in synchronization with the clock.

The pattern data generator circuit 575 counts clock pulses, and, accordingly, outputs line and column address designating signals. Based in turn on these signals, the data in FIG. 45 are being output, and added to the image signal, thereby the resultant composite signal is being output.

The value overflowing after the addition is set to the maximum value.

As a pattern to be generated, 45° and 90° screen patterns, 4×4 and 8×8 patterns and the like can be prepared, in order to provide a pattern that a user requires. For this purpose, a detachable ROM for these pattern may be used.

Based on the processing selection signal, not only selecting "screen cover" conversion, but also designating the color to be performed the screen cover conversion are possible.

Usually, when selecting the screen cover mode on the operation section 202, the color of screen is also selected.

According to this embodiment, the example of processing density data was described by referring to the processing on 6-bit data. However, it is also possible to attain effects that are comparable to those of the function mentioned above, by modifying threshold data in a multivalue coding circuit for image data. In this case, the relevant patterns are stored in a threshold value ROM, and based on a selected pattern, multivalue coding is performed.

Next, image reversing operation is hereunder described.

Once the "image reversing" is selected based on the processing selection signal, the operation designating signal is supplied from the selection circuit 573 to the subtraction circuit 577 in correspondence with the color-marker designated region, thereby based on the data on this signal, the document data is subtracted from a specific value (in this example, 63), and the resultant data are being output.

It is possible to carry out processing for the detected region according to the predetermined contents.

The background color of the document is white, but other colors are allowable.

A fluorescent pen having red colors (including orange) or blue colors are appropriate for color markers since these color are not liable to reproduction in normal copying.

If no color marker can be used directly for the document, a transparent sheet can be used.

Figure 47:
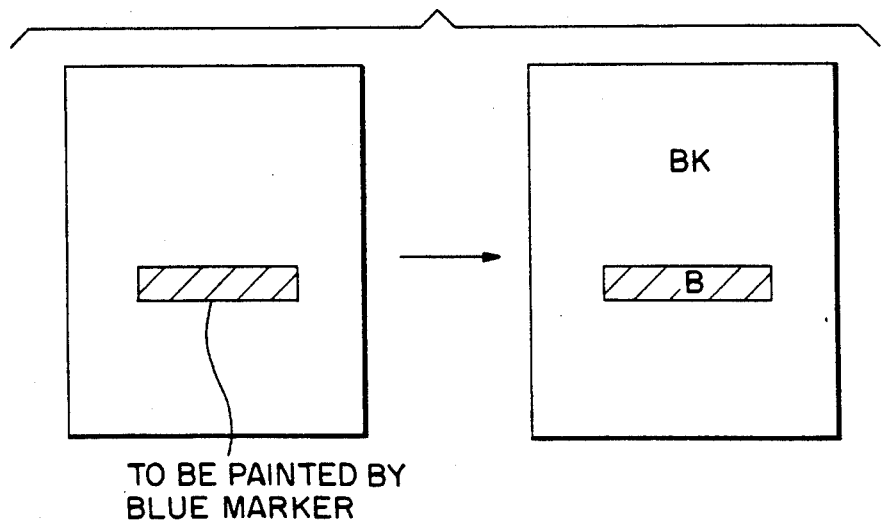
Figure 44:
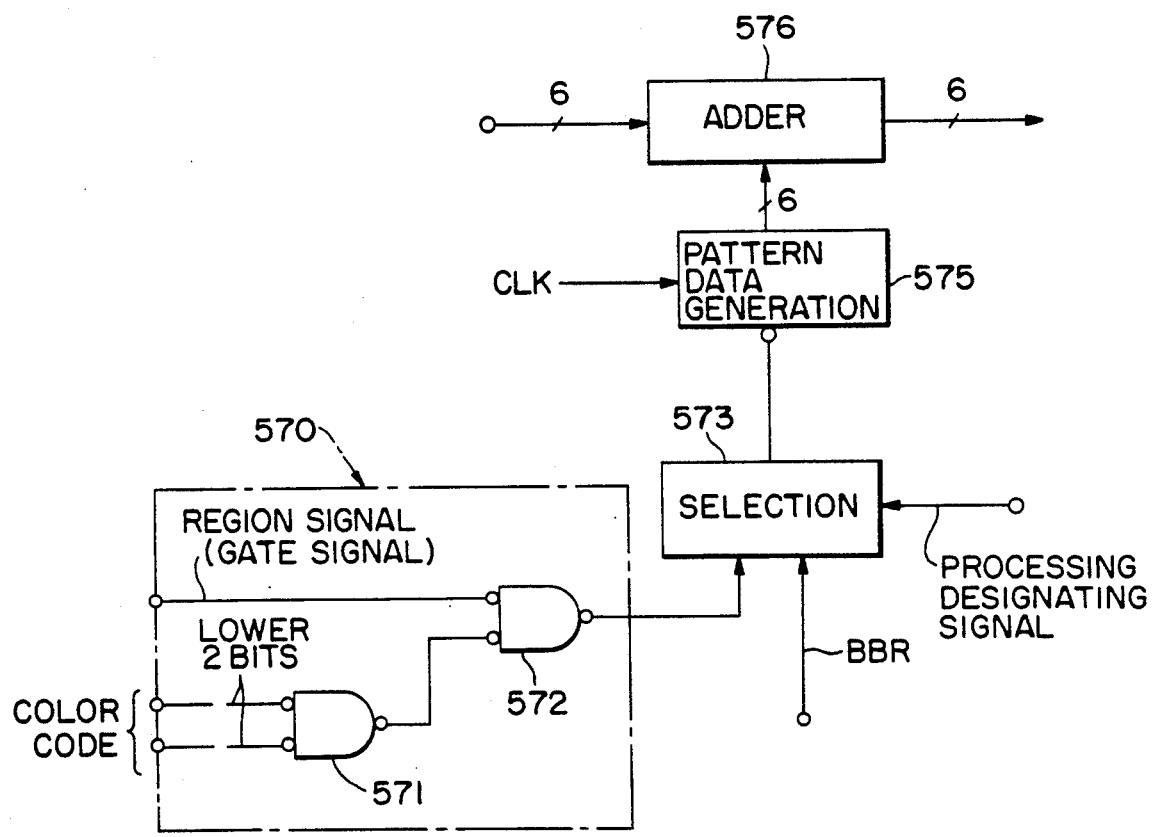

As shown in FIG. 47, the designated region can be painted over by color marker.

The reasons why the fluorescent pen is used as the color marker is that the fluorescent pen has a good transparency. If painting over the designated region with other type of color marker, since the letters are covered with the color marker, it may become difficult to detect the letters.

It may be apparent that a marker having a good transparency can be used other than the fluorescent pen.

The following description is related to automatic and manual density adjustment for image processing.

A conventional method to set image density controls level, by operating selection knob on the operation period, bias voltage at the time of development and light intensity of the light source are adjusted to obtain the image with the predetermined density. However, only an experienced person familiarized with copying machine operation can succeed level setting at one time; other persons had to make wasted trials before obtaining satisfactory level.

To solve this problem, the automatic density system has been developed. This system determines the density of document based on the information about density obtained by the pre-scanning process.

One of the drawbacks of this system lies in the process of detection of the information about density by pre-scanning, which makes the initial copying time longer and thus does not so improve productivity in copying operation.

To set document density real time, document density histogram is produced.

Figure 48:
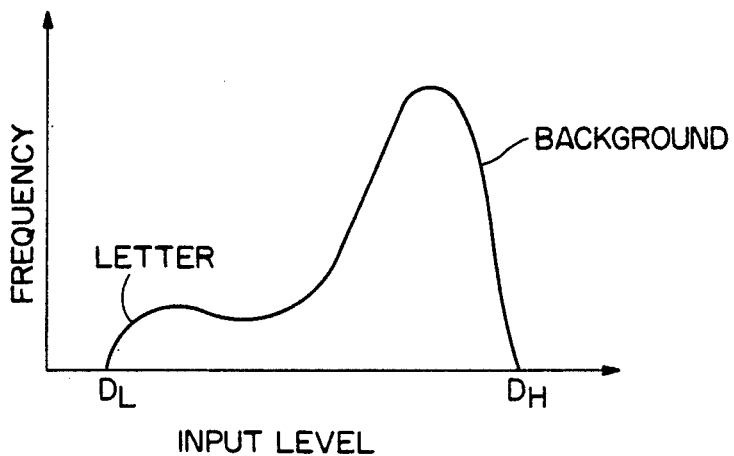
FIG. 48 indicates density histogram characteristics.

When the density histogram as shown in FIG. 48 has been obtained, the threshold for multivaluing (digitizing, for example) is calculated by level that provides the frequency of peak in the histogram. This calls for the counting of frequency of peak for each density level, increasing circuit size.

The new method has the threshold determining mean 610 which sets appropriate document density real time without pre-scanning and without an increase in circuit size. The threshold determining mean 610 is installed in conjunction with the multivaluing circuit 600B.

The major feature of this mean lies in the determination of threshold line by line based on maximum DH and minimum DL in each scan line. In color copying which carries out in the sequence of blue, red and black, density data of the pixel corresponding to the color to be currently copied is sampled, and both maximum and minimum values are obtained for each color.

The following shows one example of calculation of threshold value for digitizing in multivalue.

$$T_{ij} = k_{ij}(DH - DL) + \alpha_{ij} + DL$$

where i = blue, red or black
j = multivaluing level
k = coefficient in the range of 0.1 to 0.8, 0.2 to 0.6 being desirable
α = correction value.

Both k and α vary depending on color, and obviously on density data stored in the map for color separation above described.

For example, k would be ½ to ⅓ for black, and ½ for red and blue. α would be −10 for black, and 2 to 6 for red or blue.

Noises may be mixed up in calculation of the maximum and minimum values. To prevent this, density data which have not been sampled can be used if there is drastic change in density data, or a mean value of two adjacent density data can be used. Also to prevent calculated threshold from being changed drastically, the mean value of the thresholds for multiple lines can be used as a threshold for the current line.

In multivaluing, it is obvious to select coefficients k and α for their thresholds.

To copy the original picture in a signal color, coefficients k and o vary depending on color. In other words, the original document usually includes letters in black color, with less letter in other colors. Determination of threshold based on black color results in scattered reproduction image in red or blue color. On the other hand, determination threshold based on red or blue color results in dissatisfactory of reproduction image in black color.

To prevent this, thresholds must be manually set for each color to address them in color code for each pixel during digitizing, if the automatic threshold means 610 is not provided.

If the automatic threshold means 610 is provided, the density data arrangement of color separation ROM should be changed, and other color images should be satisfactorily reproduced based on thresholds selected in copying in designated colors.

The following shows specific example of the automatic threshold determining means.

Figure 49:
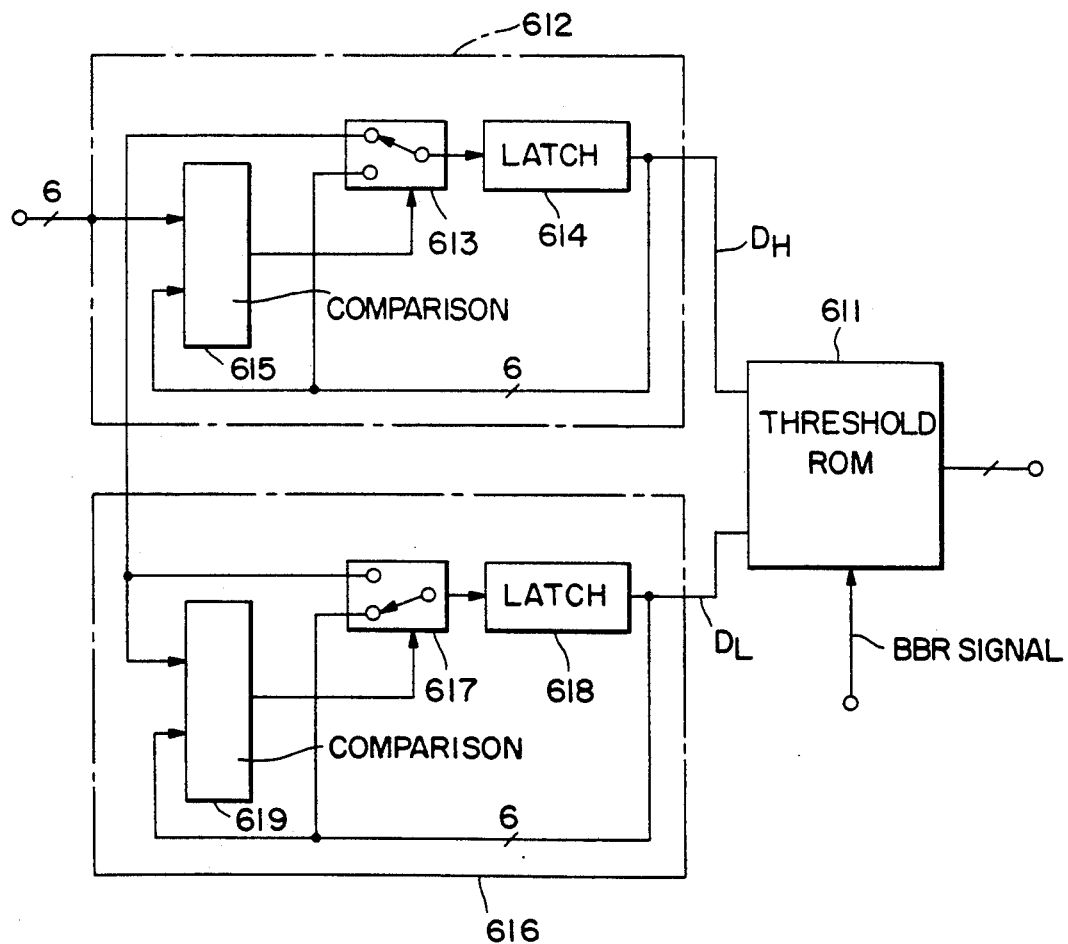
FIGS. 49 to 51, block diagrams for the automatic threshold determining means are presented.

FIG. 49 shows an example in which ROM is prepared to save threshold obtained for each color by the threshold calculation expression, and threshold data is selected from the maximum and minimum value of the line.

In this figure, 611 indicates the ROM which stores threshold for each color. The density data is supplied both to the maximum value calculation circuit 612 and the minimum value calculation circuit 616.

In the following example, the maximum value calculation circuit 616 is taken, since this is applies to the minimum value circuit 612.

The density data of the current pixel and that of the previous pixel latched by the latch circuit 614 is supplied to the switching circuit 613. The density data of the current pixel and that of the previous pixel are supplied to the comparator 615 for comparison, where either of them is selected as an output. If the density data of the current pixel is larger than the other, that density data is selected.

This comparison is conducted for all the pixel to find the maximum value DH.

Likewise, the minimum value calculation circuit 616 finds the minimum value DL from results of comparison of minimum values by the comparator 619.

The maximum values DH and DL obtained for one line are used to address the threshold ROM611. Selection of the threshold for which color is conducted based on the BBR signal supplied to the threshold ROM611.

Figure 50:
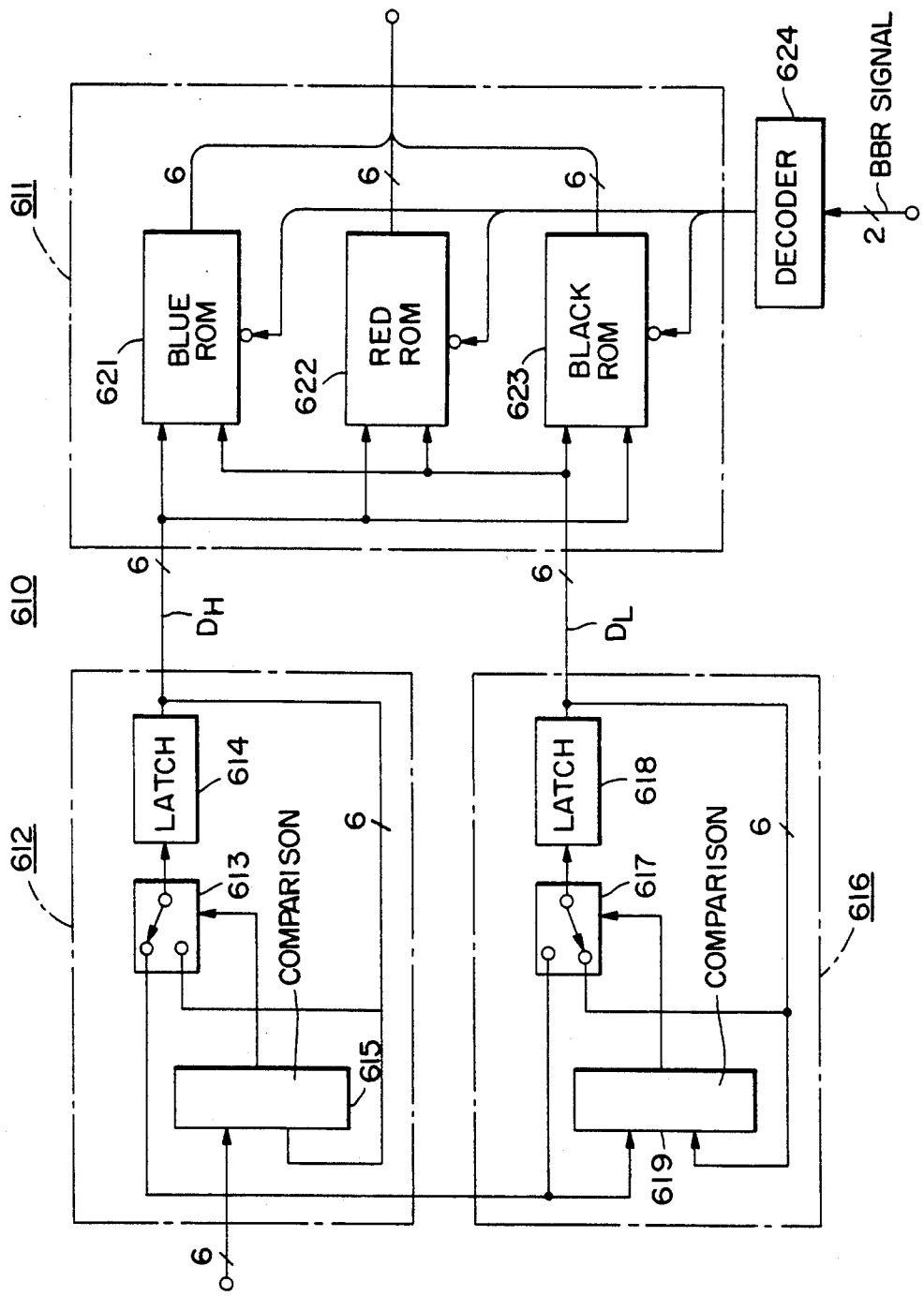

As shown in FIG. 50, ROM621 to 623 which store each threshold data for each color may be prepared to select threshold data by the BBR signal. This configuration needs the encoder 624 which encodes the BBR signal.

Figure 51:
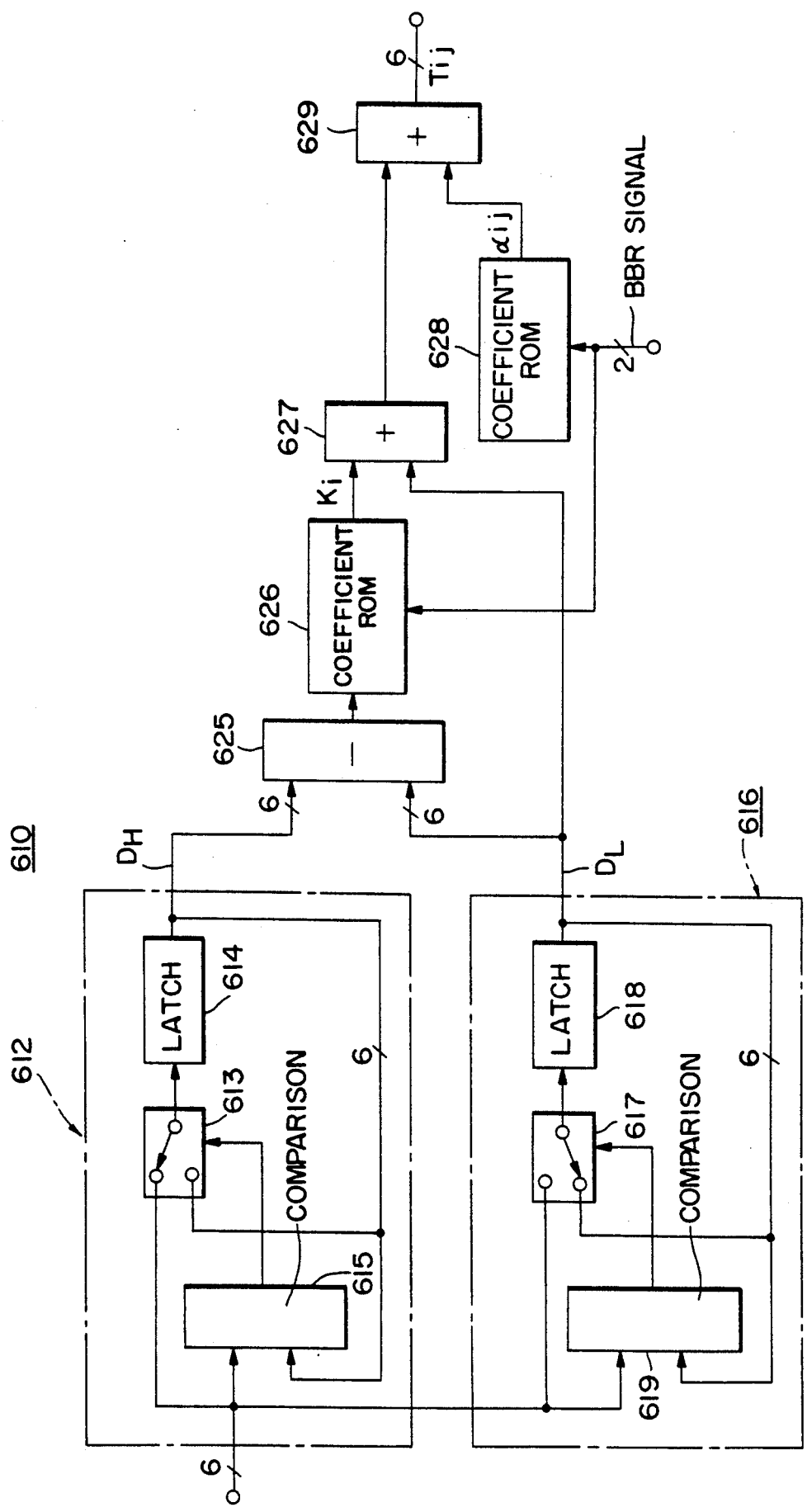

The above expression can be used to perform calculation of the threshold successively in real-time mode. FIG. 51 shows an example of this method.

With the maximum value DH and the minimum value DL obtained as above, the calculation, DH - DL, is conducted by the subtracter 625, the result of which is supplied to the first ROM626 that stores the coefficient k where multiplication of the result and a coefficient selected by the BBR signal is performed. Then, the value kij×(DH−DL) is added to the minimum value DL in the adder 627.

On the other hand, data of the coefficient ROM628 that stores αij is selected by the BBR signal, and is supplied to the second adder 629, along with the addition output, and the final threshold Tij is obtained.

A pre-processing circuit for density data, like an averaging circuit, may be installed to prevent noises from being generated. Also, a post-processing circuit may be installed for the calculated threshold Tij.

By providing above-mentioned calculation means for each of colors, is become possible to do color copying in a single color (all black, all red, or all blue).

The threshold selection signal is supplied form the operation/indicator section 202 to the multivalue coding circuit 606B, where the threshold for EE mode or that for manual mode is selected. Normally EE mode is assumed. If EE mode is reset, the address of the threshold ROM630, manual threshold determining mean, is assigned to output the desired threshold for digitizing.

To code a photo image in multivalue, three sets of dither matrix of 8×8, for example, can be prepared as a threshold ROM630. Also, the counter output that designates a row and a column can be used to control the threshold ROM630 address. Then, the image data can be coded into 4 kinds of values to represent gray color.

Figure 52:
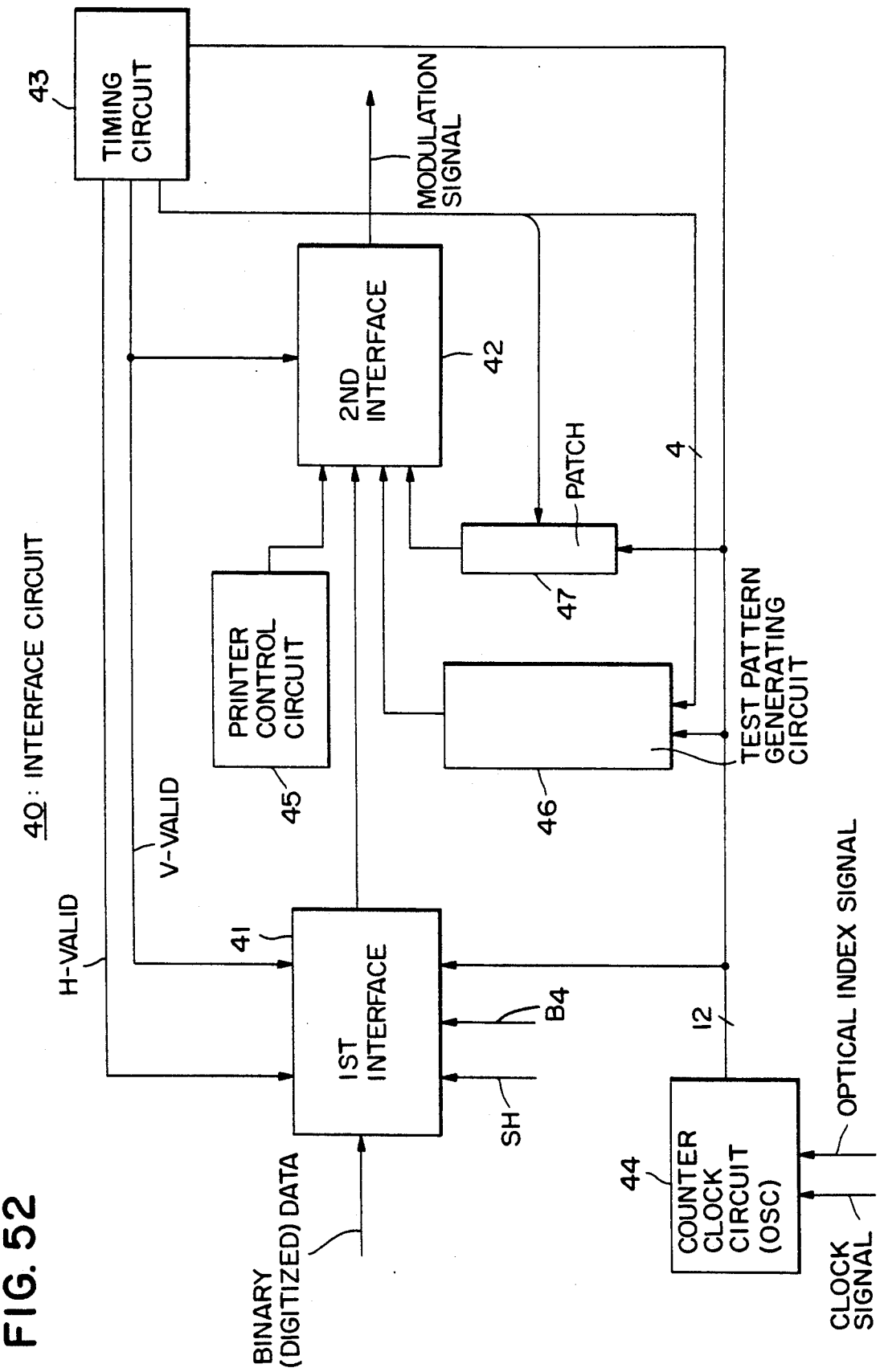
FIGS. 52 and 53 are a bock diagram for the overall of the interface and its first interface, while FIG. 54, a waveform that describes the interface operation.

The multivalued image signal is supplied to the output unit 700 through the interface circuit 40. The following description is related to the configuration and operation of the interface circuit 40 as shown in FIG. 52.

The interface circuit 40 consists of the first interface 41 to receive binary data and the second interface 42 to send binary data from the former interface.

To the first interface 41, the horizontal valid signal H-VALID and the vertical valid signal V-VALID are supplied along with the clock of the predetermined frequency (6 MHz, in this example) from the counter clock circuit 44.

This allows binary data to be sent synchronously with the CCD drive clock to the second interface 42, only when the horizontal and vertical valid signals are generated.

The counter clock circuit 44 generates the timing clock of the primary scanning sychronously with the optical index signal.

The second interface 42 is used to send binary data from the first interface 41 and other image data to output unit 700.

Other data include:

Test pattern image data from the test pattern generating circuit 46;

patch image data from patch circuit 47; and control data from the printer control circuit.

The test pattern image data is used during check of image processing. Patch image data for toner density detection is used during patch processing.

The test pattern generating circuit 46 and patch circuit 47 are both driven by clock from the counter clock circuit 44, whereby the timing with the binary data from the first interface 41 is taken.

The binary data from the second interface 42 is used as laser beam modulation signal, with respect to the output unit 700.

Figure 53:
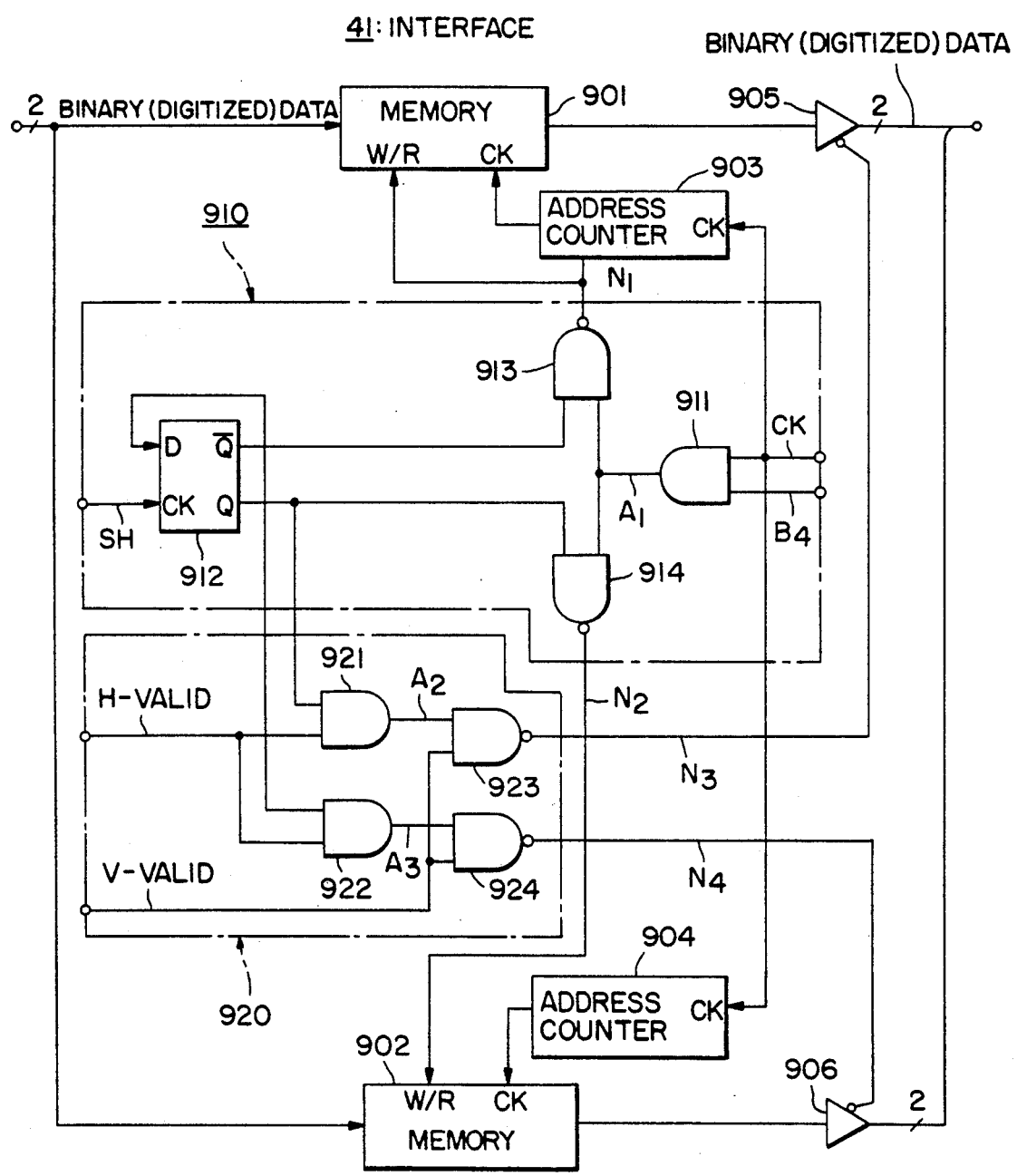

FIG. 53 shows an example of the first interface 41 which a pair of line memories 901 and 902 to be used for digitizing in real time mode.

Figure 54:
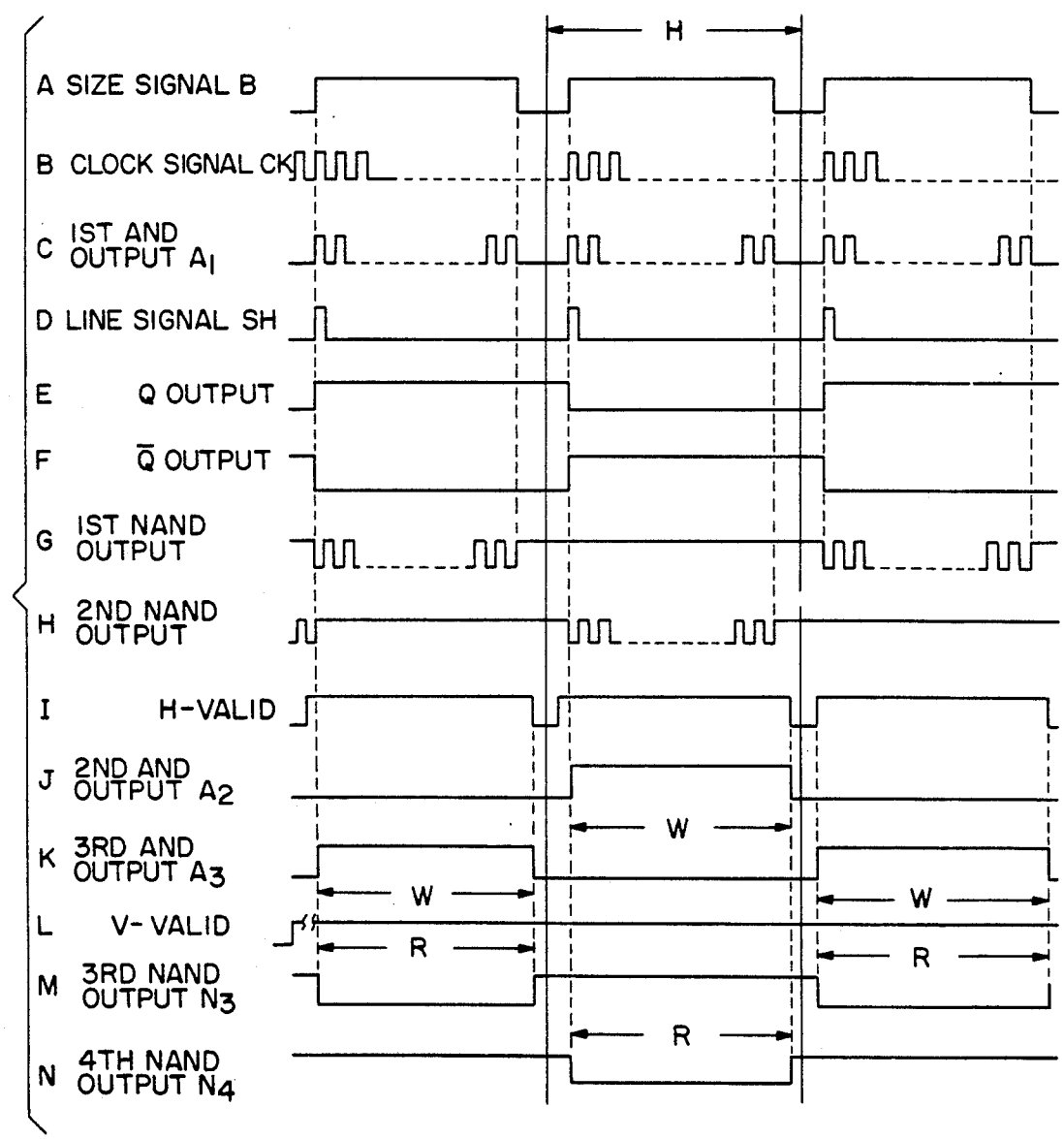

To these line memories 901 and 902, the enable signal with 2 lines assumed to be one cycle is supplied, along with the predetermined address data from each of the address counters 903 and 904. CK indicates a clock for the address counter (FIG. 54-B).

The enable signal forming circuit 910 is equipped with the AND circuit 911, as illustrated. To this AND circuit, the above clock CK is supplied along with the size signal B4 (in this example, the maximum size is B4, as shown in FIG. 54-A) which can be handled by this apparatus. Thus, the first the AND output A1 (FIG. 54-C) is formed.

On the other hand, the D-type flip-flop 912 is installed. The line signal SH (FIG. 54-D) is provided once for each line synchronizing with the deflector 935 installed to the output unit 700 is supplied to this flip-flop. As a result, outputs (shown as Q and $\overline{Q}$) with polarities (shown in FIG. 54-E and -F) are obtained from the Q and $\overline{Q}$ terminals. The output $\overline{Q}$ and the first AND output A1 are supplied to the first NAND circuit 913, while the output Q and the first AND output A1 are supplied to the second NAND circuit 914. The first NAND output N1 from the first NAND circuit and the second NAND output N2 from the second NAND circuit (FIG. 54-G, -H) are supplied as enable signals for line memories 901 and 902.

Thus, each line memory 901 and 902 are write-enabled alternatively line by line.

Outputs from the line memories 901 and 902 are controlled with respect to their output state by the 3-state gate circuits 905 and 906. The gate signal forming circuit 920 is installed for this purpose.

The signal forming circuit 920 consists of a pair of AND circuits 921 and 922 and a pair of NAND circuits 923 and 924. Q and $\overline{Q}$ outputs and horizontal valid signal (H-VALID) (FIG. 54-I) are supplied to the second AND circuits 921 and third AND circuits 922 to form AND output A2 and A3 shown in FIG. 54-J, -K. To the third NAND circuits 923 and 924 installed at the next stage, the vertical valid signal V-VALID (FIG. 54-L) is supplied along the these AND outputs A2 and A3. Also, the third output N3 (FIG. 54-M) is supplied to the gate circuit 905, and the fourth output N4 (FIG. 54-N) is supplied to the other gate circuit 906.

As a result, the gate state is controlled line by line, and digitized image data for each line are read out from the first interface 41.

The horizontal valid signal V-VALID and the vertical valid signal V-VAL are used to determine valid widths in the horizontal and vertical directions. The clock CK, the horizontal valid signal H-VALID, and the vertical valid signal V-VALID are supplied from the output unit 700.

Figure 55:
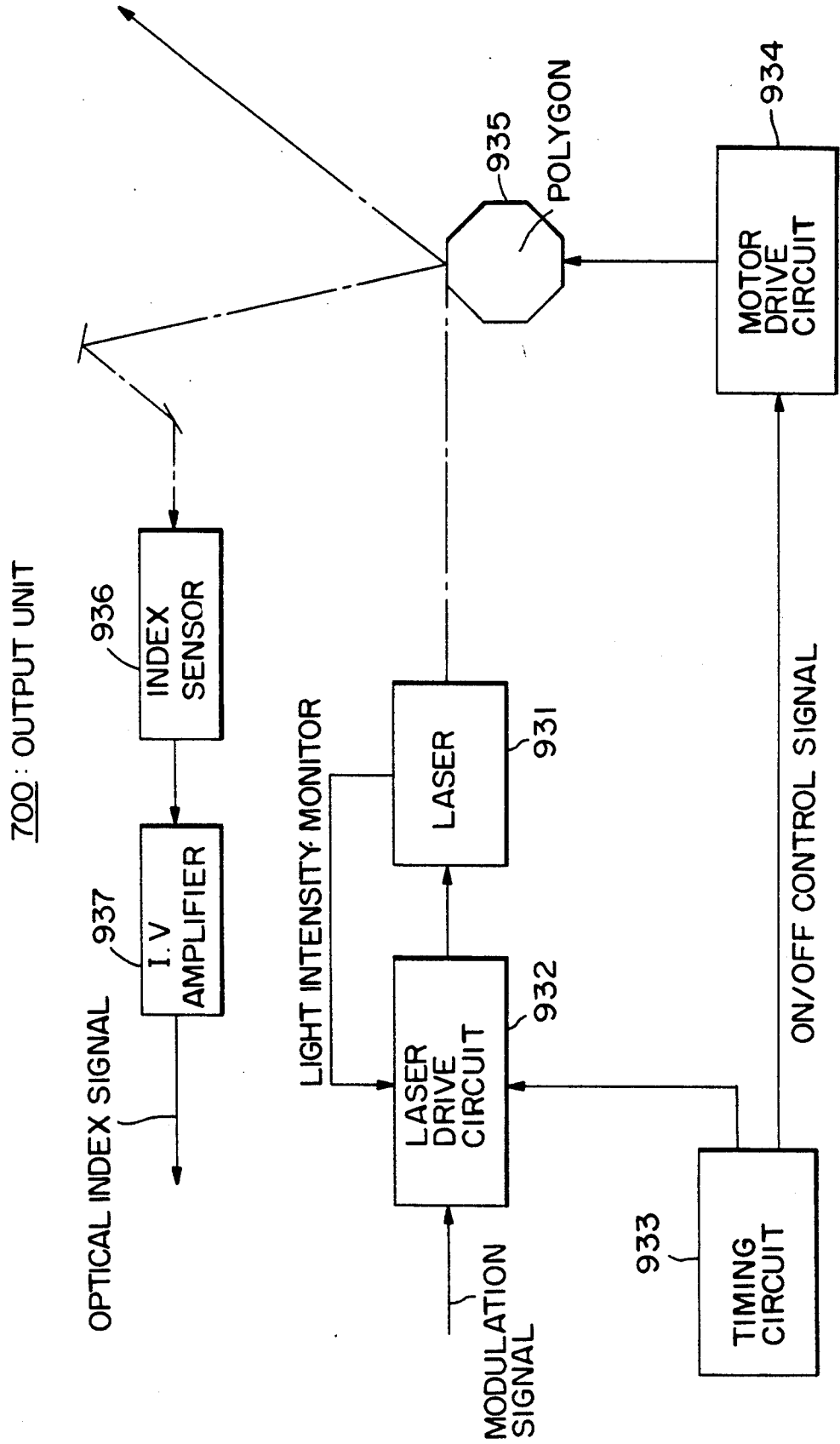
FIGS. 55 and 56 present a block diagram for the output apparatus and the laser beam scanner, respectively.

FIG. 55 shows the peripheral circuit of the output unit 700. The semiconductor laser 931 is equipped with its driving circuit to which the above binary data is supplied as a modulating signal. This signal causes laser beam to be modulated internally. The laser driving circuit 932 is controlled by the control signal from the timing circuit 933 so that laser beam is driven only in the horizontal and vertical valid sections. The signal that indicating the light intensity of laser beam is fed back to the laser driving circuit 932 so that laser is driven for a constant light intensity of beam.

The point start the operation for laser beam deflected by the octahedron polygon 935 is detected by the index sensor 936. The conversion from the index signal to the voltage signal by the I/V amplifier; the index signal is supplied to the counter clock 44 to form the line signal SH and to control the timing for optical primary scan.

Note that 934 is a drive circuit for a polygon motor; its on/off signals are supplied to the timing circuit 933.

Figure 56:
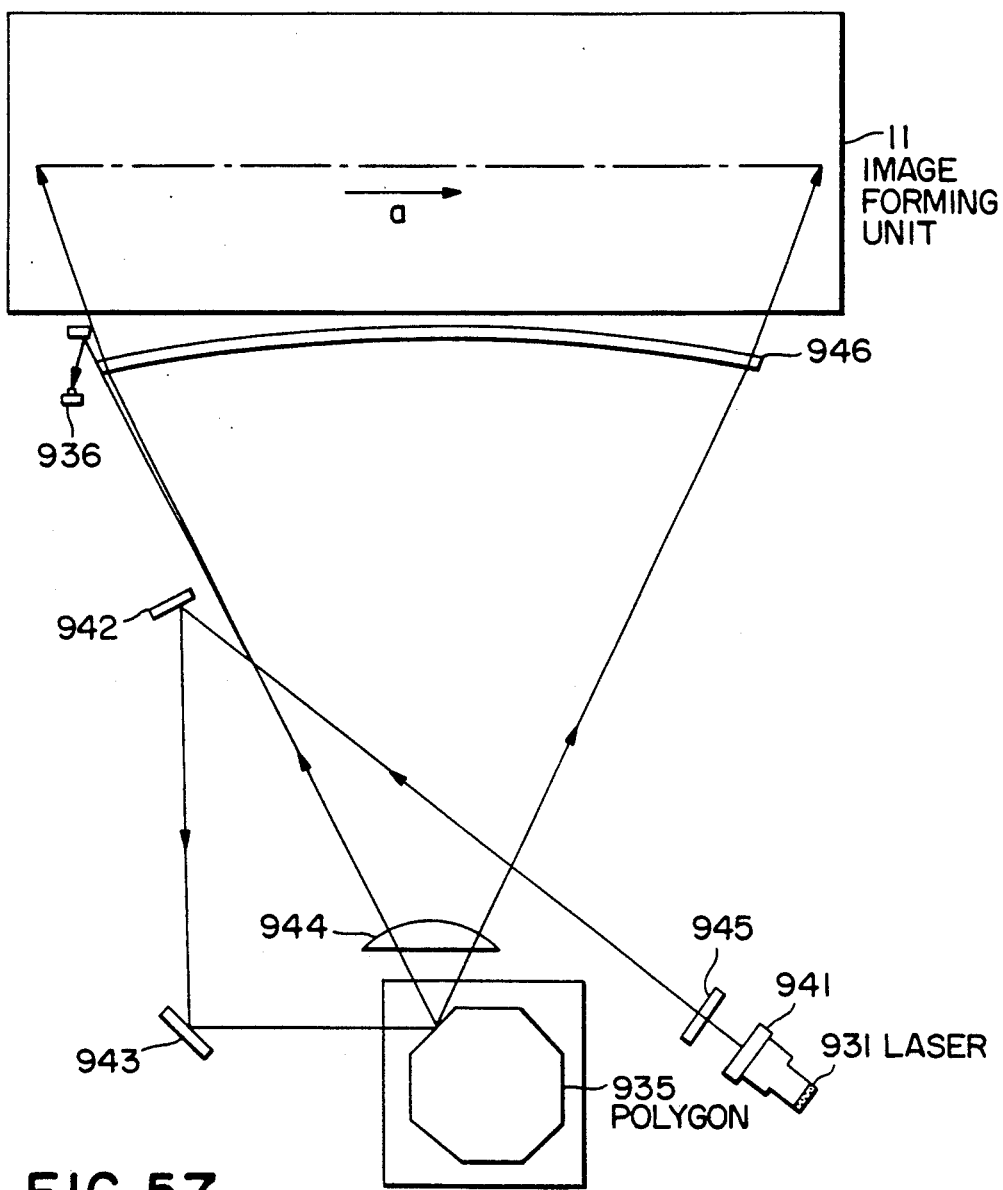

FIG. 56 shows an example which uses a laser beam scan (optical scanning unit) as an image exposure means.

The laser beam scanner 940 possesses semiconductor laser 931 which is on/off-controlled according to color-separated image (for example, binary data). Laser beam from the laser 931 is entered into the polygon 935 consisting of a rotating polyhedron multi-sided mirror through the mirrors 942 and 943. The laser beam is deflected by the polygon 935, then is irradiated on the surface of image forming unit 11 through the f-θ lens 944 for image pickup.

945 and 946 are cylindrical lenses with angle of turn.

The polygon 935 allows the laser beam to scan the surface of the image forming unit 11 at a constant speed in the predetermined direction a. This scan allows image exposure corresponding to the color-separated image.

The f-θ lens 944 is used to obtain the predetermined beam diameter on the image forming unit 11.

The polygon 935 can be galvanomirror or optical quartz deflector instead of the rotating multi-sided mirror.

Figure 57:
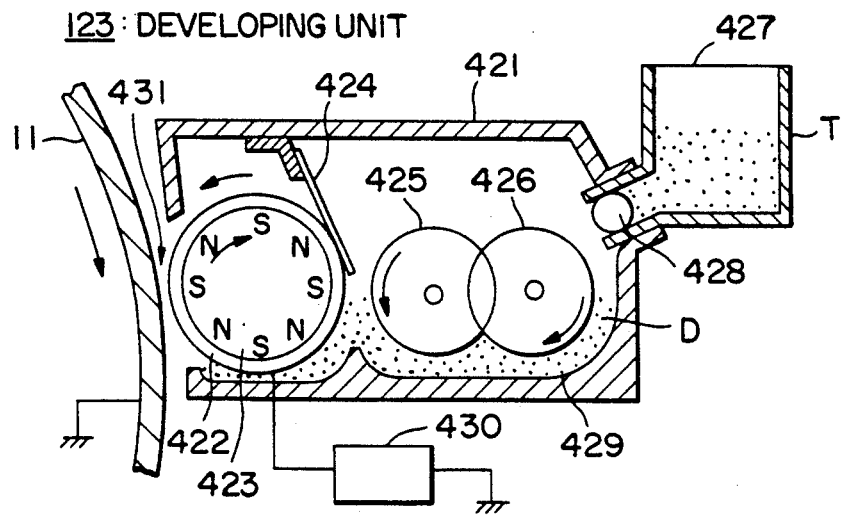
FIG. 57 is a cross section of developing apparatus.

FIG. 57 shows the example of the developers 123 to 125 that can be used for the laser recording unit shown in FIG. 2. Here description is given with respect to the developer 123; it is applicable to the description of the other developers.

In this figure, 421 shows a housing in which a cylindrical sleeve 422 is incorporated while being turned freely. In the sleeve 422 installed the magnetic roll 423 which has 8 sets of N and S poles. On the perimeter of the sleeve 422 contacted the layer-control piece 424 to obtain the desired thickness (10 to 500 μm) of layer of developer adhering to the sleeve 422.

The first agitating material 425 and the second agitating material 426 are installed in the housing 421. The developer D in the developer well 429 is satisfactorily agitated by the first agitating material 425 designed to rotate counterclockwise and the second agitating material 426 designed to rotate in the direction opposite to the first agitating material 426, while to superimpose each other. The agitated developer D is carried and adhering to the surface of the sleeve 422 by rotation of the sleeve 422 and the magnetic roll 423 in mutually opposite directions.

With the developer D adhering to the image forming unit 11, electrostatic latent image formed on the image forming unit 11 is developed with non-contact state.

During development, development bias signal supplied by the power supply 430 is applied to the sleeve 422. This development bias signal from the power supply 430 consists of a DC component which has been set to almost the same potential of non-exposure section of the image forming unit 11 and an AC component superimposed to the DC component.

As a result, development is conducted by transferring and adhering the toner T of the developer D on the sleeve 422 alone on the surface of the image forming unit 11 which has been selectively made latent.

427 is a toner container, and 428 is toner feed roller. 431 shows a development region.

A two-component developer is used as a developer. Under the condition where no development bias is applied, and the image forming unit 11 and development D do not contact each other, and vibration electrolysis is made by AC bias printing, the toner T is scattered and selectively adhering to the electrostatic image of the image forming unit 11.

In development of images in blue, red, black, and other colors on the image forming unit 11, this non-contact development method will not damage a preceding toner image by a succeeding toner image, and realizes thin-layer development.

Figure 58:
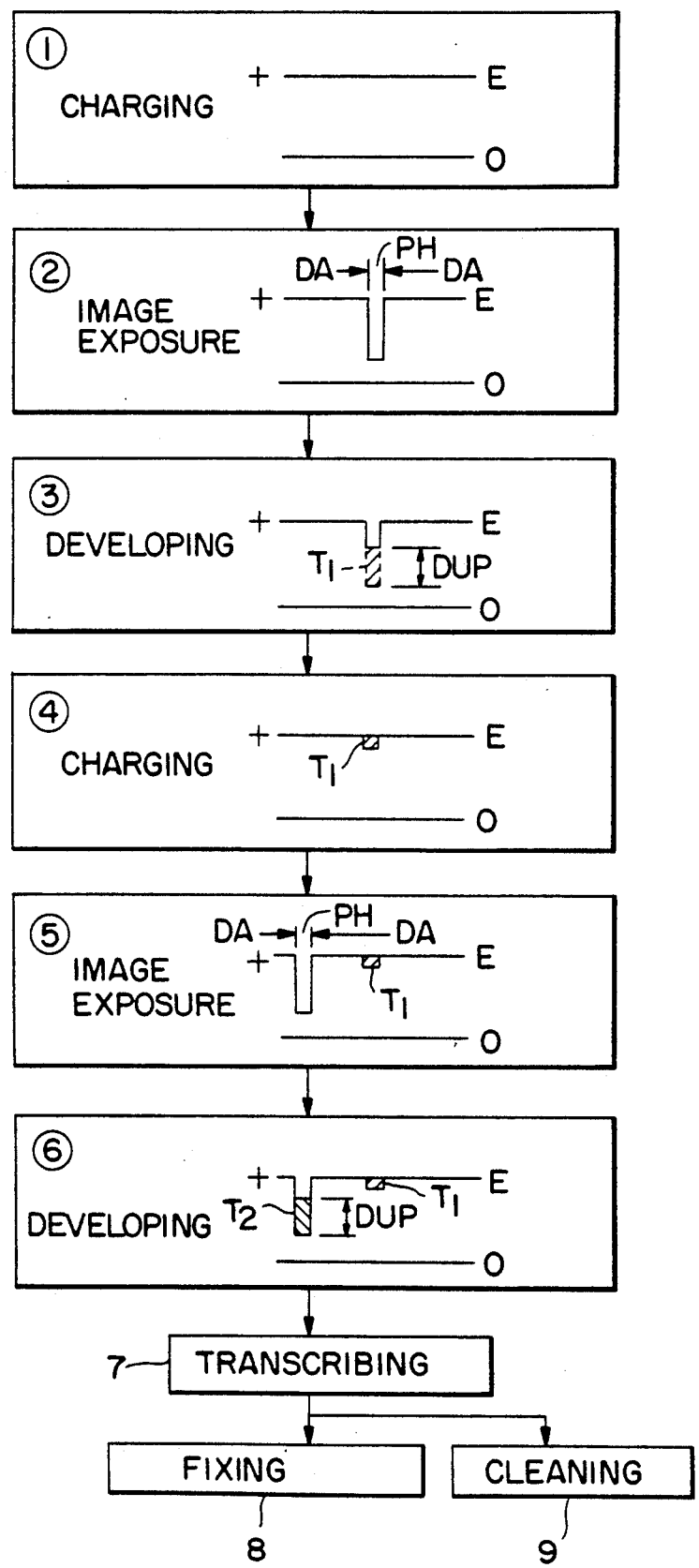
FIG. 58 presents a descriptive drawing for developing process.

FIG. 58 shows variations in surface potential of the image forming unit 11, assuming the charged polarity positive. pH shows an exposure section for image forming pair, DA is a non-exposure section for image forming pair, and DUP presents an increase in potential produced due to the adherence of the positive-charged toner T1 in the first development.

The image forming until 11 produces a constant positive surface potential E after uniform charging by a charger.

With the first image exposure using laser as an exposure source, the potential of the exposure pH decreases depending on its intensity of light.

The electrostatic latent image thus formed is developed by the developing unit to which positive bias almost equal to the non-exposure section's surface potential E is applied. As a result, the positive charged toner T1 adhering to the exposure section pH with relatively lower potential and the first toner image is formed. In the region where this image has been formed, the potential decreases due to adherence of positive-charged toner T1, but will not normally be the same potential as the non-exposure section DA.

Next, the second charging is made by the charger for the image forming unit surface on which the first toner image has been formed. As a result, the uniform potential E is obtained whether the toner T1 exists or not.

By the second image exposure is performed for the surface of the image forming unit 11.

Likewise, the second toner image is obtained to which development for positive charged toner T2 has been made with a different color from the toner T1.

After performing the same process three times, multi-color toner image is obtained on the image forming unit. This image is transferred onto the transfer paper P, and then heated or pressured to multi-color image data. In this case, residual toner and charge on the image forming unit are cleaned to be used for a next multi-color image forming unit.

The developing process is to be conducted taking care not to allow developer layer to contact the image forming unit surface.

There are some other methods than the electrophotographic method available for forming a multi-color latent image. One method is to form an electrostatic latent image by pouring directly onto the image forming unit by use of multiple electrodes; another is to form a magnetic latent image by use of a magnetic head.

The apparatus of the invention uses a 2-component developer consisting of nonmagnetic toner and magnetic carrier because it allows easy control of toner's frictional charging and excellent characteristic of development and adherence of any color to toner.

The following methods for obtaining toner images can be considered can be considered by use of the image forming unit 11.

First, one latent image is developed by one type of toner; toner is changed for each development process to obtain a multi-color toner image.

Secondly, one latent image is developed successively by use of multiple types of toners, thus producing a toner image with two or more colors overlapped.

Thirdly, two or more latent images are developed by use of toner of the same kind (the same one type or same some types), thus allowing synthesizing images.

In the use of the above 2-component developer, the thickness becomes very thin: 2,000 μm or less, or more desirable, 1,000 μm or less, and 10 to 500 μm, or more desirable, 10 to 400 μm. In this case, the distance between the image forming unit 11 and the sleeve 422 is made smaller.

Even if bonding force of the developer's carrier and toner and that of the carrier and the sleeve 422 are weak, the toner adheres to the sleeve 422 satisfactorily, preventing the toner to be scattered.

By making the developer layer thinner and the distance between the image forming unit 11 and the sleeve 422 smaller, the vibration electrolysis required to scatter the toner can be adjusted lower. This also makes developing bias voltage lower.

Thus, in addition to reduction in toner scattering, there is another advantage: capability of controlling leak discharge based on the development bias from the sleeve surface.

If the distance between the image forming unit 11 and the sleeve 422 is made smaller, the electrolytic strength for the development region 431 (space where the image forming unit 111 and the sleeve 422 face) becomes larger, allowing satisfactory development for delicate tone variations or fine patterns.

On the other hand, if the development layer is made thinner, the amount of toner to be carried to the development region decreases and the amount of development also decreases. High-speed rotation of the sleeve is effective for a larger amount toner to be carried.

With a line speed ratio 1:10 with respect to the image forming unit 11 and the sleeve 422, the speed component which the developed toner provides in parallel with the latent image becomes larger resulting in directional development and deteriorated picture quality.

This requires that the toner should adhere the sleeve with a density of at least 0.04 mg/cm². Assume that the sleeve 422's line speed is Vsl, the image forming unit 11's line speed, Vd, and the amount of toner in the thin layer on the sleeve 422, Mt. The following requirement must be satisfied:

$$|Vsl/Vdl| \times Mt \geq .4 \ (mg/cm^2) \ |Vsl/Vd| \leq 10.$$

Taking the development efficiency into account, it is desirable to establish:

$$|Vsl/Vdl| \times Mt \geq 0.5 \ (mg/cm^2) \ |Vsl/Vd| \leq 8.$$

Furthermore, the results of experiment have showed that the following relationship should be established.

$$|Vsl/Vdl| \times Mt \geq 0.5 \ (mg/cm^2) \ |Vsl/Vd| \leq 5.$$

In this case, the ratio between the toner in the developer and the carrier should be so established that ratio of the total area of toner and that of carrier in the unit volume fall in the range of 0.5 to 2.

With the above setting, the toner in the thin layer can be efficiently developed, stabilizing development condition, and obtaining satisfactory picture quality.

As a means to forming thinner developer layer, the layer regulating piece 424 is frequently used, which consists of a pressure-contact plate lightly, elastically contacting the sleeve 422.

The layer regulating piece 424 consists of an elastic plate so pressured that its end faces the upper side of sleeve rotation. By allowing the developer to pass the distance between the sleeve 422 and the piece regulating piece 424, the thinner layer is formed.

Assume that the distance between the layer regulating piece 424 and the sleeve 422 is 0.08 mm or more. A constant volume of toner can be stably carried irrespective of mounting accuracy and mechanical precision. With a distance of 0.1 mm or more, the stability can be more improved.

However, with a distance of 5 mm or more, it was observed that uniformity of developer could no longer be kept.

The developer layer which has been made thinner is used to develop the electrostatic image of the image forming unit 11 carried to the development region, with the requirement of the following expressions (1) and (2) satisfied.

$$|(vsl - n\omega mh'/3)/Vd| \leq 10 \qquad (1)$$

$$|(vsl - n\omega mh'/3)/Vd| \geq mt \ 0.4 \ [mg/cm^2]. \qquad (2)$$

where,

Vsl = sleeve line speed (mm/sec)
n = No. of magnetic poles of magnetic roll
ωm = height of magnetic brush (mm)
Vd = line speed of image forming unit
mt = amount of volume of toner adhering per unit area of the sleeve (mg/cm²)

Vsl, ωm are assumed to be positive if they are in the same direction with respect to be movement of the image travel forming unit. The height of magnetic brush is an average height of magnetic brush standing on the sleeve.

More specifically, the sleeve line speed, Vsl, is in the range of 100 to 500 mm/sec. The number of magnetic poles, n, is in the range of 4 to 16. The revolution angular speed of the magnetic roll, ωm, is in the range of 30 to 150 radian/sec. The magnetic brush height, h', is in the range of 50 to 400 μm. The line speed of the image forming unit 11, Vd, is in the range of 30 to 150 mm/sec. The amount of volume of toner adhering per unit area of the sleeve, mt, is in the range of 10 to 30 mg/cm².

These are targets values are provided to attain satisfactory development; and vary depending on the distance d between the image forming unit 11 and the bias voltage.

The requirement for desirable development is given as follows taking these factors into account.

$$5 \leq Vp - p/d - h' \leq 50 \ (kV/mm) \qquad (3)$$

where Vp - P = peak-to-peak voltage of AC bias (kV)
d = distance between the image forming unit and sleeve (μm)
h' = maximum height of magnetic brush (μm).

The maximum height of magnetic brush is that of the magnetic brush on the magnetic pole in the sleeve 422.

Figure 59:
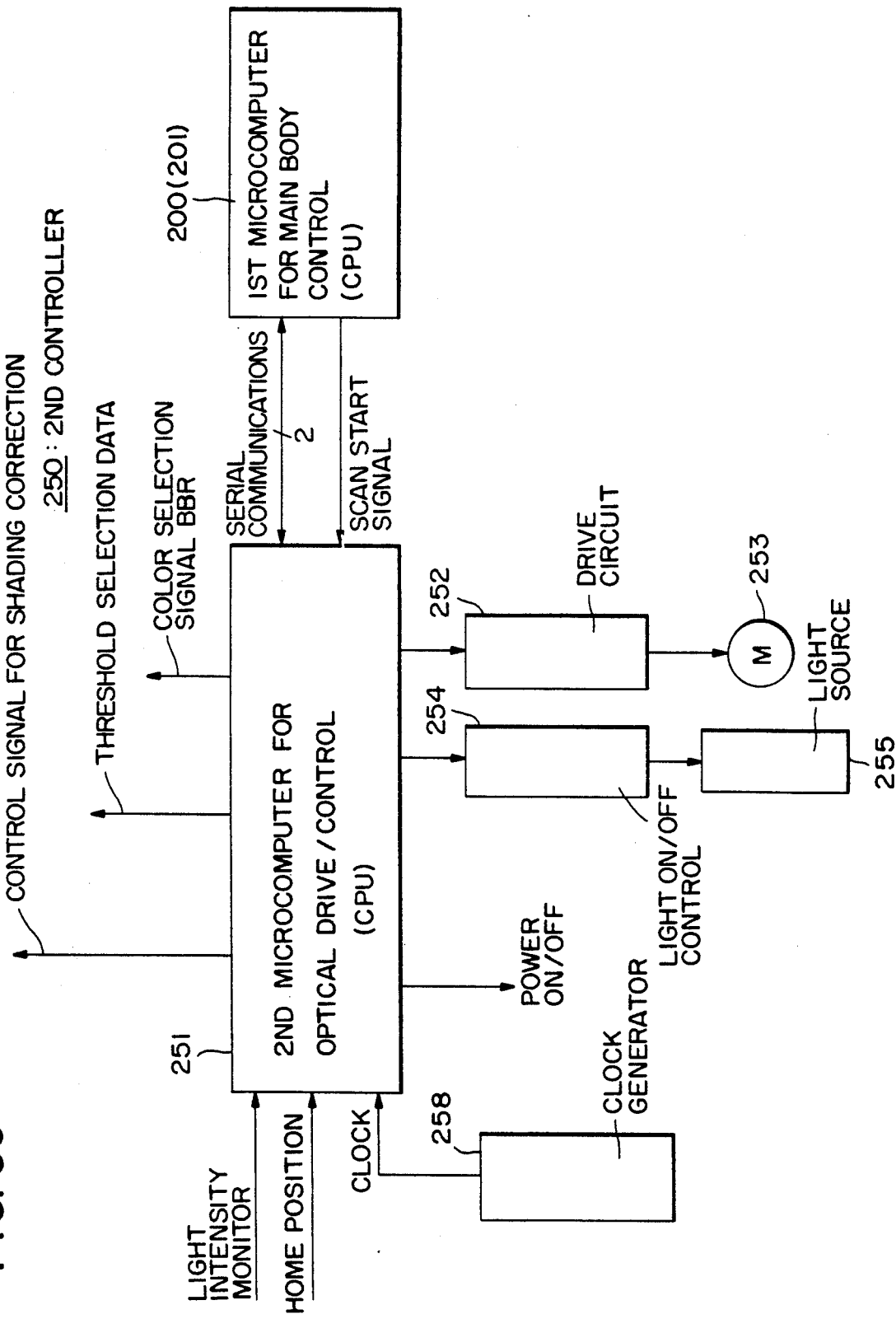
FIGS. 59 and 60 are a block diagram for the second controller and the first controller, respectively.
Figure 60:
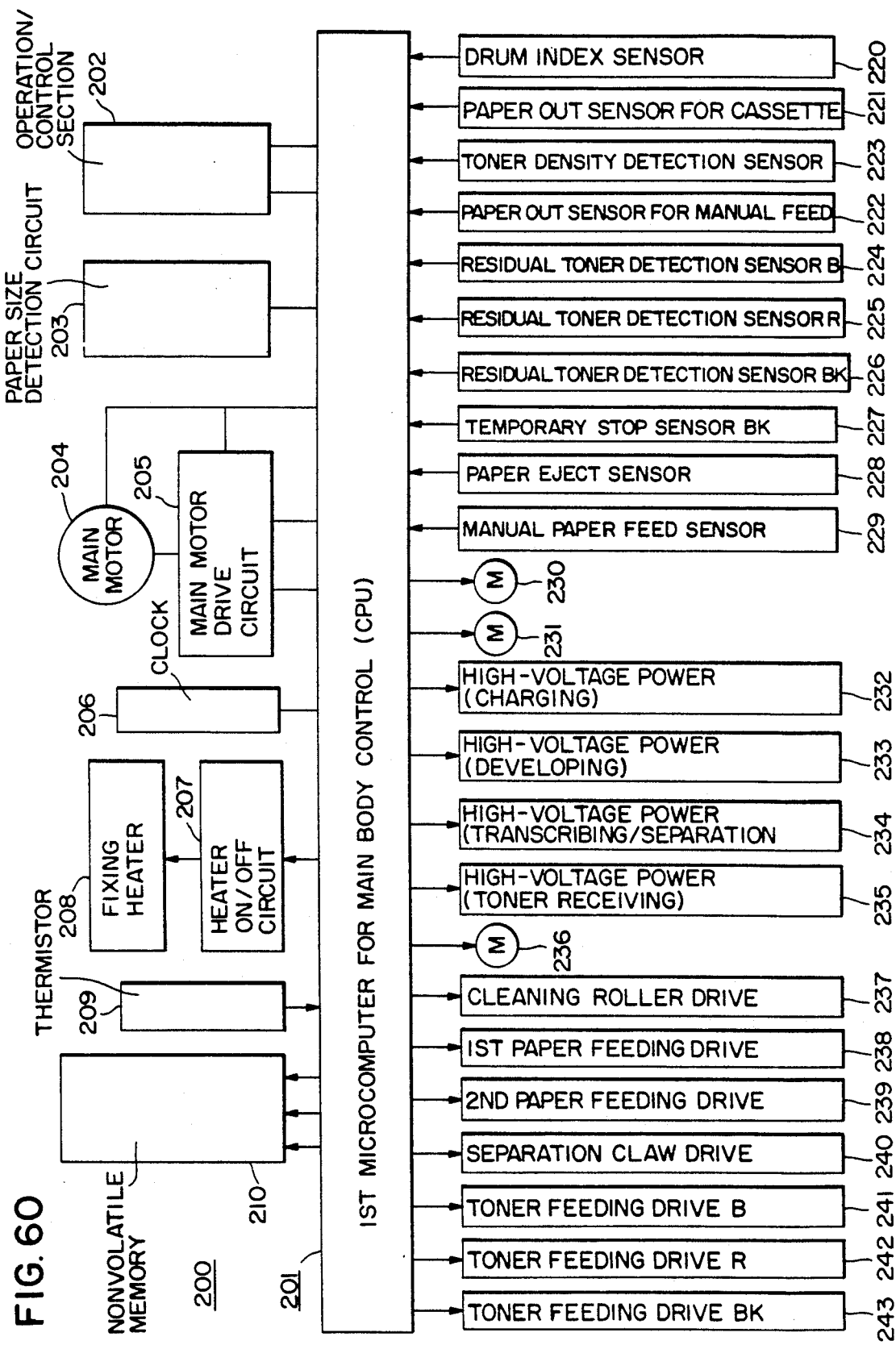

The units and circuits described above are all controlled by the first and second controlling sections 200 and 250 as shown in FIG. 59. The description begins with the second controlling unit 250.

The second controlling section 250 is used mainly for controlling the image-reading system and its peripherals. The 251 is a microcomputer to control optical drive (2nd microcomputer). Communications between this and the microcomputer to control the main body is done in serial mode. The optical scan start signal from the first microcomputer 201 is supplied directly to the interrupt pin of the second microcomputer 251.

The second microcomputer 251 generates various directive signals synchronously with the clock of the desired frequency obtained from the standard clock generator (12 MHz).

In addition, the second microcomputer 251 outputs the threshold signal and BBR signal (color selection signal) for color recording.

This microcomputer also supplied the following control signals.

First, the signal to turn on or off the driving circuits of CCD104 and CCD105 is supplied to the power supply control circuit (not illustrated). Secondly, the predetermined control signals are supplied to the turn-on control circuit 254 for the light sources 85 and 86 used to irradiate light required for the document 81. Thirdly, control signal is supplied to the drive circuit 252 that drives the stepping motor 253 used for move the movable mirror unit (like 88).

The second microcomputer receives data which show the information about light intensity, home position, and other data.

The first microcomputer 201 is used mainly for controlling the color copying machine.

FIG. 54 shows an example of input and output systems of the color copying machine.

The operation/indicator section 202 receives a variety of input data including multiplication, recording position, and recording color, with display of them.

A LED or other devices are used for the purpose of display.

The paper size detecting circuit 203 is used to detect cut paper in the tray, to display it, and to automatically select the paper size according to document size.

The drum index sensor 220 detects the rotation position of the image forming unit 11. The index signal from the sensor is used to control the timing of the electrostatic processing timing.

The paper-out detection sensor 221 is used to detect whether there is paper or not. The manual feed paper-out detection sensor 222 is used to detect whether there is paper or not in the manual paper feed mode.

The toner density detection sensor 223 is used to detect the toner density on the drum 11 or after fixing.

Three toner residual amount detection sensor 224 to 226 are used to detect residual amount of toner of the developing units 123 to 125. Information about toner feeding is shown by the display device for toner feeding installed on the operation section.

The temporary stop sensor 227 is used to detect whether paper has been correctly set tot the second paper feed roller (not illustrated) from the cassette during color copying machine operation.

The paper eject sensor 228 is used to detect whether paper has been correctly ejected to the outside after the fixing. The manual paper feed sensor 229 is used to detect whether a manual paper feed tray has been set. If so, manual paper feed mode is automatically assumed.

The sensor output from each sensor is taken by the first microcomputer 201, related data are displayed on the operation/indicator section 202, and the color copying machine is driven as required.

The color copying machine is equipped with the motor 230 for development in red and blue colors, along with the motor 231 for development in black color only. These motors are both controlled by the directive signal from the first microcomputer 201. Likewise, the main motor 204 (drum motor) is controlled by the PLL-configured drive circuit 205 which is also controlled by the control signal front the first microcomputer 201.

Development in colors requires that the predetermined high voltage be applied to the developer in operation. This calls for the installation of the high-voltage power supply for development, 232, and the high-voltage power supply for transferring and separation, 234, and high-voltage power supply for toner receiving, 235. To them, the predetermined high voltage is applied as required.

Note that 237 is a cleaning roller driving section, 238 is the roller driving section for the first paper feed roller, 239 is the roller driving section for the second paper feed roller, and 236 is a motor for release contact for cleaning.

And 240 is a driving section of separation claw. The second feed roller is used to carry the paper from the first paper roller onto the electrostatic latent image formed on the drum 11.

The fixing heater 208 is controlled by the fixing heater on/off circuit 207 according to the control signal of the first microcomputer 201.

The fixing temperature is read out by the thermistor 209, and usually controlled to be an appropriate temperature by the first microcomputer 201.

206 is a clock circuit (approximately, 12 kHz).

The nonvolatile memory 210 installed in conjunction with the first microcomputer 201 is used to store data to be retained after power-off. Such data include total counter values and initial settings.

Thus, the first and second microcomputers 201 and 251 performs a variety of controls required for color image processing, according to the predetermined sequence.

Figure 61:
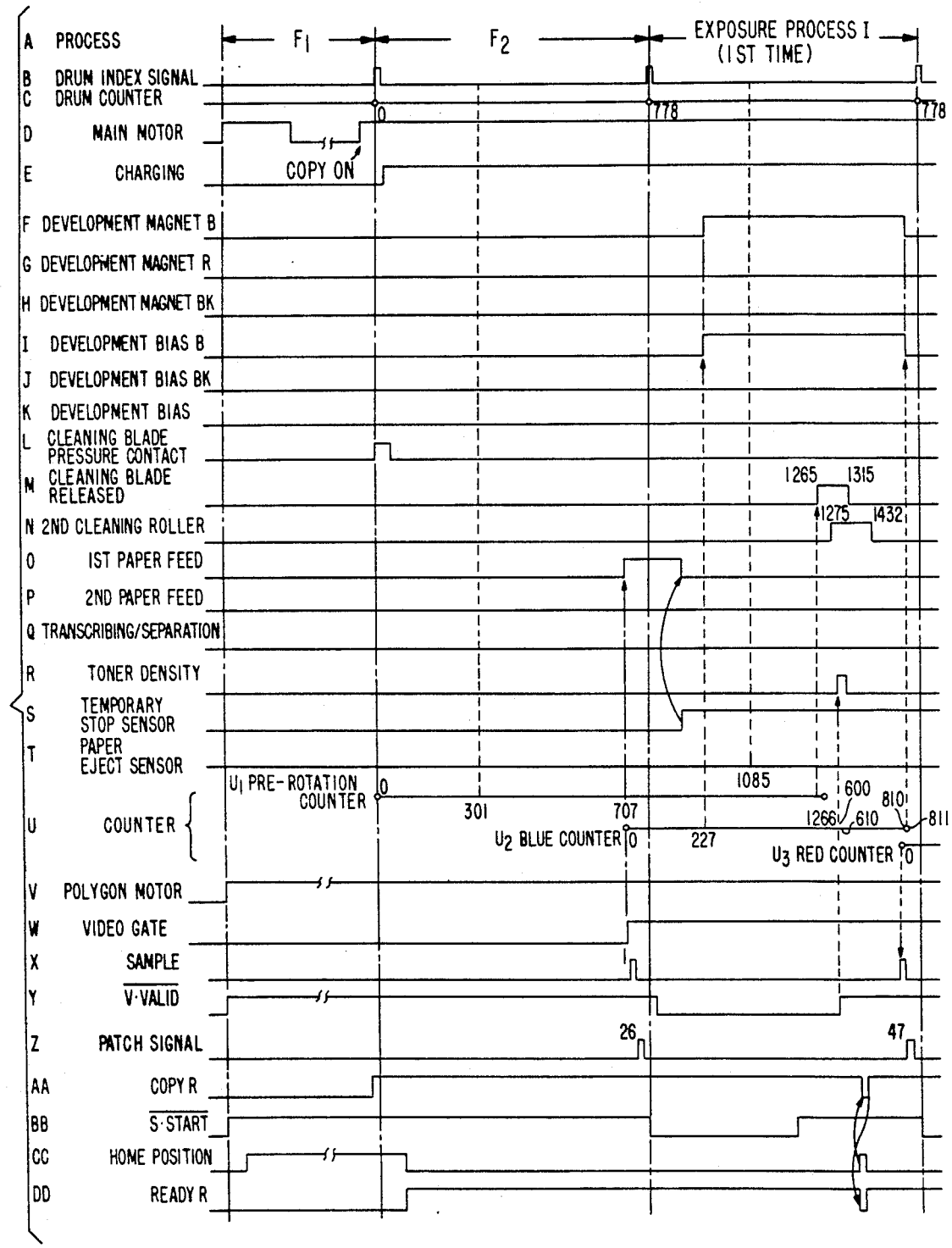
In FIGS. 61, 62 and 63 there are waveforms that explain operations of the controller.
Figure 62:
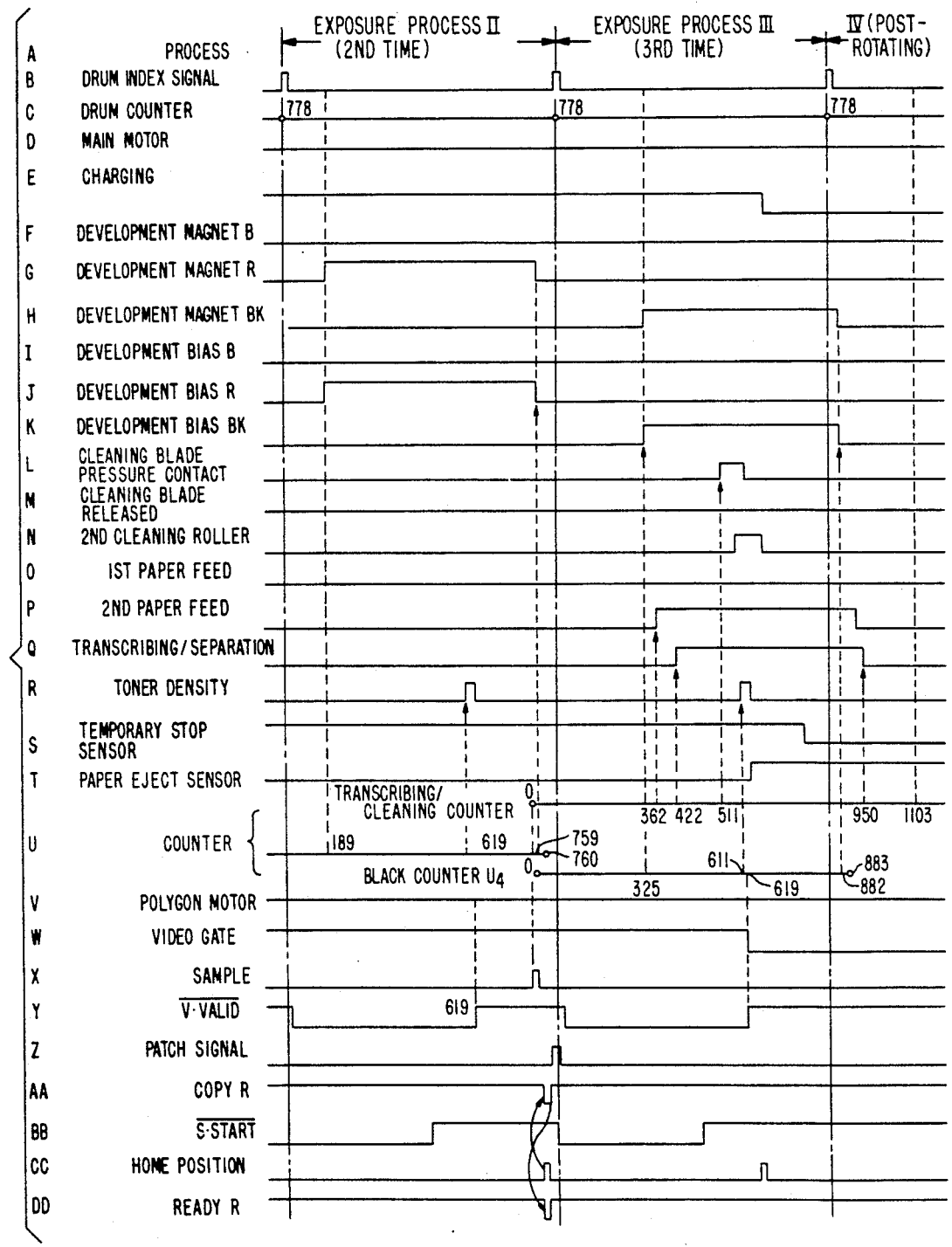
Figure 63:
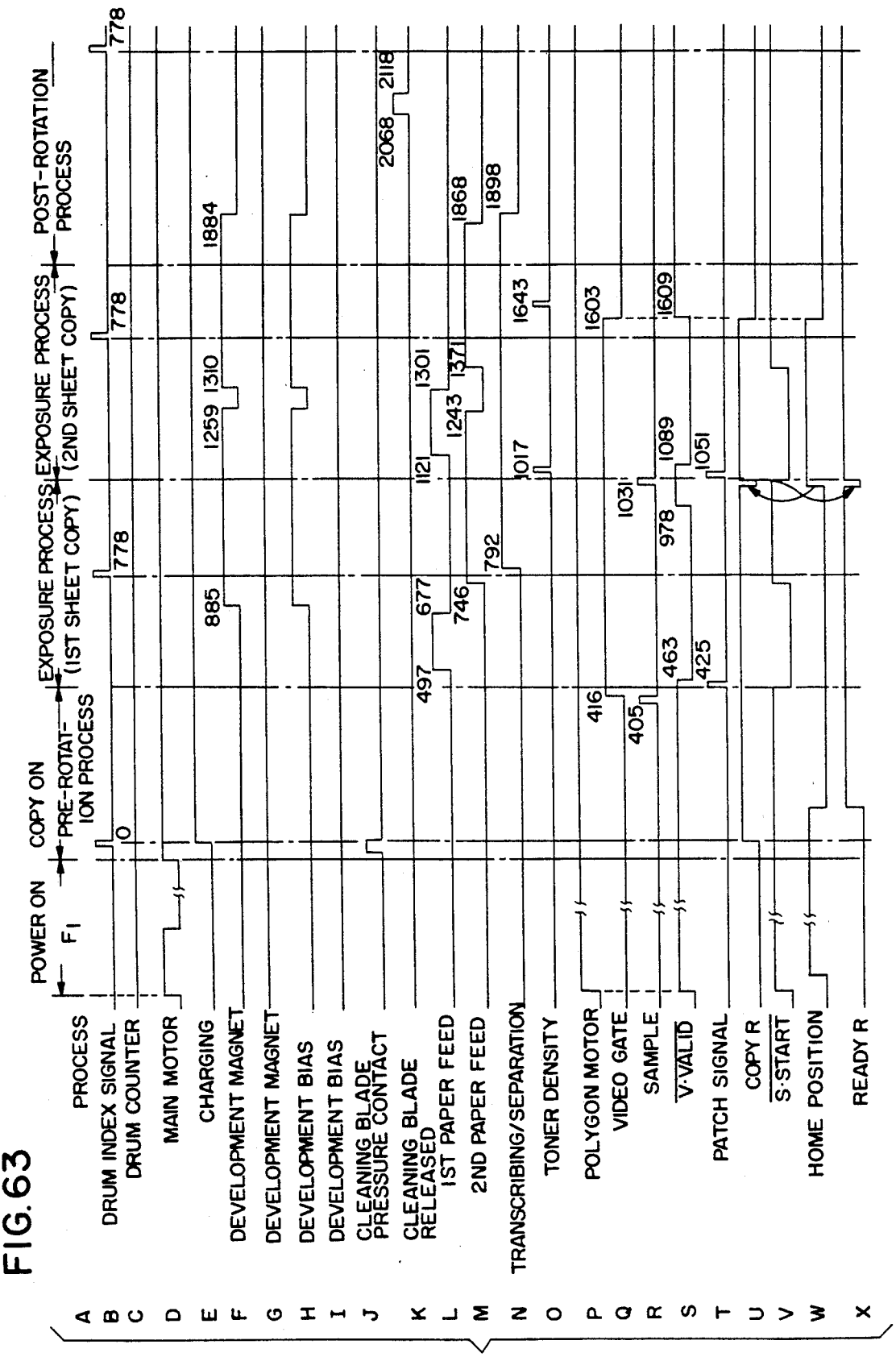

The next description, with FIG. 61 and 63, is related to the a series of operations for color recording. This working example allows recording in single-color recording by an instruction given from the outside in addition to recording in multiple colors (blue, red and black). First, multi-color recording is described using FIGS. 61 and 62.

In FIGS. 61 and 62, the period Fl defines from the period from power-on of the main power supply to manipulation of the copy button. The period F2 shows the period for pre-rotation of the image forming unit (hereinafter called drum). The period I is a blue-development (recording) period, and the period II is a red-development period. Likewise, the period III shows a black-development period, and the period IV is a period for post-rotation.

The numerals shown in these figures values for the drum counter or those for the pre-rotation counter and other counters.

Figure 64:
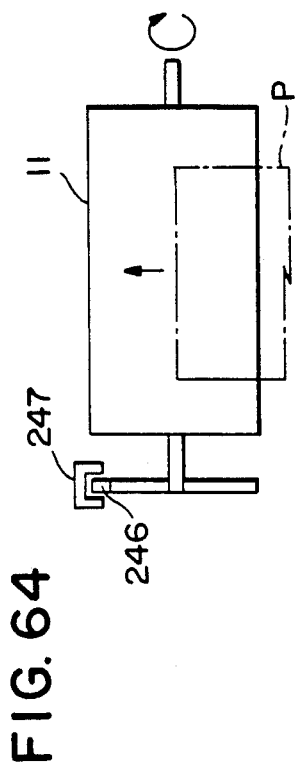
FIG. 64 is an illustration for index sensor description.

With the main power supply on, the main motors, like drum motor 204, rotate during a predetermined period. With the copy button mainpulated, the main motors (FIG. 61-D) rotate. If the index sensor 247 detects the V-letter index device 246 (FIG. 64) installed on the drum 11, the drum counter clears (FIG. 61-B, -C). Succeeding processing is performed based on the drum counter value. The lengths of periods I to IV (in term of time) are the same. In this example, the counter value is 778 and the drum 11 is designed to rotate once.

In the pre-rotation period F2, the pre-transfer lamp is turned on from almost the middle of the position during a certain period (to the middle of the period I for blue development), and pre-processing for color development is done.

In the blue- and black-development periods, the magnet 423 and development sleeve installed on the developers 123 to 125 rotate and development bias is risen synchronously with these rotation timings (FIG. 61-F to -K).

The cleaning blade 127 is pressure-contacted synchronously with the rise of the drum index signal of the pre-rotation period F, and toner adhered to the drum 11 is removed (FIG. 61-L). The cleaning blade is released after a single rotation of the drum 11 (FIG. 61-M). After this toner removal, some amount of toner may be still on the drum surface, or toner may be scattered after release of the black. Accordingly, the cleaning roller has been designed to start its operation at a certain later timing from the release of the black to remove residual toner (FIG. 61-N).

Right before the blue development period I, the first paper feed roller rotates to feed the recording paper to the second paper feed roller (FIG. 61-0). The first paper feed roller is installed to carry paper in the cassette. The paper carried by the first paper roller is carried by the second paper roller to the drum 11 at the timing of the final exposure process period (exposure process III, in FIG. 62-P).

The paper feed operation by the first paper feed roller stops when the recording paper has reached to the temporary stop sensor installed right before the second roller. If the second paper feed roller is driven and the recording paper has passed through, the sensor output becomes zero (FIG. 62-S).

Transferring is performed little later than the drive of the second paper roller. Synchronously with the transferring, the predetermined AC voltage is applied to the paper separation electrode to prevent the paper from being wrapped around the drum 11 (FIG. 62-Q).

After the temporary stop sensor 227 has been become zero, the development and fixing are finished, and paper eject sensor 228 begins to examine whether the paper has been correctly ejected after fixing (FIG. 62-T).

In color recording, toner density is detected every time development is done as the timing determined by the detection counter values for blue to black colors (FIGS. 61 - 62-U2 to -U4). These counters have been reset according to the timing of the start of density detection patch writing. The blue counter is reset when the drum counter value is 706. If the drum counter value is 602 after resetting, toner density is detected.

Likewise, the red counter is reset if the drum counter value is 707, and the black counter is also reset if the drum counter value is 707.

Note that the toner density is detected by referring to a specific image region. Accordingly, patch signal for the density detection, as shown in FIG. 61-Z (for example, image signal for a 8×16 mm image region), is used. With this signal obtained, toner detection signal (FIG. 61-R) is provided after a lapse of a predetermined period, and the image density of the region is detected.

After the copy operation start, the pre-rotation counter is cleared at the timing when the first drum index signal is entered. When the counter value is 1266, the pre-rotation processing is completed (FIG. 61-U1).

With main supply power supply on, the polygon motor 934 to drive the polygon 935 is simultaneously driven, whereby the polygon 935 rotates at a constant speed (FIGS. 61-62-V).

The image data required for image recording is sent at the following timing: the vide gate becomes "1" synchronously with the blue counter, and becomes "0" at the same time as the completion of write operation (FIGS. 61-62-W). The image data is sent to the output unit 700 only if the video gate is "1".

For each development step, the vertical valid signal V-VALID made valid only in the period (until the drum counter value is 528, for a paper size of A4; see FIGS. 61-62-Y).

At the same time when the copy signal is sent from the control circuit of the output unit 700 (FIGS. 61-62-AA), the start signal for the optical scanning is output. This optical signal is in the start state for the fall from "1" to "0" (FIGS. 61-62-BB).

Where the image reading section B is configured so that the movable mirror unit with a light source (a kind of image reading mean) is travelled, the home position signal to indicate the optical home position is sent to the output unit 700's control circuit for each development processing step (FIGS. 61-62-CC).

To perform exposure process with the home position signal, the copy R signal (FIG. 61-A) should be sent (FIGS. 62-62-DD).

The above is the description of the timing chart for multi-color recording.

To record the original image in a designated color (only single color), use the timing chart as shown in FIG. 63 in which image processing is performed with respect to the designated color and image processing steps for other colors are not executed.

For this reason, detailed description of the operation of single-color image processing is omitted. The processing step in FIG. 63 presents an example where image processing is done in black color (normal black/white color).

The next description is related to the operation/indicator section 202, with FIG. 65 referred to.

a in this figure shows a copy switch. Depressing this switch allows copy operation according to the above described sequence. Under this switch are LEDs, red one of which shows warming up and green one of which indicates ready state, when being lit.

b is the indicator to show the number of copy, self diagnosis mode, or abnormal mode, and its condition. It is consists of a 7-segment LED which provides numeric representation for the above condition.

c is the key pad to set the number of copies, indicate the self-diagnosis mode operation, interrupt copy operation and clear the number of copies. For example, with keys 4 and 7 depressed and the power supply switch on, the self-diagnosis mode is automatically assumed. In this mode, by entering specific numbers, the red-color developing unit motor can be automatically rotated, for example. Also in this mode, the power supply can be turned on by inputting a specific number or without depressing the key after power-off, allowing the normal mode to be set again.

The normal mode enables normal copy operation. Combination of numeric keys and the P button allows data and test patterns to be printed. For example, by connecting the print controller to the second interface 42, entering data "52P" and turning the copy button, the data of the print controller data is output.

Likewise, by entering data "53P" test patterns can be obtained. If the stop/clear key is depressed in the course of copy operation, for example, in the course of blue-color development with single-sheet copy in three colors, the post-rotation process proceeds after the completion of blue-color development, then returning to the initial state. This applies to the copy of multiple sheets.

d shows the key to release the EE mode. Depressing the key to release the EE mode and conducting key operation shown in e and i later described enable manual adjustment of threshold.

e is the keys to determine the threshold level of the overall image. Depressing the left-hand key enables a low threshold to be selected. A depression of this key allows a discrete change from the normal threshold to a next threshold within the range of 7 threshold steps. This applies to the operation of the right key but in the opposite direction. Since a portion of the document in one color (black, red or blue) is different from that in another color, a group of keys, i, is used to determine a threshold for each color.

i is a group of keys used to determine a threshold for each color as already described. For example, the blue key is depressed to change a threshold for blue color. In this case, the LED of the key lights, the middle LED of the 7-level meter flashes. To obtain the desired threshold, either the left or right key of e is depressed to change the set level for each stage. Also to obtain the desired level, the blue key is depressed again and the level shown by flashing is set. In this stage, the LED in the level meter no longer flashes, and is kept lighting. This is applicable to red and black colors.

Three color copy modes available: single-color mode, 2-color mode and 3-color mode which is selected by groups of keys shown by f and g. The following is the description for mainpulation of these keys.

In single-color recording, the first step to do is depress the mono-key. For blue-color recording, the blue key, f, is depressed. Likewise, for black-color recording, the black key is depressed. This applied to the red-color recording.

In three-color recording, the multi-key, g, is depressed. With this manipulation alone, three-color mode is assumed. By depressing the copy key, copy operation is done in the order of blue, red and black, colors.

If the red key is depressed in this mode, two-color mode without red color is assumed. Depressing the copy key in this mode conducts copy operation in the order of blue and black colors. Similarly, depressing the blue key assumes the mode without blue color, and depressing the copy key in this mode conducts copy operation in the order of red and black colors. Depressing the black key will conduct the copy operation in the order of red and blue colors.

The key, h, is use to perform partial color conversion. Depressing this key detects the marker region on the document. The black-colored portion enclosed by the marker is recorded in the same color as the marker by the above process.

In this example, the keys are shown as those to be used for partial color conversion. However, combination of these keys with a group of keys, c, enables a variety of image processing with respect to the detection region.

For example, the 0XP key is used for processing with respect to a region enclosed by marker, while the 1XP is used for processing with respect to the outside the region enclosed by marker. Determining X depending on the contents of processing will allows a combination of copy processing as shown in FIG. 66.

Figures 66, 67:
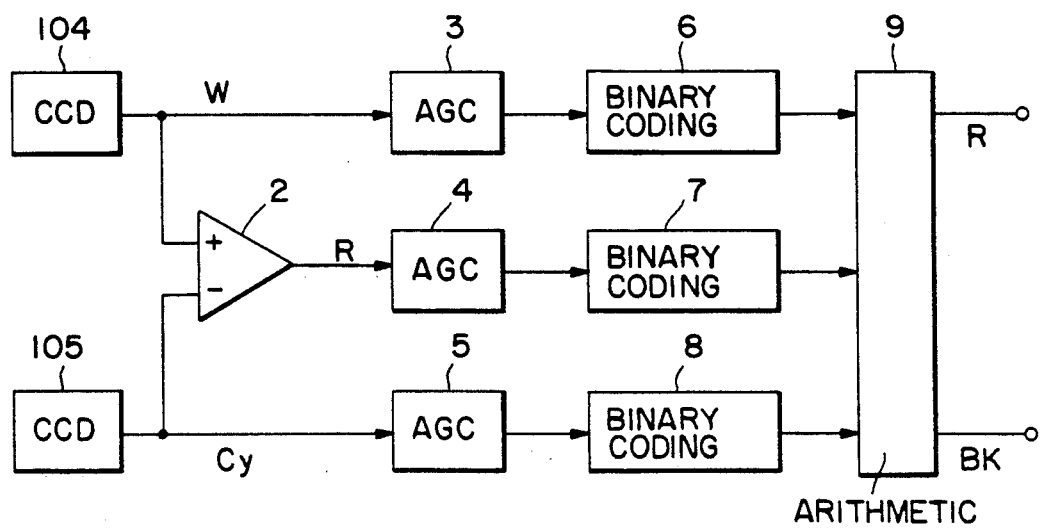
FIG. 66 gives key operation description.
FIGS. 67, 68 and 69 are block diagrams used for describing conventional units.
Figure 68:
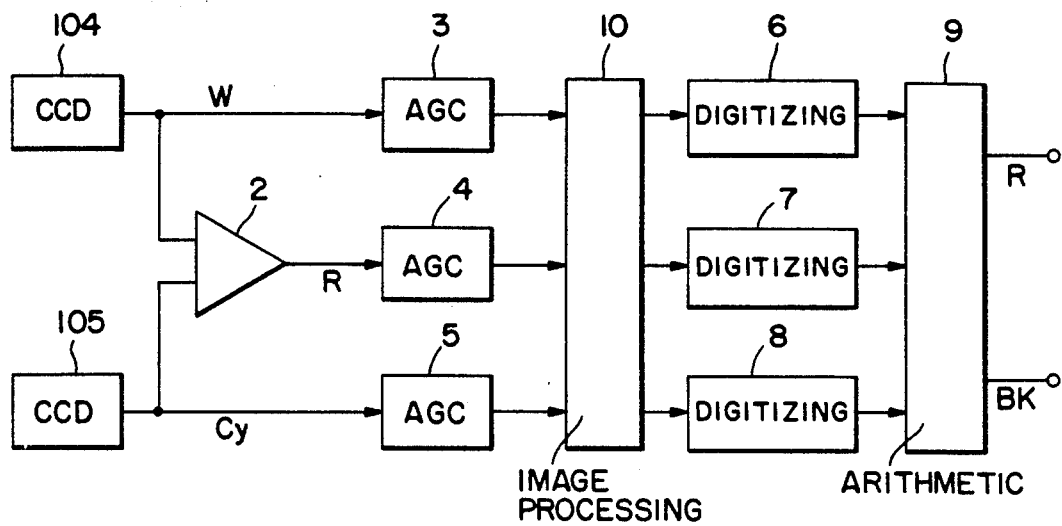
Figure 69:
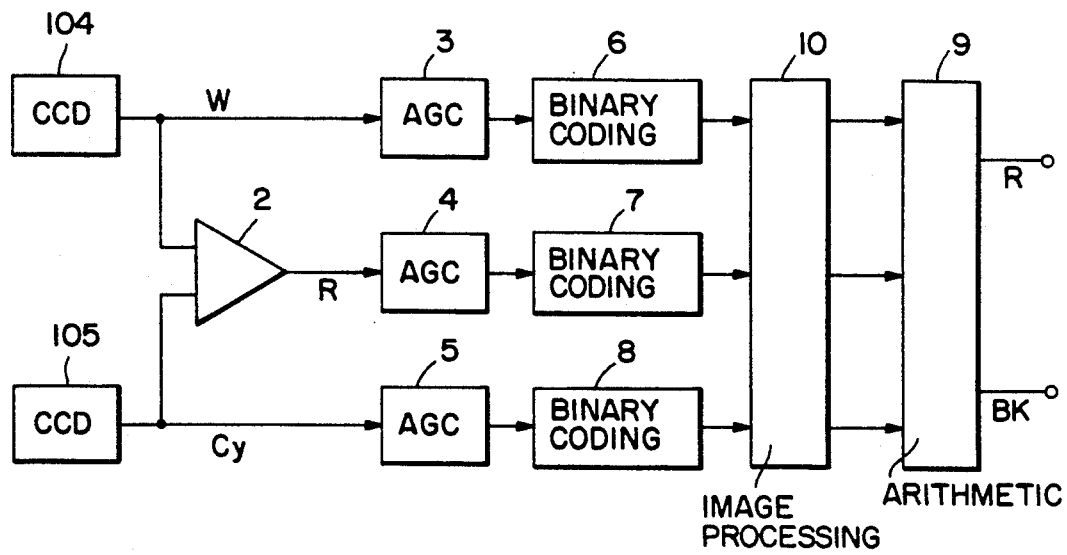

The processing shown in FIG. 66 can be effectively done by corresponding the marker color and its processing 1:1 like, the red marker to "extraction" and the blue marker to "elimination".

Such function is possible use of the color data selecting circuit 500B as shown in FIG. 43.

These function can be designated by a combination of key-switches a by a independent key provided on a operation part.

The key, j, is used to prepare transparent document for OHP. The fixing temperature is about 200° C. The fixing temperature is thus increased to melt toner on the film, to improve smoothness and to enhance transparency.

The key, k, is intended for fine-line mode. This key allows laser power to be lower than the normal use (5 mW) to 1 to 2 mW, in order to improve reproducibility of letters. This mode is effective specially if used after MTF correction has been made on extremely strong extent.

The LED device, 1, is used to indicate the operation state of the copying machine (jam, paper feeding, paper travel, etc.) and other feeding.

The following describes combinations of key manipulation. Possible combinations are: keys of g with those of e and i, keys of g and those of d, keys of h and those of e and i, keys of h and d, or keys of j and k.

Use of keys of c provides a variety of instructions for check of operation. Examples of the use are as follows.
  (a) 6XP: Scanner check
  60P+copy Turns on the flash light (FL) and stops the scanner optical system.
  1+copy: Travels the optical system, with FL on, at a slower speed in the secondary scan direction. Note that the optical system will stop at the current position with the FL on if the copy switch is turned off.
  2+copy: The same function as the above "1+copy", except that the optical system travels in the opposite direction.
  3+copy: Performs normal scanning successively with FL on (3-color mode).
  4+copy: Performs normal scanning successively with FL on (1-color mode).
  5+copy: Performs normal scanning successively with FL on (red-color mode).
  6+copy: Performs normal scanning successively with FL on (blue-color mode).
  61P+copy: Performs the same operation as above, with FL on, the optical system stopping, and 1 to 6+copy depressed.

The operation is released if the stop/clear key is depressed. In each operation, image data is output from each circuit to check the signal level.
  (b) 7XP: Checking the printer section
  70P+copy: Rotates the polygon motor alone, with the laser on. The index signal can be checked.
  1+copy: Outputs printer controller data.
  2+copy: Outputs test pattern data.
  3+copy: Outputs patch data.
  71P+copy: Recording section checking mode.
  1+copy: Charging unit on.
  2+copy: Blue-color developing unit motor on, and development bias on.

3+copy: Red-color developing unit motor on, and development bias on.

4+copy: Black-color developing unit motor on, and development bias on.

5+copy: Transferring pole on.

6+copy: Cleaning blade pressured-contact

7+copy: Cleaning blade released

8+copy: Voltage applied to cleaning roller

9+copy: Separation pole on.

10+copy: 1st paper motor on.

11+copy: 2nd paper motor on.

The above modes can be released by depressing the stop/clear key.

Such self-diagnosis can be done for quick maintenance by maintenance personnel and by user should a trouble occur.

The key "m" is for differentiating between a character document and a photographic document. Using this key selects a relevant threshold value pattern.

For example, in the character copy mode, a multivalent threshold value pattern is selected, while in the photographic copy mode an 8×8 multivalue dither matrix, for example, is selected.

The switch is for applying half tone onto a designated region.

Combinedly using the switch "n" and a switch among color designation switch group "g" results in a designated region to be covered with screen cover of a designated color.

For example, once the switch "n" and a switch B among the group "g" are pressed, and the copy button is pressed, the designated region is covered with blue screen cover. Similarly, the switch R or BK used in the above manner can cause screen cover representation with a relevant color.

The key "o" is for forming a negative-positive reversed image based on a specific image.

When used in conjunction with the key "n", the key "o" can provide a reversed half tone. When used in conjunction with the key "h", this key can designate a color in which an area outside the designated region is recorded.

As described above, according to the invention, marking with a color marker on a multi-color document is detected, and the image on the region enclosed or painted with a color marker is processed relative to its color or density, or relative to both.

Accordingly unlike a prior art technique that was solely limited to a black-monochromatic document, the technique of the invention can be applied to a wide variety of documents.

As described above, the invention is advantageous in that regardless of either a black-and-white document of color document, either inside or outside of the region designated with a color marker is copied in a specified color.

According to the invention, various types of imaging operation is performed after color separation and before multi-coding operation.

Accordingly, a conventional problem, i.e. a larger circuit configuration and resultant higher cost of a copying apparatus, is eliminated. At the same time, imaging operation such as color ghost correction, and resolution correction can be performed on image data not yet undergone multivalue conversion, preventing image quality deterioration, while fulfilling an imaging operation as intended. In essence, the invention can advantageously attain high quality color image recording.

What is claimed is:

1. An image processing apparatus for identifying a region marked with a predetermined color on a document, comprising
    (a) reading means for separating an image light beam emanating from said document into a plurality of color component light beams, and photoelectrically converting said color component light beams into a plurality of color component signals;
    (b) A/D converting means for converting each of said color component signals into corresponding digital quantities and for processing them to provide digital outputs;
    (c) signal forming means for outputting per pixel either a recording signal representing one of specific colors for recording or a region signal from a ROM means comprised therein corresponding to said digital outputs, and
    (d) processing means for processing each said region signal from said signal forming means for identifying said region;
    (e) said ROM means comprising a first portion having region data stored therein which corresponds to each said region signal, and a second portion having recording data corresponding to each said recording signal stored therein, wherein said first portion is addressed by said digital outputs corresponding to the predetermined color, and said second portion is addressed by said digital outputs corresponding to other colors than said predetermined color, whereby said other colors are classified into said specific colors for recording.

2. The apparatus of claim 1 wherein said processing means is adapted to recognize said region as one unit area on the basis of an arbitrarily-shaped looped line.

3. The apparatus of claim 2 wherein said processing means is adapted to perform at least one of partial image extraction, erasing, reversing, mirror imaging, enlargement, reduction, position movement, and screen cover.

4. The apparatus of claim 1 wherein said processing means processes corresponding to each said recording signal of said pixel located inside or outside of said region based on said region signal.

5. The apparatus of claim 1 wherein each said recording signal comprises a color code representing a recording color and density data representing the density of the recording color.

6. The apparatus of claim 1 wherein said predetermined color is fluorescent.

* * * * *